US012566961B2

(12) United States Patent
Moloney et al.

(10) Patent No.: US 12,566,961 B2
(45) Date of Patent: Mar. 3, 2026

(54) DEEP LEARNING SYSTEM

(71) Applicant: MOVIDIUS LTD., Schiphol-Rijk (NL)

(72) Inventors: David Macdara Moloney, Dublin (IE);
Jonathan David Byrne, Ashbourne
(IE); Léonie Raideen Buckley, Dublin
(IE); Xiaofan Xu, Dublin (IE);
Dexmont Alejandro Peña Carillo,
Dublin (IE); **Luis M. Rodríguez
Martín de la Sierra**, Daimiel (ES);
Carlos Márquez Rodríguez-Peral,
Daimiel (ES); Mi Sun Park, San Jose,
CA (US); Cormac M. Brick, San
Francisco, CA (US); Alessandro Palla,
Pisa (IT)

(73) Assignee: MOVIDIUS LTD., Schiphol-Rijk (NL)

( * ) Notice: Subject to any disclaimer, the term of this
patent is extended or adjusted under 35
U.S.C. 154(b) by 268 days.

(21) Appl. No.: 18/537,238

(22) Filed: Dec. 12, 2023

(65) Prior Publication Data

US 2024/0127068 A1 Apr. 18, 2024

Related U.S. Application Data

(63) Continuation of application No. 17/058,126, filed as
application No. PCT/US2019/033373 on May 21,
2019, now Pat. No. 11,900,256.

(Continued)

(51) Int. Cl.
*G06K 9/00* (2022.01)
*G06N 3/04* (2023.01)
(Continued)

(52) U.S. Cl.
CPC .............. *G06N 3/082* (2013.01); *G06N 3/04*
(2013.01); *G06N 3/044* (2023.01); *G06T 7/70*
(2017.01);
(Continued)

(58) Field of Classification Search
CPC .......... G06N 20/00; G06N 3/04; G06N 3/044;
G06N 3/045; G06N 3/0464; G06N 3/049;
(Continued)

(56) References Cited

U.S. PATENT DOCUMENTS

| | | | |
|---|---|---|---|
| 2013/0129152 A1* | 5/2013 | Rodriguez Serrano | ..................... |
| | | | G06V 20/56 |
| | | | 382/105 |
| 2015/0347846 A1 | 12/2015 | Guzmán-Rivera et al. | |

(Continued)

FOREIGN PATENT DOCUMENTS

| | | |
|---|---|---|
| CN | 106030427 A | 10/2016 |
| CN | 106873566 A | 6/2017 |

(Continued)

*Primary Examiner* — Hadi Akhavannik
(74) *Attorney, Agent, or Firm* — Akona IP PC

(57) ABSTRACT

A machine learning system is provided to enhance various
aspects of machine learning models. In some aspects, a
substantially photorealistic three-dimensional (3D) graphi-
cal model of an object is accessed and a set of training
images of the 3D graphical mode are generated, the set of
training images generated to add imperfections and degrade
photorealistic quality of the training images. The set of
training images are provided as training data to train an
artificial neural network.

20 Claims, 57 Drawing Sheets

900

910

Original images
Ped    Non-Ped 901    902

911

Bitmap masked images
Ped    Non-Ped 903    904

920

Related U.S. Application Data

(60) Provisional application No. 62/675,601, filed on May 23, 2018.

(51) Int. Cl.
  *G06N 3/044* (2023.01)
  *G06N 3/082* (2023.01)
  *G06T 7/70* (2017.01)
  *G06N 20/00* (2019.01)

(52) U.S. Cl.
  CPC .... *G06N 20/00* (2019.01); *G06T 2207/10024* (2013.01); *G06T 2207/10028* (2013.01); *G06T 2207/20081* (2013.01)

(58) Field of Classification Search
  CPC ...... G06N 3/0495; G06N 3/082; G06N 3/084; G06T 17/00; G06T 2207/10024; G06T 2207/10028; G06T 2207/20081; G06T 2207/20084; G06T 2207/30196; G06T 2207/30252; G06T 7/70
  See application file for complete search history.

(56) References Cited

U.S. PATENT DOCUMENTS

| | | | |
|---|---|---|---|
| 2017/0061625 A1* | 3/2017 | Estrada | G06T 15/50 |
| 2018/0018590 A1* | 1/2018 | Szeto | G16H 10/60 |
| 2018/0082217 A1 | 3/2018 | Bates et al. | |
| 2018/0129934 A1 | 5/2018 | Tao et al. | |
| 2018/0268203 A1* | 9/2018 | Sohn | G06T 7/70 |

FOREIGN PATENT DOCUMENTS

| | | |
|---|---|---|
| CN | 106952503 A | 7/2017 |
| CN | 107516127 A | 12/2017 |
| CN | 107766850 | 3/2018 |
| CN | 107832338 A | 3/2018 |
| CN | 107861508 A | 3/2018 |
| JP | 6264495 B1 | 1/2018 |
| JP | 2018534712 A | 11/2018 |
| JP | 2018537766 A | 12/2018 |
| WO | 2017187516 A1 | 11/2017 |

* cited by examiner

300

302

Dense 512MB storage for 5^3 m
volume in SLAMbench using
32-bit TSDF per voxel

304

Octree storage – only
store 2.5D manifold
(no empty space)

| 3D front CNN | Test Accuracy |
|---|---|
| X-rotation | 82.95% |
| Y-rotation | 84.70% |
| Z-rotation | 77.33% |
| XYZ-rotation | 82.43% |
| Average | 81.85% |

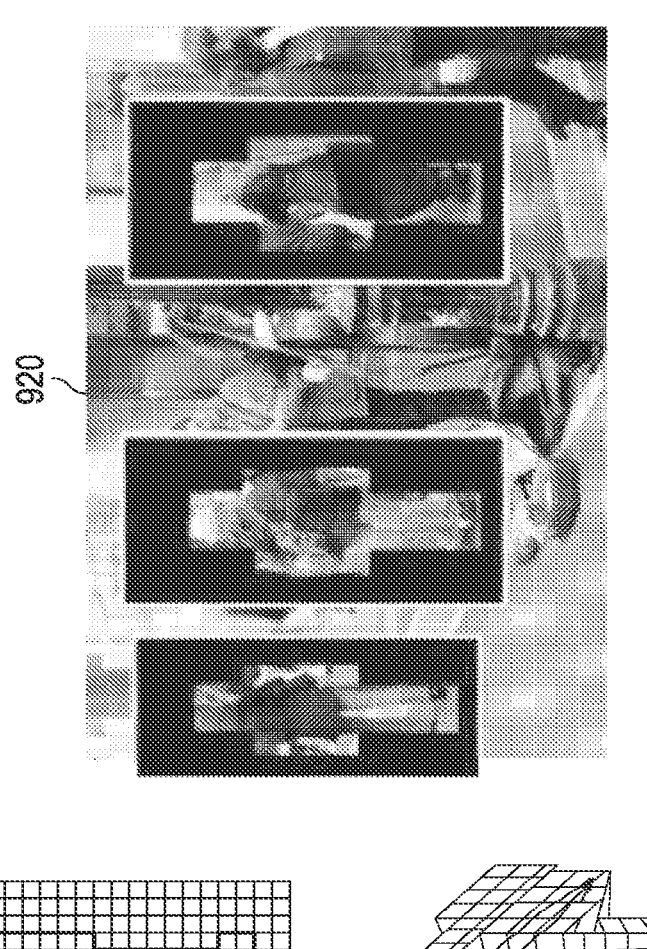
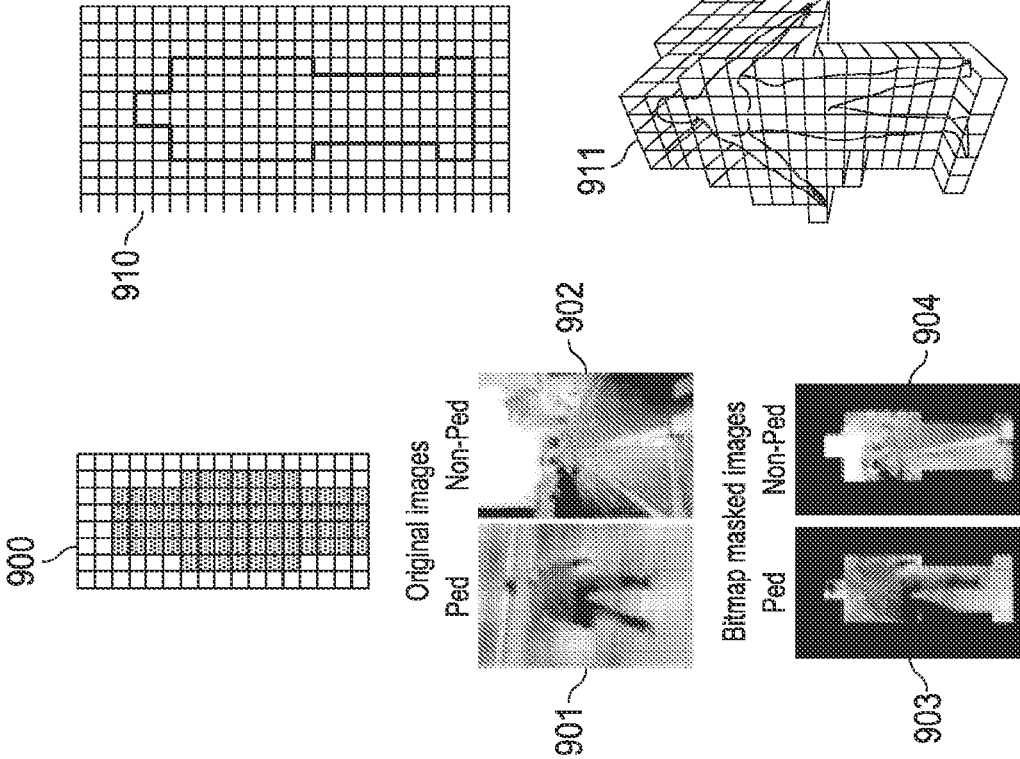
FIG. 9

1000

| AlexNet | # weights | # zeros (avg) | # zeros (min) | # zeros (max) | % zeros |
|---------|-----------|---------------|---------------|---------------|---------|
| Relu1 | 8192 | 1859.3 | 912 | 4425 | 23% |
| Relu2 | 8192 | 4459.2 | 3700 | 4873 | 54% |
| Relu3 | 4096 | 3465.6 | 3079 | 3722 | 85% |

Note: results obtained using 10,000 CIFAR-10 test-images

FIG. 10

*This is not your dog!*

3D LIDAR Sensor

2105

+

2110

=

2115

Robot mapping application with NCS

2500a

Validation Trajectory for Sequence 00

Groundtruth
Validation
IMU Points

Groundtruth, IMU Pose and Network Output Pose Comparison

2500b

Optical Flow CNN Evaluated in Seq05, Frames [0,2000]

| Validation Accuracy | Time on NCS (ms) | Temp on NCS | Size (MB) | Measured power (mW) |
|---|---|---|---|---|
| 0.9 | 5.0072915585 | 35.3913 | 0.598336 | 1601.763897 |
| 0.9528571429 | 5.4791865024 | 36.0379 | 0.074464 | 1282.476 |
| 0.9514285714 | 5.6017511717 | 36.8969 | 1.169504 | 1623.0286 |
| 0.9571428571 | 9.1457773288 | 35.8226 | 0.183264 | 1866.9777 |
| 0.9442857143 | 6.4198067866 | 35.3913 | 3.85136 | 1252.2485 |

2800

Low-precision Sparse Thin ResNet50 (on ImageNet)

| (PyTorch) ResNet50 | Requiress Sparse HW | SOTA | #Param | #MACs | Accuracy @Top1 |
|---|---|---|---|---|---|
| Baseline | No | | 25.5M | 3.83G | 76.01% |
| Fine-grained (80% sparse) | Yes | 70% sparse | 5.1M (5X) | - | 75.68% |
| Coarse-grained (2xMAC thinner dense) | No | 50% pruned | 17.2M | 1.91G (2X) | 74.87% |
| Hybrid (73% sparse thin) | Yes | | 6.9M | - | 74.32% |
| 4bit weight Hybrid (low-precision sparse thin) | Yes | | 6.9M | - | 73.81% |

3200

3300b

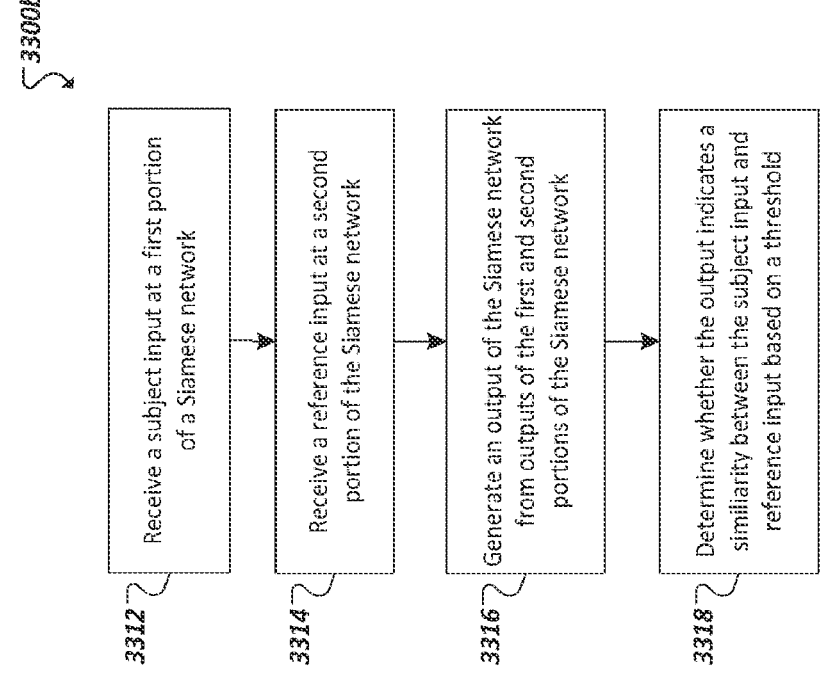

3312  Receive a subject input at a first portion of a Siamese network

3314  Receive a reference input at a second portion of the Siamese network

3316  Generate an output of the Siamese network from outputs of the first and second portions of the Siamese network 3318  Determine whether the output indicates a similarity between the subject input and reference input based on a threshold

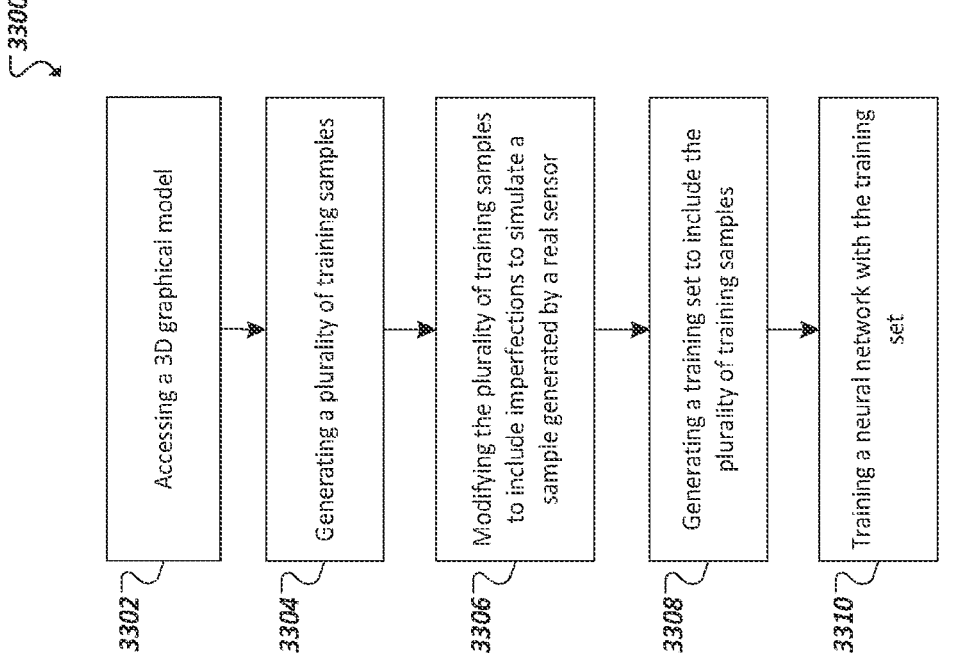

3302  Accessing a 3D graphical model

3304  Generating a plurality of training samples

3306  Modifying the plurality of training samples to include imperfections to simulate a sample generated by a real sensor 3308  Generating a training set to include the plurality of training samples 3310  Training a neural network with the training set

FIG. 33A

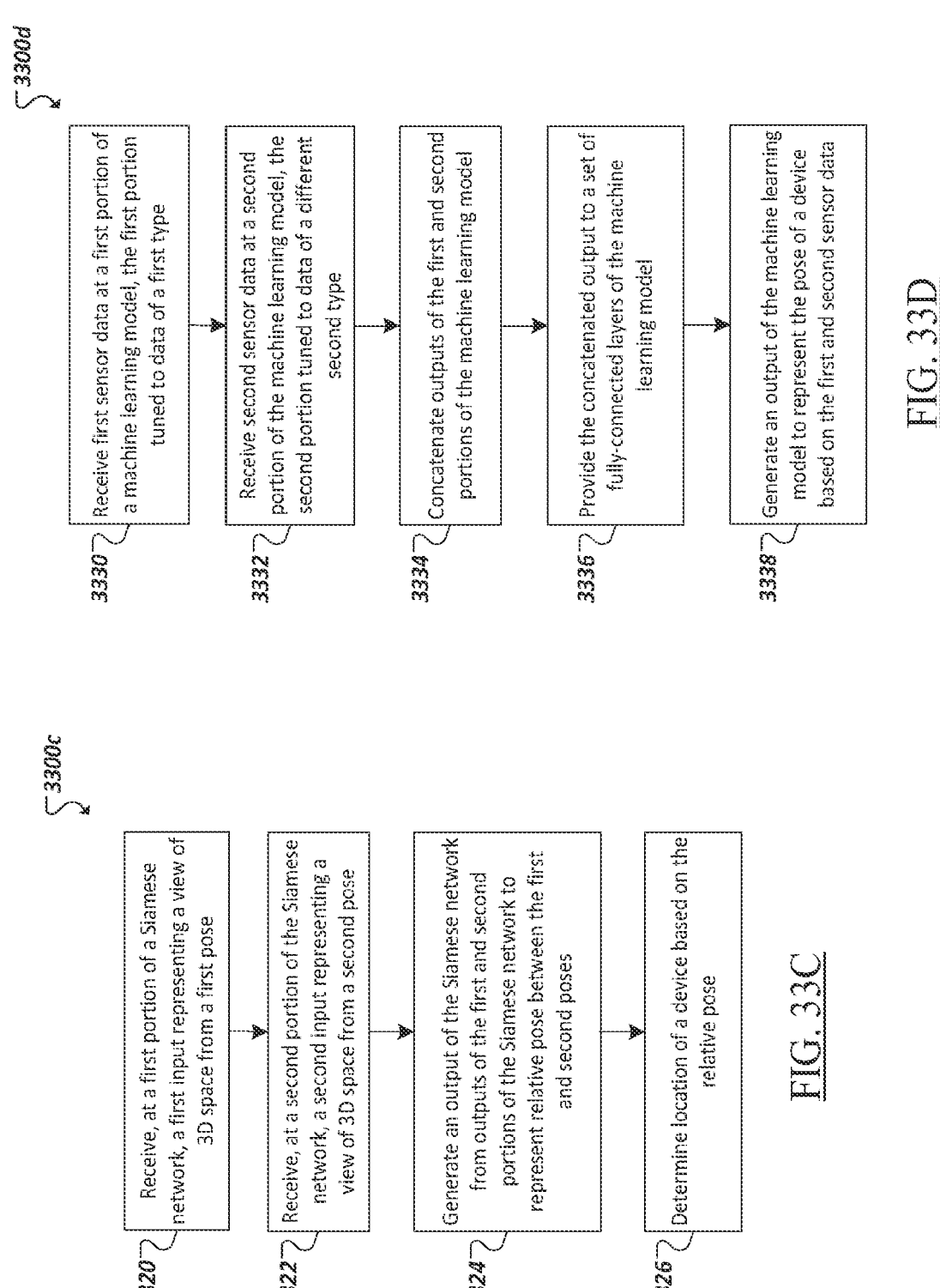

3300d

3330  Receive first sensor data at a first portion of a machine learning model, the first portion tuned to data of a first type 3332  Receive second sensor data at a second portion of the machine learning model, the second portion tuned to data of a different second type 3334  Concatenate outputs of the first and second portions of the machine learning model 3336  Provide the concatenated output to a set of fully-connected layers of the machine learning model 3338  Generate an output of the machine learning model to represent the pose of a device based on the first and second sensor data

3320  Receive, at a first portion of a Siamese network, a first input representing a view of 3D space from a first pose 3322  Receive, at a second portion of the Siamese network, a second input representing a view of 3D space from a second pose 3324  Generate an output of the Siamese network from outputs of the first and second portions of the Siamese network to represent relative pose between the first and second poses 3326  Determine location of a device based on the relative pose

FIG. 33C

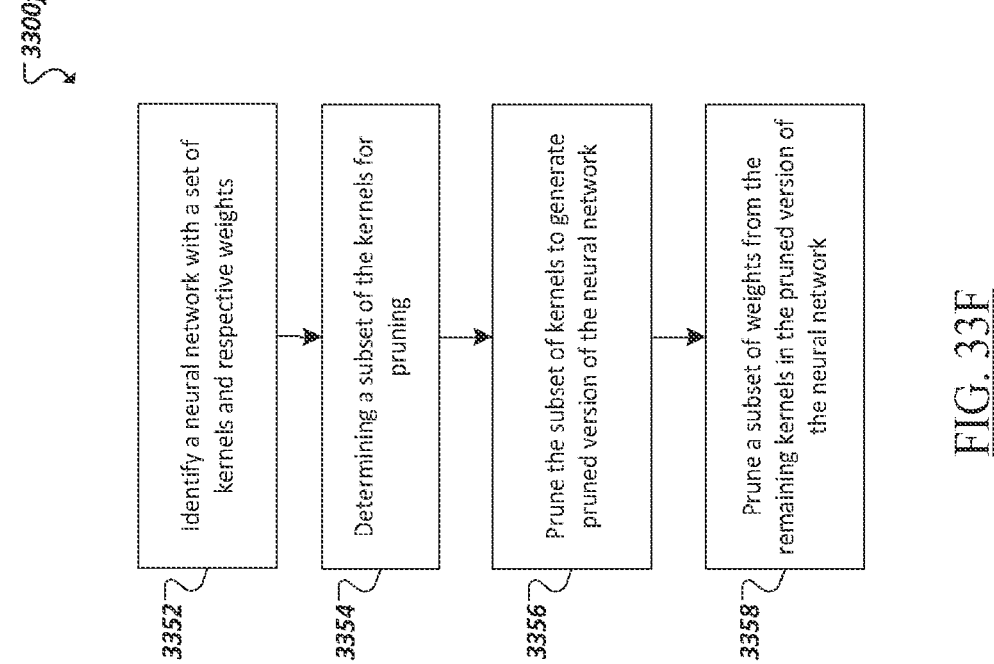

3300f

3352 — identify a neural network with a set of kernels and respective weights

3354 — Determining a subset of the kernels for pruning

3356 — Prune the subset of kernels to generate pruned version of the neural network 3358 — Prune a subset of weights from the remaining kernels in the pruned version of the neural network

3340 — Obtain a set of neural networks

3342 — Perform machine learning tasks using each of the set of neural networks

3344 — Monitor attributes of the performed machine learning tasks

3346 — Identify a top performing one of the set of neural networks based on the monitored attributes 3348 — Determine characteristics of the top performing neural network 3350 — Generate another set of neural networks based on the characteristics

FIG. 33E

4001 — bitmap = ((((uint64_t)1<< (uint64_t)(x*1)) <<  (uint64_t)(y*4)<<(uint64_t)(z*16));
4002 — bitmap | = old_bitmap;

3D to 2D projection Method

| FIG. 45 (PART 1) | FIG. 45 (PART 2) |
|---|---|

FIG. 45A

Collision Detection using Volumetric Representation

Robot @ position {x,y,z}

4605

Query {x,y,z} voxels in robot in occupied volumes at different levels and exit without collision if voxel unoccupied Scene Geometry

4602

4601

4600

DEEP LEARNING SYSTEM

RELATED APPLICATIONS

This application is a continuation of U.S. patent application Ser. No. 17/058,126, filed Nov. 23, 2020, which is a National Stage Entry of International Patent Application No. PCT/US19/33373, filed May 21, 2019, which claims priority from a Provisional Application No. 62/675,601, filed May 23, 2018, each of which is incorporated by reference herein in its entirety.

TECHNICAL FIELD

This disclosure relates in general to the field of computer systems and, more particularly, to machine learning systems.

BACKGROUND

The worlds of computer vision and graphics are rapidly converging with the emergence of Augmented Reality (AR), Virtual Reality (VR) and Mixed-Reality (MR) products such as those from MagicLeap™, Microsoft™ HoloLens™, Oculus™ Rift™, and other VR systems such as those from Valve™ and HTC™. The incumbent approach in such systems is to use a separate graphics processing unit (GPU) and computer vision subsystem, which run in parallel. These parallel systems can be assembled from a pre-existing GPU in parallel with a computer vision pipeline implemented in software running on an array of processors and/or programmable hardware accelerators.

BRIEF DESCRIPTION OF THE DRAWINGS

Various objects, features, and advantages of the disclosed subject matter can be more fully appreciated with reference to the following detailed description of the disclosed subject matter when considered in connection with the following drawings, in which like reference numerals identify like elements. The accompanying figures are schematic and are not intended to be drawn to scale. For purposes of clarity, not every component is labelled in every figure. Nor is every component of each embodiment of the disclosed subject matter shown where illustration is not necessary to allow those of ordinary skill in the art to understand the disclosed subject matter.

FIG. 9 illustrates operation elimination by 2D convolutional neural networks in accordance with some embodiments;

FIG. 10 illustrates the experimental results from analysis of example test images in accordance with some embodiments;

FIGS. 33A-33F are simplified flow diagrams of example computer-implemented techniques associated with machine learning in accordance with at least some embodiments;

DETAILED DESCRIPTION OF EXAMPLE EMBODIMENTS

Figure 1:
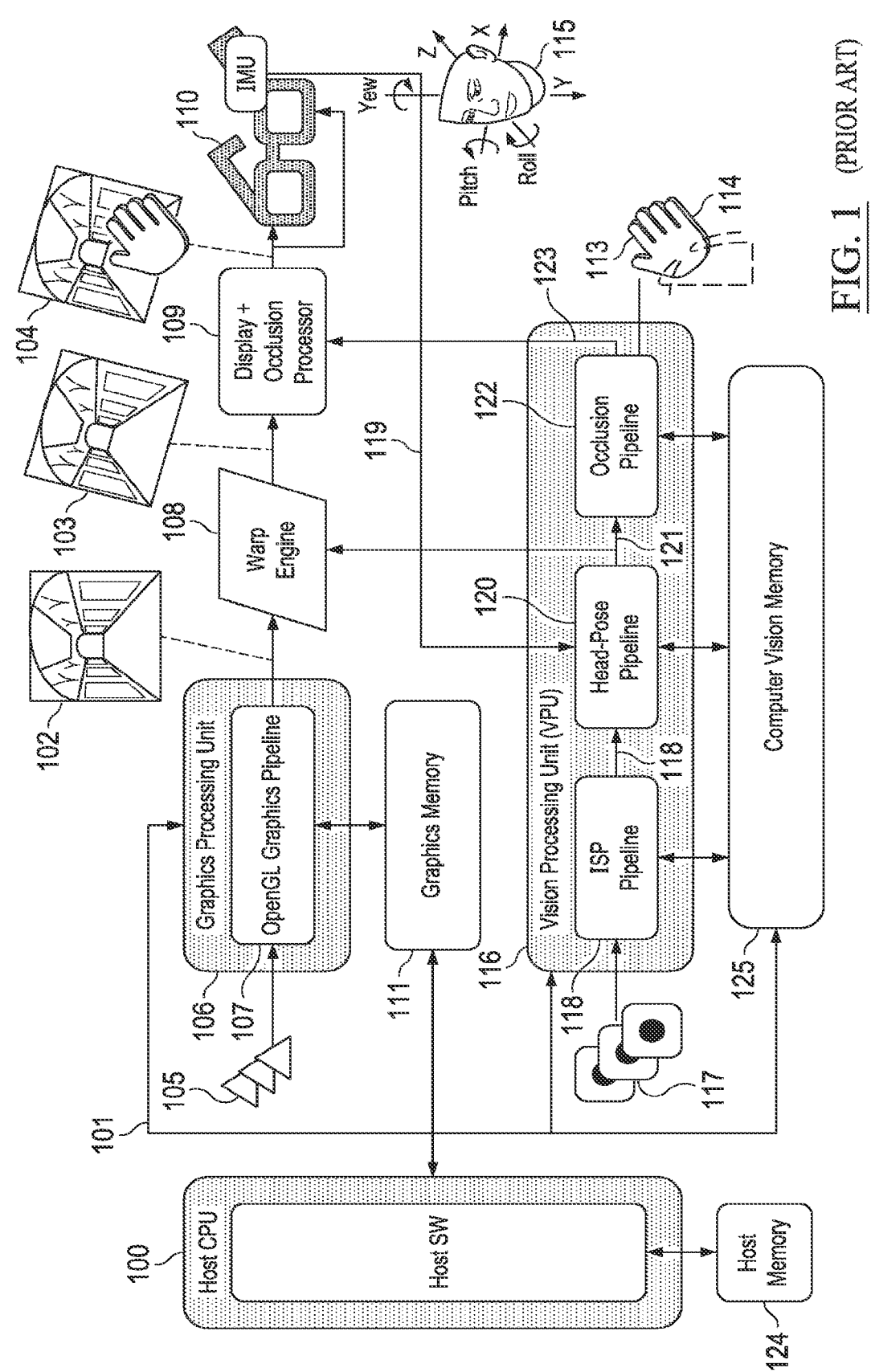
FIG. 1 illustrates a conventional augmented or mixed reality rendering system.

In the following description, numerous specific details are set forth regarding the systems and methods of the disclosed subject matter and the environment in which such systems and methods may operate, etc., in order to provide a thorough understanding of the disclosed subject matter. It will be apparent to one skilled in the art, however, that the disclosed subject matter may be practiced without such specific details, and that certain features, which are well known in the art, are not described in detail in order to avoid complication of the disclosed subject matter. In addition, it will be understood that the embodiments provided below are exemplary, and that it is contemplated that there are other systems and methods that are within the scope of the disclosed subject matter.

A variety of technologies are emerging based on and incorporating augmented reality, virtual reality, mixed reality, autonomous devices, and robots, which may make use of data models representing volumes of three-dimensional space and geometry. The description of various real and virtual environments using such 3D or volumetric data has traditionally involved large data sets, which some computing systems have struggled to process in a desirable manner. Further, as devices, such as drones, wearable devices, virtual reality systems, etc., grow smaller, the memory and processing resources of such devices may also be constrained. As an example, AR/VR/MR applications may demand high-frame rates for the graphical presentations generated using supporting hardware. However, in some applications, the GPU and computer vision subsystem of such hardware may need to process data (e.g., 3D data) at high rates, such as up to 130 fps (7msecs), in order to produce desirable results (e.g., to generate a believable graphical scene with frame rates that produce a believable result, prevent motion sickness of the user due to excessive latency, among other example goals. Additional application may be similarly challenged to satisfactorily process data describing large volumes, while meeting constraints in processing, memory, power, application requirements of the corresponding system, among other example issues.

In some implementations, computing systems may be provided with logic to generate and/or use sparse volumetric data, defined according to a format. For instance, a defined volumetric data-structure may be provided to unify computer vision and 3D rendering in various systems and applications. A volumetric representation of an object may be captured using an optical sensor, such as a stereoscopic camera or depth camera, for example. The volumetric representation of the object may include multiple voxels. An improved volumetric data structure may be defined that enables the corresponding volumetric representation to be subdivided recursively to obtain a target resolution of the object. During the subdivision, empty space in the volumetric representation, which may be included in one or more of the voxels, can be culled from the volumetric representation (and supporting operations). The empty space may be an area of the volumetric representation that does not include a geometric property of the object.

Accordingly, in an improved volumetric data structure, individual voxels within a corresponding volume may be tagged as "occupied" (by virtue of some geometry being present within the corresponding volumetric space) or as "empty" (representing that the corresponding volume consists of empty space). Such tags may additionally be interpreted as designating that one or more of its corresponding subvolumes is also occupied (e.g., if the parent or higher level voxel is tagged as occupied) or that all of its subvolumes are empty space (i.e., in the case of the parent, or higher level voxel being tagged empty). In some implementations, tagging a voxel as empty may allow the voxel and/or its corresponding subvolume voxels to be effectively removed from the operations used to generate a corresponding volumetric representation. The volumetric data structure may be according to a sparse tree structure, such as according to a sparse sexaquaternary tree (SST) format. Further, such an approach to a sparse volumetric data structure may utilize comparatively less storage space than is traditionally used to store volumetric representations of objects. Additionally, compression of volumetric data may increase the viability of transmission of such representations and enable faster processing of such representations, among other example benefits.

The volumetric data-structure can be hardware accelerated to rapidly allow updates to a 3D renderer, eliminating delay that may occur in separate computer vision and graphics systems. Such delay can incur latency, which may induce motion sickness in users among other additional disadvantages when used in AR, VR, MR, and other applications. The capability to rapidly test voxels for occupancy of a geometric property in an accelerated data-structure allows for construction of a low-latency AR, VR, MR, or other system, which can be updated in real time.

In some embodiments, the capabilities of the volumetric data-structure may also provide intra-frame warnings. For example, in AR, VR, MR, and other applications, when a user is likely to collide with a real or synthetic object in an imaged scene, or in computer vision applications for drones or robots, when such devices are likely to collide with a real or synthetic object in an imaged scene, the speed of processing provided by the volumetric data structure allows for warning of the impending collision.

Embodiments of the present disclosure may relate to the storage and processing of volumetric data in applications such as robotics, head-mounted displays for augmented and mixed reality headsets as well as phones and tablets. Embodiments of the present disclosure represent each volumetric element (e.g., voxel) within a group of voxels, and optionally physical quantities relating to the voxel's geometry, as a single bit. Additional parameters related to a group of 64 voxels may be associated with the voxels, such as corresponding red-green-blue (RGB) or other coloration encodings, transparency, truncated signed distance function (TSDF) information, etc. and stored in an associated and optional 64-bit data-structure (e.g., such that two or more bits are used to represent each voxel). Such a representation scheme may realize a minimum memory requirement. Moreover, representing voxels by a single bit allows for the performance of many simplified calculations to logically or mathematically combine elements from a volumetric representation. Combining elements from a volumetric representation can include, for example, OR-ing planes in a volume to create 2D projections of 3D volumetric data, and calculating surface areas by counting the number of occupied voxels in a 2.5D manifold, among others. For comparisons XOR logic may be used to compare 64-bit sub-volumes (e.g., 4^3 sub-volumes), and volumes can be inverted, where objects can be merged to create hybrid objects by ORing them together, among other examples.

FIG. 1 illustrates a conventional augmented or mixed reality system consisting of parallel graphics rendering and computer-vision subsystems with a post-rendering connection apparatus to account for changes due to rapid head movement and changes in the environment which can produce occlusions and shadows in the rendered graphics. In one example implementation, a system may include a host processor 100 supported by host memory 124 to control the execution of a graphics pipeline, computer vision pipeline, and post-rendering correction apparatus by interconnection via bus 101, on-chip network on-chip, or other interconnection. The interconnection allows the host processor 100 running appropriate software to control the execution of the graphics processing unit (GPU) 106, associated graphics memory 111, computer vision pipeline 116, and associated computer vision memory 124. In one example, rendering of graphics using the GPU 106 via an OpenGL graphics shader 107 (e.g., operating on a triangle list 105) may take place at a slower rate than the computer vision pipeline. As a result, post rendering correction via a warp engine 108 and display/occlusion processor 109 may be performed to account for changes in head pose and occluding scene geometry that may have occurred since the graphics was rendered by the GPU 106. The output of the GPU 106 is time-stamped so that it can be used in conjunction with the correct control signals 121 and 123 from the head pose pipeline 120 and occlusion pipeline 123 respectively to produce the correct graphics output to take account of any changes in head pose 119 and occluding geometry 113, among other examples.

In parallel with the GPU 106, a plurality of sensors and cameras (e.g., including active and passive stereo cameras for depth and vision processing 117) may be connected to the computer vision pipeline 116. The computer vision pipeline 116 may include one or more of at least three stages, each of which may contain multiple stages of lower level processing. In one example, the stages in the computer vision pipeline 116 may be the image signal processing (ISP) pipeline 118, head-pose pipeline 120, and occlusion pipeline 122. The ISP pipeline 118 may take the outputs of the input camera sensors 117 and condition them so they can be used for subsequent head-pose and occlusion processing. The head-pose pipeline 120 may take the output of the ISP pipeline 118 and use it together with the output 119 of the inertial measurement unit (IMU) in the headset 110 to compute a change in head-pose since the corresponding output graphics frame was rendered by the GPU 106. The output 121 of the head-pose pipeline (HPP) 120 may be applied to the warp engine 108 along with a user specified mesh to distort the GPU output 102 so that it matches the updated head-pose position 119. The occlusion pipeline 122 may take the output of head-pose pipeline 121 and look for new objects in the visual field such as a hand 113 (or other example object) entering the visual field which should produce a corresponding shadow 114 on the scene geometry. The output 123 of the occlusion pipeline 122 may be used by the display and occlusion processor 109 to correctly overlay the visual field on top of the output 103 of the warp engine 108. The display and occlusion processor 109 produces a shadow mask for synthetic shadows 114 using the computed head-pose 119, and the display and occlusion processor 109 may composite the occluding geometry of the hand 113 on top of the shadow mask to produce a graphical shadow 114 on top of the output 103 of the warp engine 108 and produce the final output frame(s) 104 for display on the augmented/mixed reality headset 110, among other example use cases and features.

Figure 2:
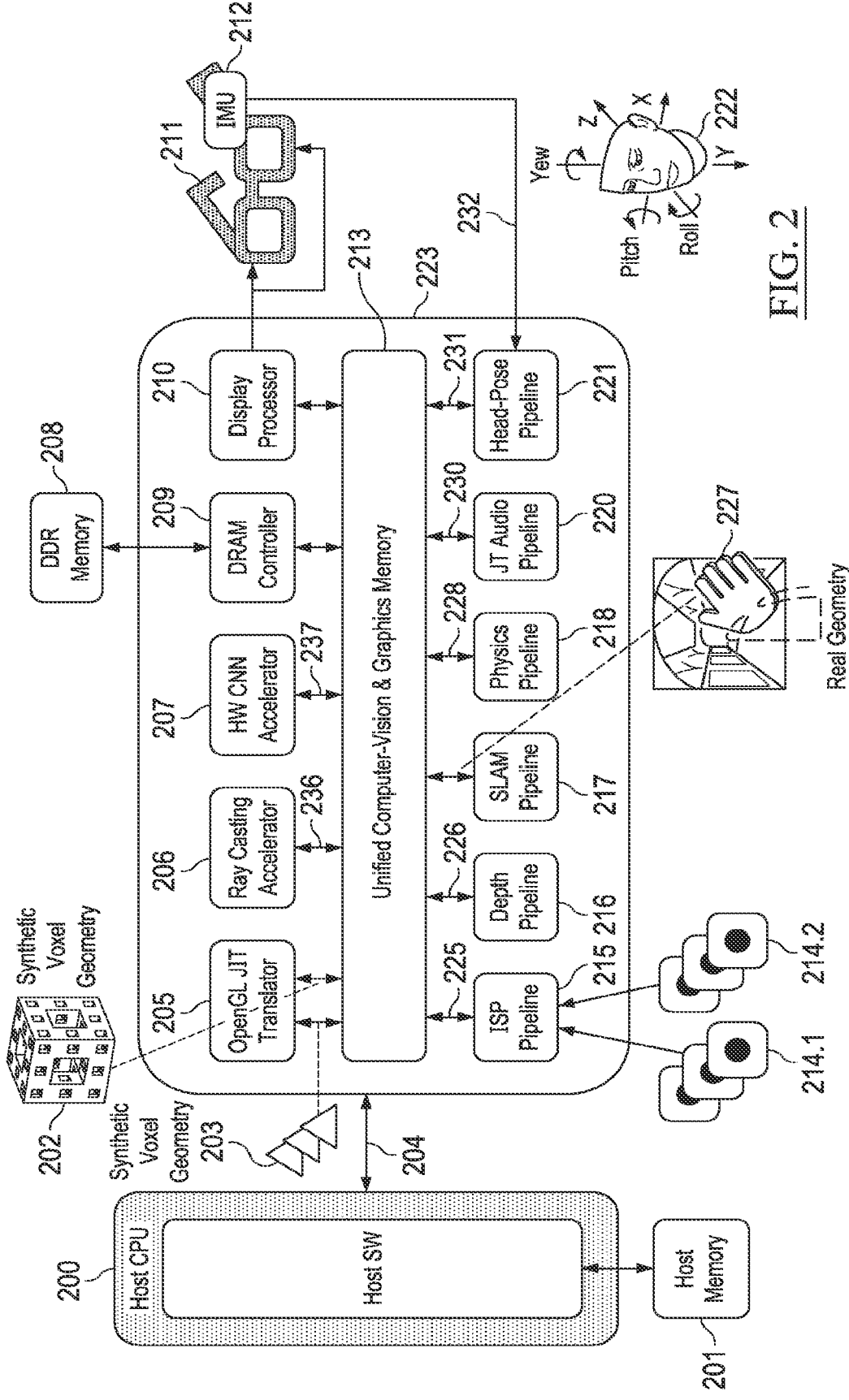
FIG. 2 illustrates a voxel-based augmented or mixed reality rendering system in accordance with some embodiments.

FIG. 2 illustrates a voxel-based augmented or mixed reality rendering system in accordance with some embodiments of the present disclosure. The apparatus depicted in FIG. 2 may include a host system composed on host CPU 200 and associated host memory 201. Such a system may communicate via a bus 204, on-chip network or other communications mechanism, with the unified computer vision and graphics pipeline 223 and associated unified computer vision and graphics memory 213 containing the real and synthetic voxels to be rendered in the final scene for display on a head-mounted augmented or mixed reality display 211. The AR/MR display 211 may also contain a plurality of active and passive image sensors 214 and an inertial measurement unit (IMU) 212, which is used to measure changes to head pose 222 orientation.

In the combined rendering pipeline, synthetic geometry may be generated starting from a triangle list 204 which is processed by an OpenGL JiT (Just-in-Time) translator 205 to produce synthetic voxel geometry 202. The synthetic voxel geometry may be generated, for instance, by selecting a main plane of a triangle from a triangle list. 2D rasterization of each triangle in the selected plane may then be performed (e.g., in the X and Z direction). The third coordinate (e.g., Y) may be created as an attribute to be interpolated across the triangle. Each pixel of the rasterized triangle may result in the definition of a corresponding voxel. This processing can be performed by either a CPU or GPU. When performed by a GPU, each rasterized triangle may be read back from the GPU to create a voxel where the GPU drew a pixel, among other example implementations. For instance, a synthetic voxel may be generated using a 2D buffer of lists, where each entry of the list stores the depth information of a polygon rendered at that pixel. For instance, a model can be rendered using an orthographic viewpoint (e.g., top-down). For example, every (x, y) provided in an example buffer may represent the column at (x, y) in a corresponding voxel volume (e.g., from (x,y,0) to (x,y,4095)). Each column may then be rendered from the information as 3D scanlines using the information in each list.

Continuing with the example of FIG. 2, in some implementations the synthetic voxel geometry 202 may be combined with measured geometry voxels 227 constructed using a simultaneous localization and mapping (SLAM) pipeline 217. The SLAM pipeline may use active sensors and/or passive image sensors 214 (e.g., 214.1 and 214.2) which are first processed using an image signal processing (ISP) pipeline 215 to produce an output 225, which may be converted into depth images 226 by a depth pipeline 216. Active or passive image sensors 214 (214.1 and 214.2) may include active or passive stereo sensors, structured light sensors, time-of-flight sensors, among other examples. For instance, the depth pipeline 216 can process either depth data from a structured light or time-of-flight sensor 214.1 or alternately a passive stereo sensors 214.2. In one example implementation, stereo sensors 214.2 may include a passive pair of stereo sensors, among other example implementations.

Depth images generated by the depth pipeline 215 may be processed by a dense SLAM pipeline 217 using a SLAM algorithm (e.g., Kinect Fusion) to produce a voxelized model of the measured geometry voxels 227. A ray-tracing accelerator 206 may be provided that may combine the measured geometry voxels 227 (e.g., real voxel geometry) with the synthetic voxel geometry 202 to produce a 2D rendering of the scene for output to a display device (e.g., a head mounted display 211 in a VR or AR application) via a display processor 210. In such an implementation, a complete scene model may be constructed from real voxels of measured geometry voxels 227 and synthetic geometry 202. As a result, there is no requirement for warping of 2D rendered geometry (e.g., as in FIG. 1). Such an implementation may be combined with head-pose tracking sensors and corresponding logic to correctly align the real and measured geometry. For instance, an example head-pose pipeline 221 may process head-pose measurements 232 from an IMU 212 mounted in the head mounted display 212 and the output 231 of the head-pose measurement pipeline may be taken into account during rendering via the display processor 210.

In some examples, a unified rendering pipeline may also use the measured geometry voxels 227 (e.g., a real voxel model) and synthetic geometry 202 (e.g, a synthetic voxel model) in order to render audio reverberation models and model the physics of a real-world, virtual, or mixed reality scene. As an example, a physics pipeline 218 may take the measured geometry voxels 227 and synthetic geometry 202 voxel geometry and compute the output audio samples for left and right earphones in a head mounted display (HMD) 211 using the ray casting accelerator 206 to compute the output samples 230 using acoustic reflection coefficients built into the voxel data-structure. Similarly, the unified voxel model consisting of 202 and 227 may also be used to determine physics updates for synthetic objects in the composite AR/MR scene. The physics pipeline 218 takes the composite scene geometric as inputs and computes collisions using the ray-casting accelerator 206 before computing updates 228 to the synthetic geometry 202 for rendering and as a basis for future iterations of the physics models.

In some implementations, a system, such as the system shown in FIG. 2, may be additionally provided with one or more hardware accelerators to implement and/or utilize convolutional neural networks (CNNs) that can process either RGB video/image inputs from the output of the ISP pipeline 215, volumetric scene data from the output of the SLAM pipeline 217, among other examples. Neural network classifiers can run either exclusively using the hardware (HW) convolutional neural network (CNN) accelerator 207 or in a combination of processors and HW CNN accelerator 207 to produce an output classification 237. The availability of a HW CNN accelerator 207 to do inference on volumetric representations may allow groups of voxels in the measured geometry voxels 227 to be labelled as belonging to a particular object class, among other example uses.

Labeling voxels (e.g., using a CNN and supporting hardware acceleration) may allow those objects to which those voxels belong to be recognized by the system as corresponding to the known object and the source voxels can be removed from the measured geometry voxels 227 and replaced by a bounding box corresponding to the object and/or information about the object's origin, object's pose, an object descriptor, among other example information. This may result in a much more semantically meaningful description of the scene that can be used, for example, as an input by a robot, drone, or other computing system to interact with objects in the scene, or an audio system to look up the sound absorption coefficient of objects in the scene and reflect them in the acoustic model of the scene, among other example uses.

One or more processor devices and hardware accelerators may be provided to implement the pipelines of the example system shown and described in FIG. 2. In some implementations, all of the hardware and software elements of the combined rendering pipeline may share access to a DRAM controller 209 which in turn allows data to be stored in a shared DDR memory device 208, among other example implementations.

Figure 3:
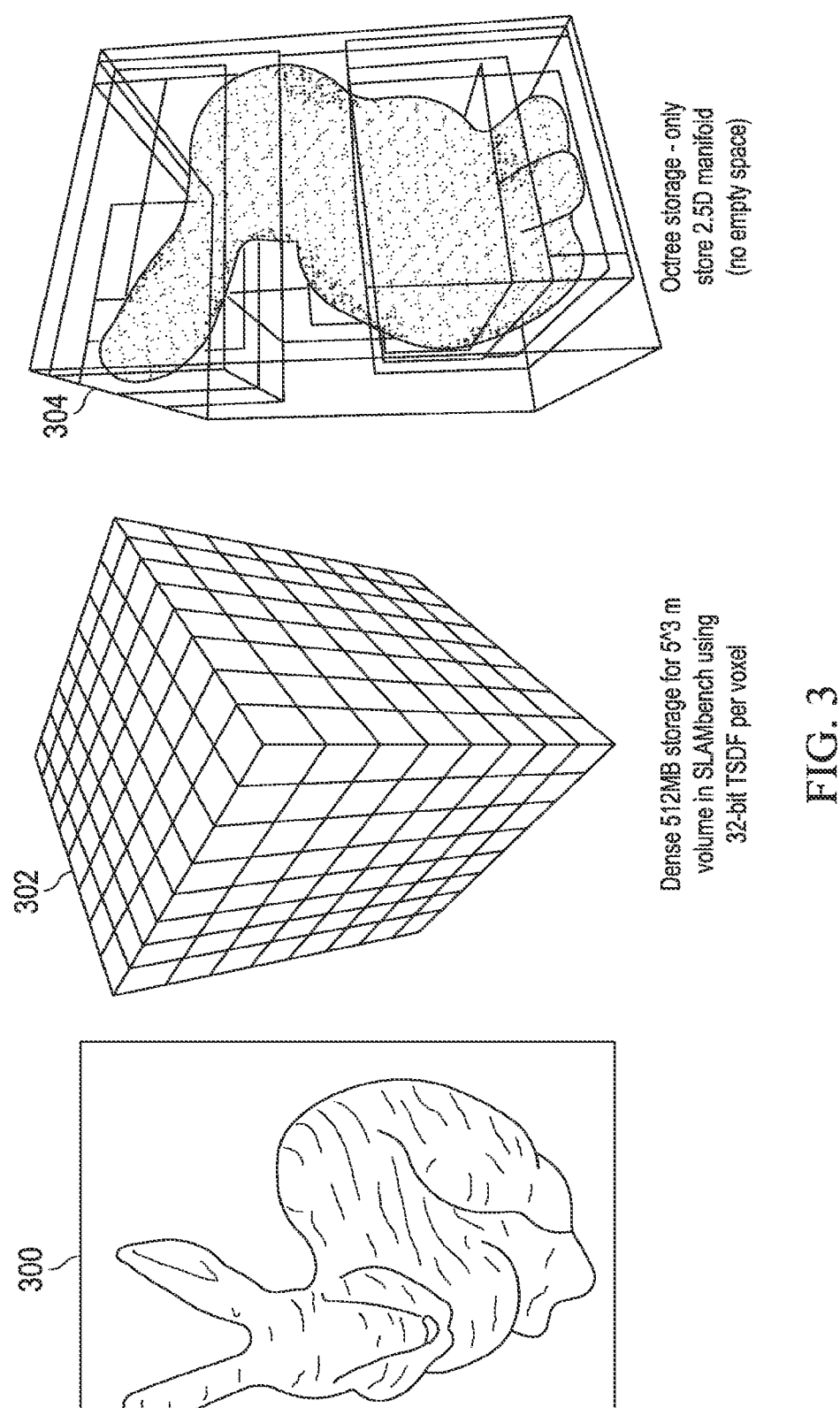
FIG. 3 illustrates the difference between dense and sparse volumetric representations in accordance with some embodiments.

FIG. 3 is presented to illustrate a difference between dense and sparse volumetric representations in accordance with some embodiments. As shown in the example of FIG. 3, a real world or synthetic object 300 (e.g., a statue of a rabbit) can be described in terms of voxels either in a dense manner as shown in 302 or in a sparse manner as shown in 304. The advantage of the dense representation such as 302 is uniform speed of access to all voxels in the volume, but the downside is the amount of storage that may be required. For example, for a dense representation, such as a 512^3 element volume (e.g., corresponding to a 5 m in 1 cm resolution for a volume scanned using a Kinect sensor), 512 Mbytes to store a relatively small volume with a 4 Byte truncated signed distance function (TSDF) for each voxel. An octree representation 304 embodying a sparse representation, on the other hand, may store only those voxels for which there is actual geometry in the real world scene, thereby reducing the amount of data needed to store the same volume.

Figure 4:
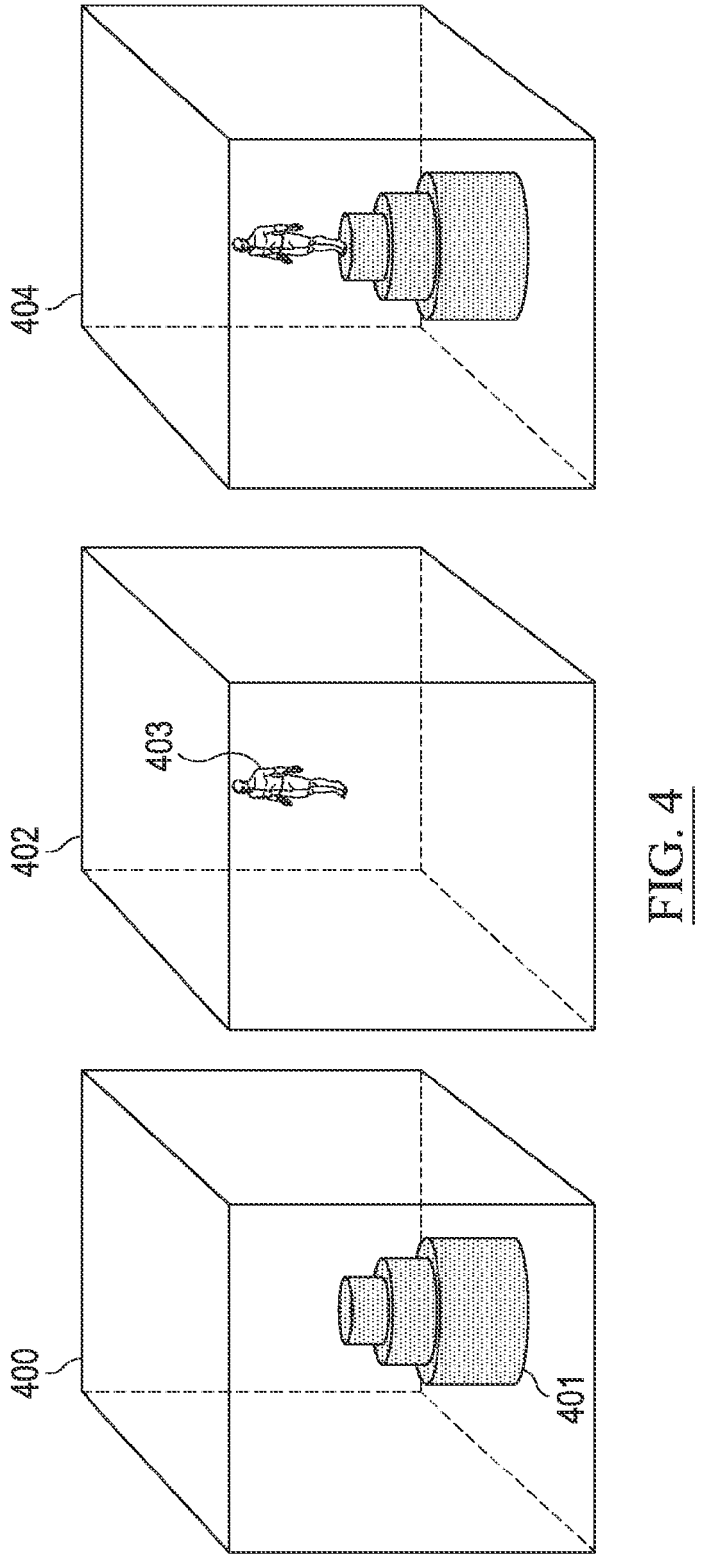
FIG. 4 illustrates a composite view of a scene in accordance with some embodiments.
Figure 5:
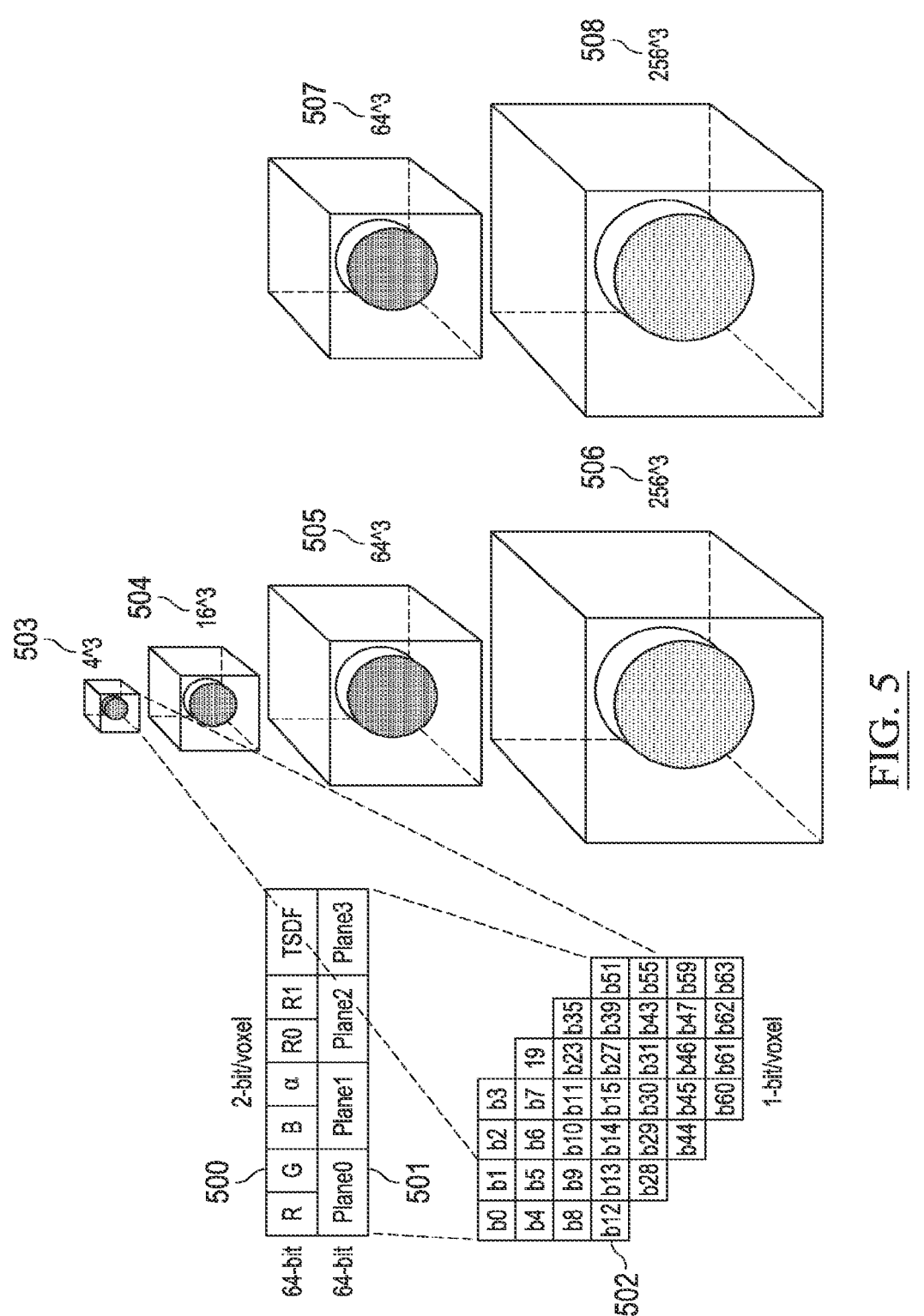
FIG. 5 illustrates the level of detail in an example element tree structure in accordance with some embodiments.

Turning to FIG. 4, a composite view of an example scene is illustrated in accordance with some embodiments. In particular, FIG. 4 shows how a composite view of a scene 404 can be maintained, displayed or subject to further processing using parallel data structures to represent synthetic voxels 401 and real world measured voxels 403 within equivalent bounding boxes 400 and 402 respectively for the synthetic and real-world voxel data. FIG. 5 illustrates the level of detail in a uniform 4ˆ3 element tree structure in accordance with some embodiments. In some implementations, as little as 1 bit may be utilized to describe each voxel in the volume using an octree representation, such as represented in the example of FIG. 5. However, a disadvantage of octree based techniques may be the number of indirect memory accesses utilized to access a particular voxel in the octree. In the case of a sparse voxel octree, the same geometry may be implicitly represented at multiple levels of detail advantageously allowing operations such as ray-casting, game-physics, CNNs, and other techniques to allow empty parts of a scene to be culled from further calculations leading to an overall reduction in not only storage required, but also in terms of power dissipation and computational load, among other example advantages.

In one implementation, an improved voxel descriptor (also referred to herein as "volumetric data structure") may be provided to organize volumetric information as a 4ˆ3 (or 64-bit) unsigned integer, such as shown in 501 with a memory requirement of 1 bit per voxel. In this example, 1-bit per voxel is insufficient to store a truncated signed distance function value (compared with TSDFs in SLAMbench/KFusion which utilize 64-bits). In the present example, an additional (e.g., 64-bit) field 500 may be included in the voxel descriptor. This example may be further enhanced such that while the TSDF in 64-bit field 500 is 16-bits, an additional 2-bits of fractional resolution in x, y and z may be provided implicitly in the voxel descriptor 501 to make the combination of the voxel TSDF in 64-bit field 500 and voxel location 501 equivalent to a much higher resolution TSDF, such as used in StAMbench/KFusion or other examples. For instance, the additional data in the 64-bit field 500 (voxel descriptor) may be used to store subsampled RGB color information (e.g., from the scene via passive RGB sensors) with one byte each, and an 8-bit transparency value alpha, as well as two 1-byte reserved fields R1 and R2 that may be application specific and can be used to store, for example, acoustic reflectivity for audio applications, rigidity for physics applications, object material type, among other examples.

As shown in FIG. 5, the voxel descriptor 501 can be logically grouped into four 2D planes, each of which contain 16 voxels 502. These 2D planes (or voxel planes) may describe each level of an octree style structure based on successive decompositions in ascending powers of 4, as represented in FIG. 5. In this example implementation, the 64-bit voxel descriptor is chosen because it is a good match for a 64-bit bus infrastructure used in a corresponding system implementation (although other voxel descriptor sizes and formats may be provided in other system implementations and sized according to the bus or other infrastructure of the system). In some implementations, a voxel descriptor may be sized to reduce the number of memory accesses used to obtain the voxel. For instance, a 64-bit voxel descriptor may be used to reduce the number of memory accesses necessary to access a voxel at an arbitrary level in the octree by a factor of 2 compared to a traditional octree which operates on 2ˆ3 elements, among other example considerations and implementations.

In one example, an octree can be described starting from a 4'root volume 503, and each non-zero entry in which codes for the presence of geometry in the underlying layers 504, 505 and 506 are depicted in the example 256ˆ3 volume. In this particular example, four memory accesses may be used in order to access the lowest level in the octree. In cases where such overhead is too high, an alternate approach may be adopted to encode the highest level of the octree as a larger volume, such as 64ˆ3, as shown in 507. In this case, each non-zero entry in 507 may indicate the presence of an underlying 4ˆ3 octree in the underlying 256ˆ3 volume 508. The result of this alternate organization is that only two memory accesses are required to access any voxel in the 256ˆ3 volume 508 compared to the alternate formulation shown in 503, 504 and 505. This latter approach is advantageous in the case that the device hosting the octree structure has a larger amount of embedded memory, allowing only the lower and less frequently accessed parts of the voxel octree 508 in external memory. This approach may cost more in terms of storage, for instance, where the full, larger (e.g., 64ˆ3) volume is to be stored in on-chip memory, but the tradeoff may allow faster memory access (e.g., 2×) and much lower power dissipation, among other example advantages.

Figure 6:
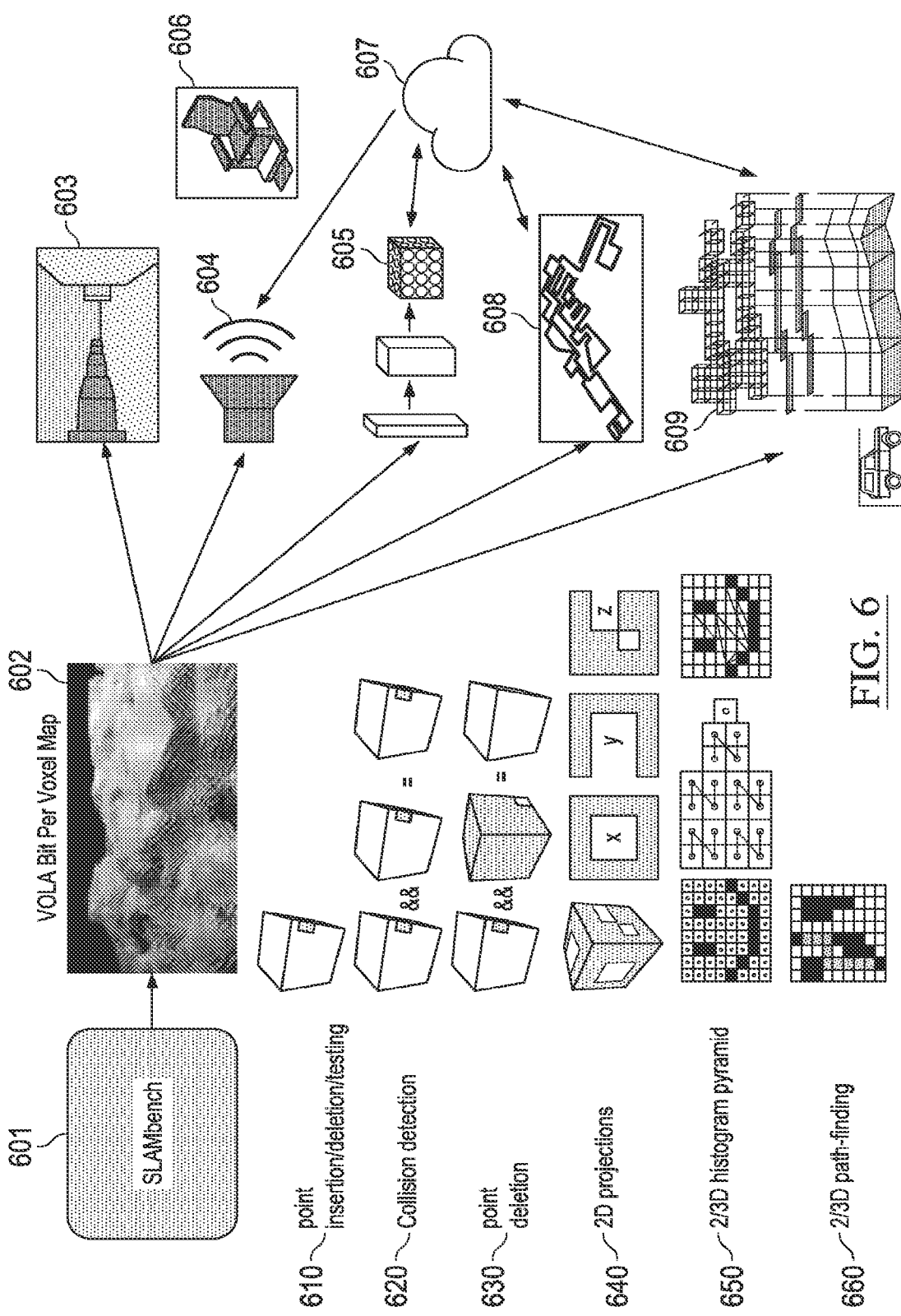
FIG. 6 illustrates applications which can utilize the data-structure and voxel data of the present application in accordance with some embodiments.

Turning to FIG. 6, a block diagram is shown illustrating example applications which may utilize the data-structure and voxel data of the present application in accordance with some embodiments. In one example, such as that shown in FIG. 5, additional information may be provided through an example voxel descriptor 500. While the voxel descriptor may increase the overall memory utilized to 2 bits per voxel, the voxel descriptor may enable a wide range of applications, which can make use of the voxel data, such as represented in FIG. 6. For instance, a shared volumetric representation 602, such as generated using a dense SLAM system 601 (e.g., SLAMbench), can be used in rendering the scene using graphic ray-casting or ray-tracing 603, used in audio ray-casting 604, among other implementations. In still other examples, the volumetric representation 602 can also be used in convolutional neural network (CNN) inference 605, and can be backed up by cloud infrastructure 607. In some instances, cloud infrastructure 607 can contain detailed volumetric descriptors of objects such as a tree, piece of furniture, or other object (e.g., 606) that can be accessed via inference. Based on inferring or otherwise identifying the object, corresponding detailed descriptors may be returned to the device, allowing voxels of volumetric representation 602 to be replaced by bounding box representations with pose information and descriptors containing the properties of the objects, among other example features.

In still other embodiments, the voxel models discussed above may be additionally or alternatively utilized in some systems to construct 2D maps of example environments 608 using 3D-to-2D projections from the volumetric representation 602. These 2D maps can again be shared via communicating machines via cloud infrastructure and/or other network-based resources 607 and aggregated (e.g., using the same cloud infrastructure) to build higher quality maps using crowd-sourcing techniques. These maps can be shared by the cloud infrastructure 607 to connected machines and devices. In still further examples, 2D maps may be refined for ultra-low bandwidth applications using projection followed by piecewise simplification 609 (e.g., assuming fixed width and height for a vehicle or robot). The simplified path may then only have a single X,Y coordinate pair per piecewise linear segment of the path, reducing the amount of bandwidth required to communicate the path of the vehicle 609 to cloud infrastructure 607 and aggregated in that same cloud infrastructure 607 to build higher quality maps using crowd-sourcing techniques. These maps can be shared by cloud infrastructure 607 to connected machines and devices.

In order to enable these different applications, in some implementations, common functionality may be provided, such as through a shared software library, which in some embodiments may be accelerated using hardware accelerators or processor instruction set architecture (ISA) extensions, among other examples. For instance, such functions may include the insertion of voxels into the descriptor, the deletion of voxels, or the lookup of voxels 610. In some implementations, a collision detection function 620 may also be supported, as well as point/voxel deletion from a volume 630, among other examples. As introduced above, a system may be provided with functionality to quickly generate 2D projections 640 in X-, Y- and Z-directions from a corresponding volumetric representation 602 (3D volume) (e.g., which may serve as the basis for a path or collision determination). In some cases, it can also be advantageous to be able to generate triangle lists from volumetric representation 602 using histogram pyramids 650. Further, a system may be provided with functionality for fast determination of free paths 660 in 2D and 3D representations of a volumetric space 602. Such functionality may be useful in a range of applications. Further functions may be provided, such as elaborating the number of voxels in a volume, determining the surface of an object using a population counter to count the number of 1 bits in the masked region of the volumetric representation 602, among other examples.

Figure 7:
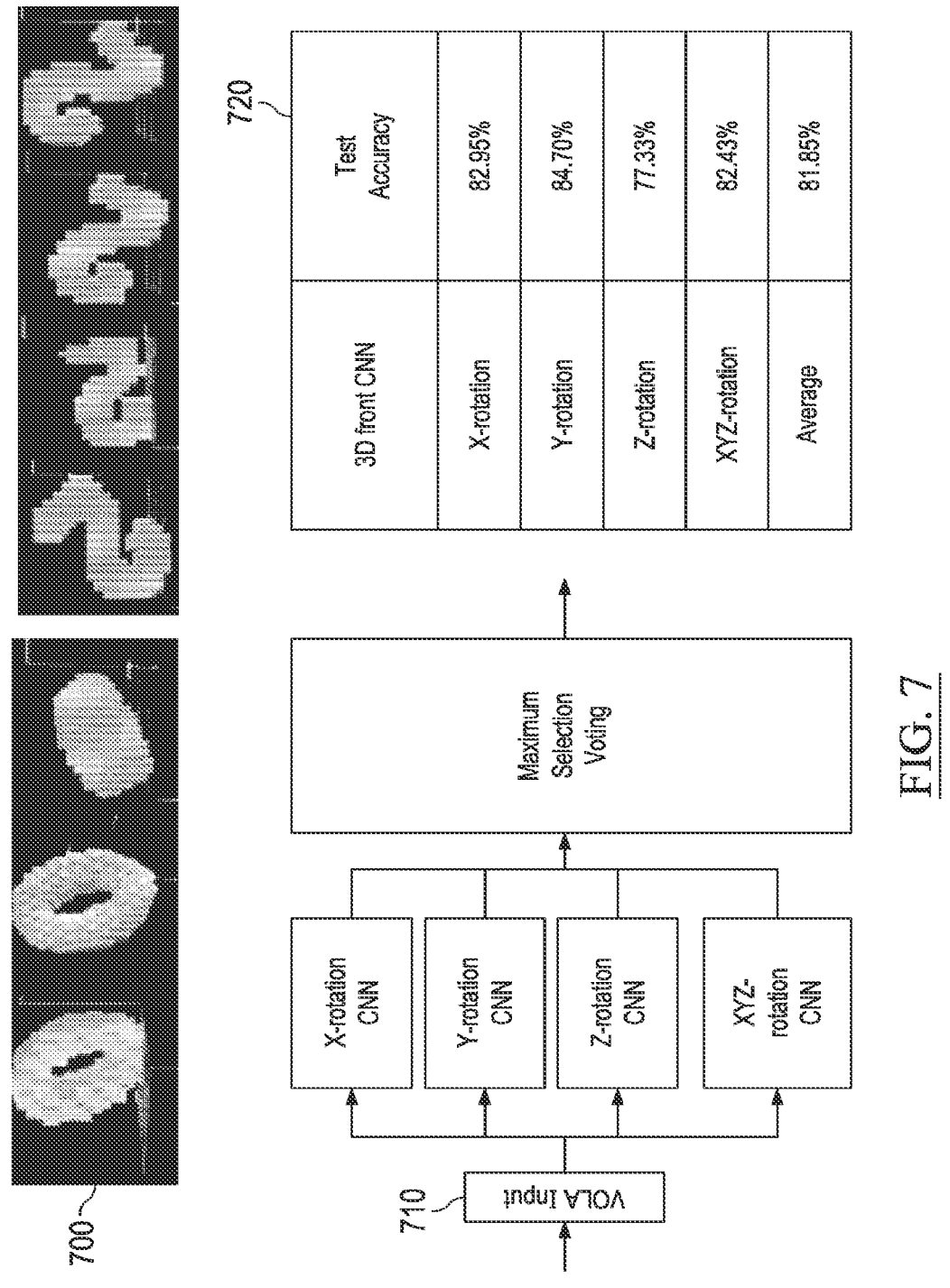
FIG. 7 illustrates an example network used to recognize 3D digits in accordance with some embodiments.

Turning to the simplified block diagram of FIG. 7, an example network is illustrated including systems equipped with functionality to recognize 3D digits in accordance with at least some embodiments. For instance, one of the applications shown in FIG. 6 is the volumetric CNN application 605, which is described in more detail in FIG. 7 where an example network is used to recognize 3D digits 700 generated from a data set, such as the Mixed National Institute of Standards and Technology (MNIST) dataset. Digits within such a data set may be used to train a CNN based convolutional network classifier 710 by applying appropriate rotations and translations in X, Y and Z to the digits before training. When used for inference in an embedded device, the trained network 710 can be used to classify 3D digits in the scene with high accuracy even where the digits are subject to rotations and translations in X, Y and Z 720, among other examples. In some implementations, the operation of the CNN classifier can be accelerated by the HW CNN accelerator 207 shown in FIG. 2. As the first layer of the neural network performs multiplications using the voxels in the volumetric representation 602, these arithmetic operations can be skipped as multiplication by zero is always zero and multiplication by a data value A by one (voxel) is equal to A.

Figure 8:
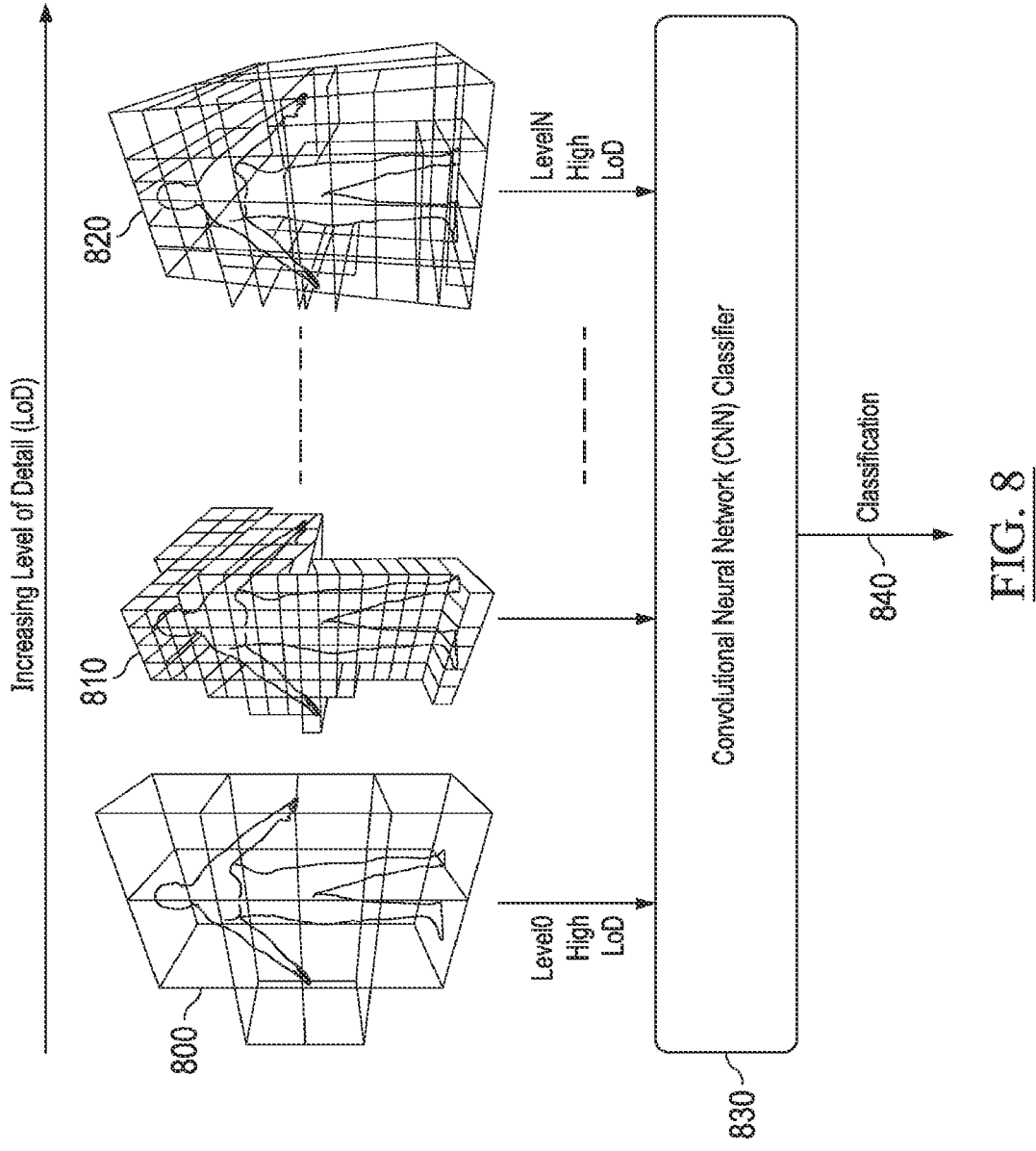
FIG. 8 illustrates multiple classifications performed on the same data structure using implicit levels of detail in accordance with some embodiments.

FIG. 8 illustrates multiple classifications performed on the same data structure using implicit levels of detail. A further refinement of the CNN classification using volumetric representation 602 may be that, as the octree representation contains multiple levels of detail implicitly in the octree structure as shown in FIG. 5, multiple classifications can be performed on the same data structure using the implicit levels of detail 800, 810 and 820 in parallel using a single classifier 830 or multiple classifiers in parallel, such as shown in FIG. 8. In traditional systems, comparable parallel classification may be slow due to the required image resizing between classification passes. Such resizing may be foregone in implementations applying the voxel structures discussed herein, as the same octree may contain the same information at multiple levels of detail. Indeed, a single training dataset based on volumetric models can cover all of the levels of detail rather than resized training datasets, such as would be required in conventional CNN networks.

Turning to the example of FIG. 9, an example operation elimination is illustrated by 2D CNNs in accordance with some embodiments. Operation elimination can be used on 3D volumetric CNNs, as well as on 2D CNNs, such as shown in FIG. 9. For instance, in FIG. 9, in a first layer, a bitmap mask 900 can be used to describe the expected "shape" of the input 910 and may be applied to an incoming video stream 920. In one example, operation elimination can be used not only on 3D volumetric CNNs, but also on 2D volumetric CNNs. For instance, in a 2D CNN of the example of FIG. 9, a bitmap mask 900 may be applied to a first layer of the CNN to describe the expected "shape" of the input 910 and may be applied to input data of the CNN, such as an incoming video stream 820. As an example, the effect of applying bitmap masks to images of pedestrians for training or inference in CNN networks is shown in FIG. 9 where 901 represents an original image of a pedestrian 901, with 903 representing the corresponding version with bitmap mask applied. Similarly, an image containing no pedestrian is shown in 902 and the corresponding bitmap masked version in 904. The same method can be applied to any kind of 2D or 3D object in order to reduce the number of operations required for CNN training or inference through knowledge of the expected 2D or 3D geometry expected by the detector. An example of a 3D volumetric bitmap is shown in 911. The use of 2D bitmaps for inference in a real scene is shown in 920.

In the example implementation of FIG. 9, a conceptual bitmap is shown (at 900) while the real bitmap is generated by averaging a series of training images for a particular class of object 910. The example shown is two dimensional, however similar bitmap masks can also be generated for 3D objects in the proposed volumetric data format with one bit per voxel. Indeed the method could also potentially be extended to specify expected color range or other characteristics of the 2D or 3D object using additional bits per voxel/pixel, among other example implementations.

FIG. 10 is a table illustrating results of an example experiment involving the analysis of 10,000 CIFAR-10 test images in accordance with some embodiments. In some implementations, operation elimination can be used to eliminate intermediate calculations in 1D, 2D, and 3D CNNs due to Rectified Linear Unit (ReLU) operations which are frequent in CNN networks such as LeNet 1000, shown in FIG. 10. As shown in FIG. 10, in an experiment using 10,000 CIFAR-10 test images, the percentage of data-dependent zeroes generated by the ReLU units may reach up to 85%, meaning that in the case of zeroes, a system may be provided that recognizes the zeros and, in response, does not fetch corresponding data and perform corresponding multiplication operations. In this example, the 85% represents the percentage of ReLU dynamic zeros generated from the Modified National Institute of Standards and Technology database (MNIST) test dataset. The corresponding operation eliminations corresponding to these zero may serve to reduce power dissipation and memory bandwidth requirements, among other example benefits.

Trivial operations may be culled based on a bitmap. For instance, the use of such a bitmap may be according to the principles and embodiments discussed and illustrated in U.S. Pat. No. 8,713,080, titled "Circuit for compressing data and a processor employing the same," which is incorporated by reference herein in its entirety. Some implementations, may provide hardware capable of using such bitmaps, such as systems, circuitry, and other implementations discussed and illustrated in U.S. Pat. No. 9,104,633, titled "Hardware for performing arithmetic operations," which is also incorporated by reference herein in its entirety.

Figure 11:
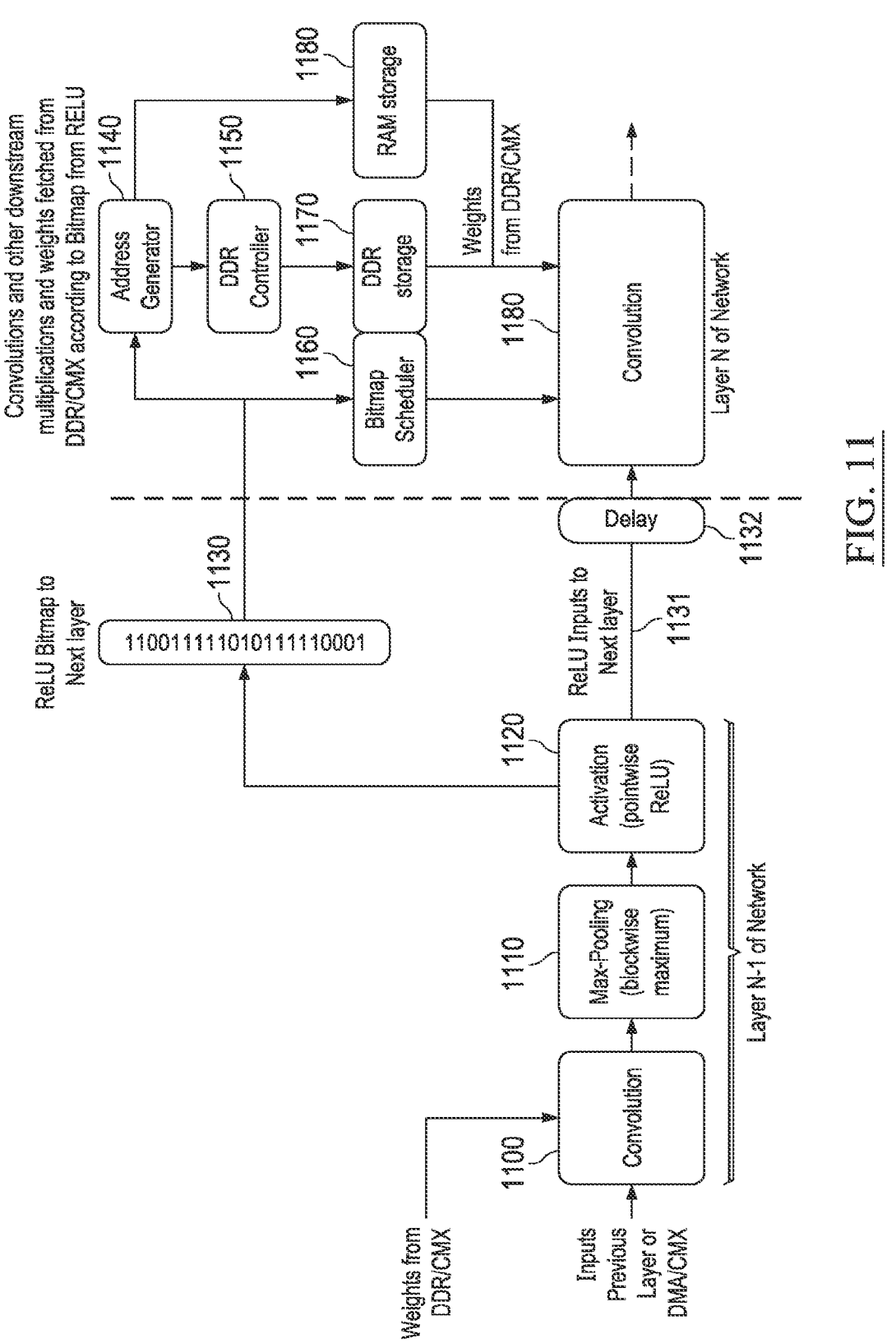
FIG. 11 illustrates hardware for culling operations in accordance with some embodiments.

FIG. 11 illustrates hardware that may be incorporated into a system to provide functionality for culling trivial operations based on a bitmap in accordance with some embodiments. In this example, a multi-layer neural network is provided, which includes repeated convolutional layers. The hardware may include one or more processors, one or more microprocessors, one or more circuits, one or more computers, and the like. In this particular example, a neural network includes an initial convolutional processing layer 1100, followed by pooling processing 1110, and finally an activation function processing, such as rectified linear unit (ReLU) function 1120. The output of the ReLU unit 1120, which provides ReLU output vector 1131, may be connected to a following convolutional processing layer 1180 (e.g., possibly via delay 1132), which receives ReLU output vector 1131. In one example implementation, a ReLU bitmap 1130 may also be generated in parallel with the connection of the ReLU unit 1120 to the following convolution unit 1180, the ReLU bitmap 1130 denoting which elements in the ReLU output vector 1131 are zeroes and which are non-zeroes.

In one implementation, a bitmap (e.g., 1130) may be generated or otherwise provided to inform enabled hardware of opportunities to eliminate operations involved in calculations of the neural network. For instance, the bits in the ReLU bitmap 1130 may be interpreted by a bitmap scheduler 1160, which instructs the multipliers in the following convolutional unit 1180 to skip zero entries of the ReLU output vector 1131 where there are corresponding binary zeroes in the ReLU bitmap 1130, given that multiplication by zero will always produce zero as an output. In parallel, memory fetches from the address generator 1140 for data/weights corresponding to zeroes in the ReLU bitmap 1130 may also be skipped as there is little value in fetching weights that are going to be skipped by the following convolution unit 1180. If weights are to be fetched from an attached DDR DRAM storage device 1170 via a DDR controller 1150, the latency may be so high that it is only possible to save some on-chip bandwidth and related power dissipation. On the other hand, if weights are fetched from on-chip RAM 1180 storage, it may be possible to bypass/skip the entire weight fetch operation, particularly if a delay corresponding to the RAM/DDR fetch delay 1132 is added at the input to the following convolution unit 1180.

Figure 12:
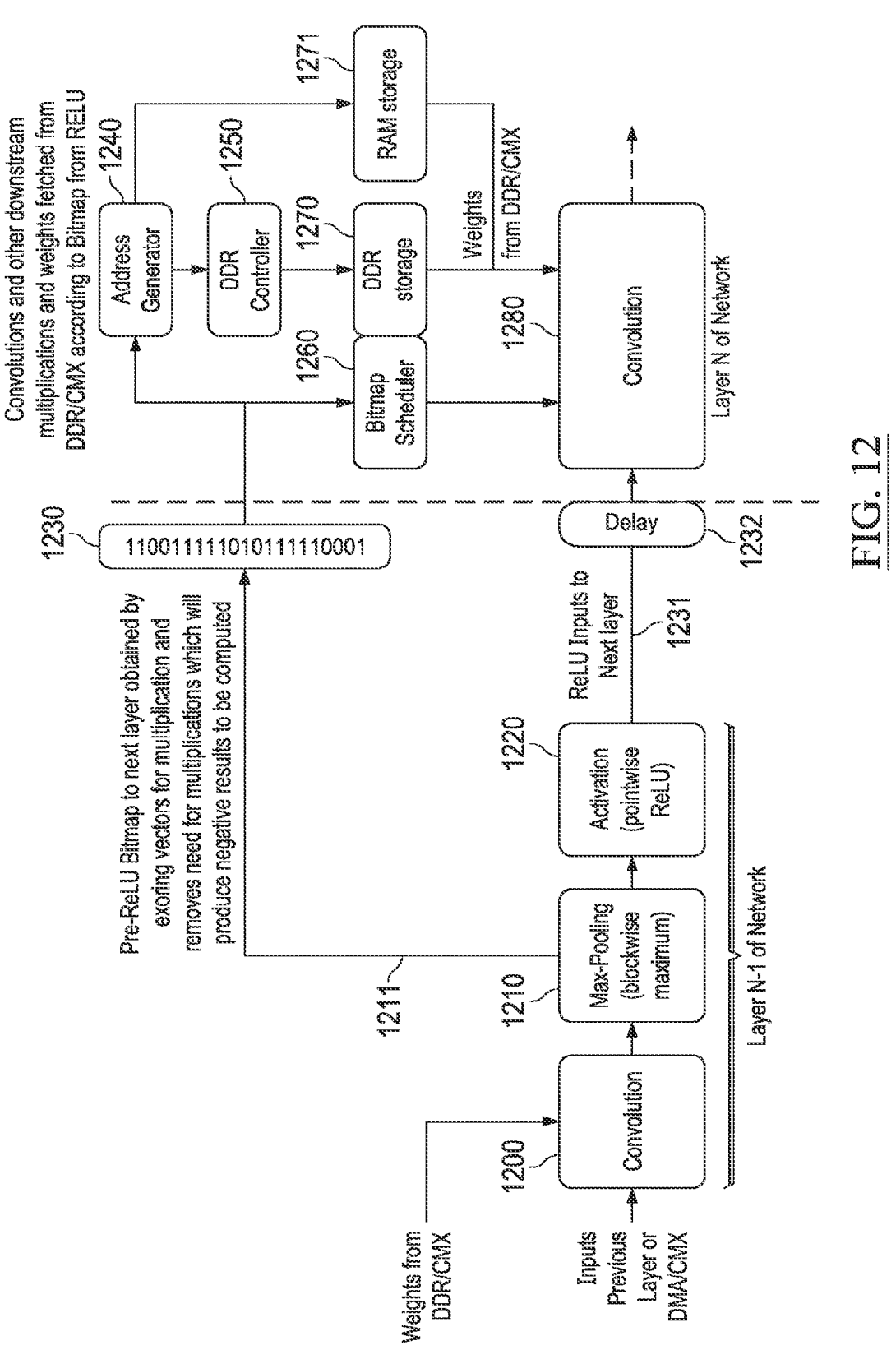
FIG. 12 illustrates a refinement to the hardware for culling operations in accordance with some embodiments.

Turning to FIG. 12, a simplified block diagram is presented to illustrate a refinement to example hardware equipped with circuitry and other logic for culling trivial operations (or performing operation elimination) in accordance with some embodiments. As shown in the example of FIG. 12, additional hardware logic may be provided to predict the sign of the ReLU unit 1220 input in advance from the preceding Max-Pooling unit 1210 or convolution unit 1200. Adding sign-prediction and ReLU bitmap generation to the Max-pooling unit 1210 may allow the ReLU bitmap information to be predicted earlier from a timing point of view to cover delays that may occur through the address generator 1240, through external DDR controller 1250 and DDR storage 1270 or internal RAM storage 1271. If the delay is sufficiently low, the ReLU bitmap can be interpreted in the address generator 1240 and memory fetches associated with ReLU bitmap zeroes can be skipped completely, because the results of the fetch from memory can be determined never to be used. This modification to the scheme of FIG. 11 can save additional power and may also allow the removal of the delay stage (e.g., 1132, 1232) at the input to the following convolution unit 1280 if the delays through the DDR access path (e.g., 1240 to 1250 to 1270) or RAM access path (e.g., 1240 to 1271) are sufficiently low so as not to warrant a delay stage 1232, among other example features and functionality.

Figure 13:
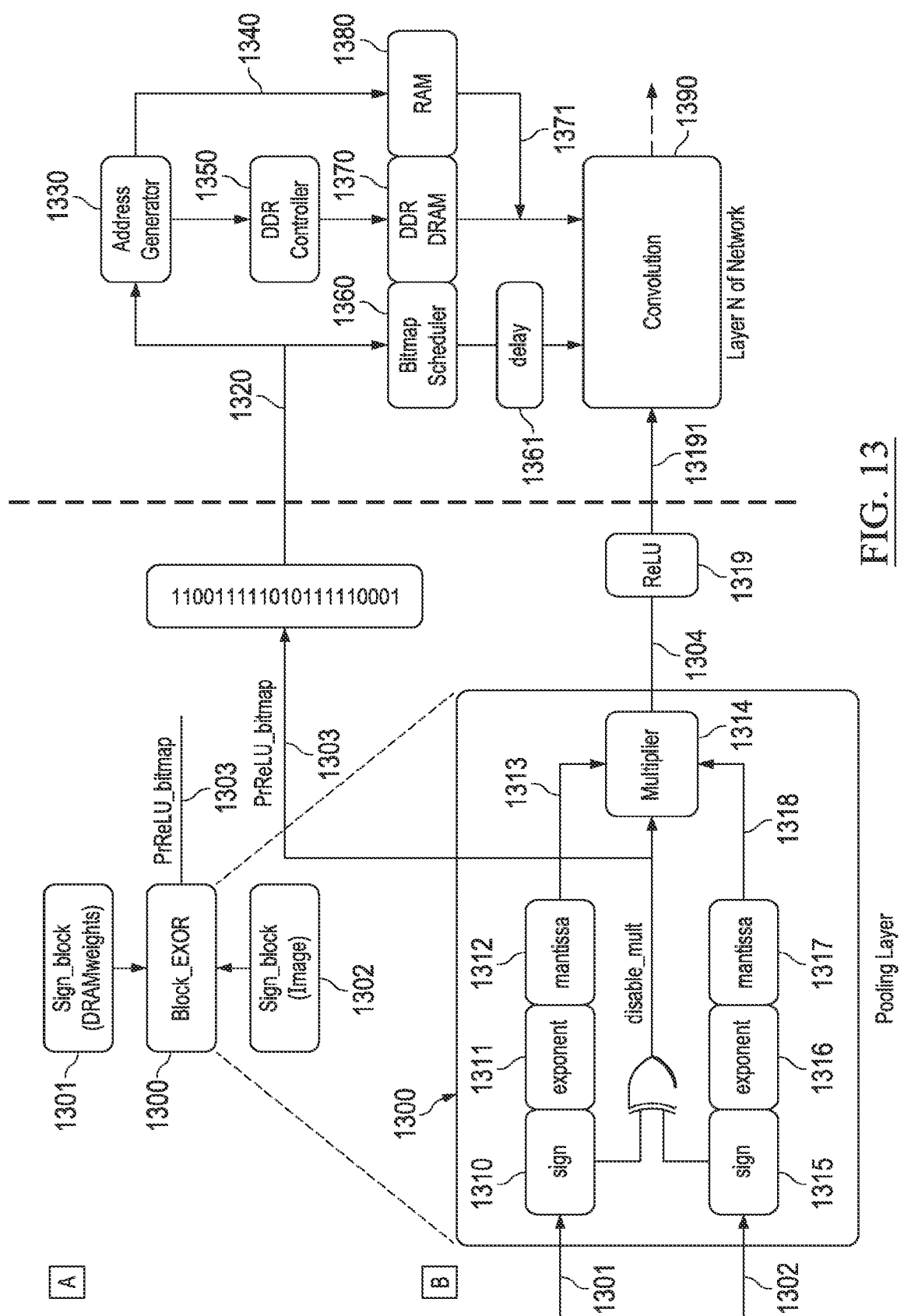
FIG. 13 illustrates hardware in accordance with some embodiments.

FIG. 13 is another simplified block diagram illustrating example hardware in accordance with some embodiments. For instance, CNN ReLU layers can produce high numbers of output zeroes corresponding to negative inputs. Indeed, negative ReLU inputs can be predictively determined by looking at the sign input(s) to the previous layers (e.g., the pooling layer in the example of FIG. 13). Floating-point and integer arithmetic can be explicitly signed in terms of the most significant bit (MSB) so a simple bit-wise exclusive OR (XOR) operation across vectors of inputs to be multiplied in a convolution layer can predict which multiplications will produce output zeroes, such as shown in FIG. 13. The resulting sign-predicted ReLU bitmap vector can be used as a basis for determining a subset of multiplications and associated coefficient reads from memory to eliminate, such as in the manner described in other examples above.

Providing for the generation of ReLU bitmaps back into the previous pooling or convolutional stages (i.e., stages before the corresponding ReLU stage) may result in additional power. For instance, sign-prediction logic may be provided to disable multipliers when they will produce a negative output that will be ultimately set to zero by the ReLU activation logic. For instance, this is shown where the two sign bits 1310 and 1315 of the multiplier 1314 inputs 1301 and 1302 are logically combined by an XOR gate to form a PreReLU bitmap bit 1303. This same signal can be used to disable the operation of the multiplier 1314, which would otherwise needlessly expend energy generating a negative output which would be set to zero by the ReLU logic before being input for multiplication in the next convolution stage 1390, among other examples.

Note that the representation of 1300, 1301, 1302, and 1303 (notation A) shows a higher level view of that shown in the representation donated B in FIG. 13. In this example, the input to block 1302 may include two floating-point operand. Input 1301 may include an explicit sign-bit 1310, a Mantissa 1311 including a plurality of bits, and an exponent again including a plurality of bits 1312. Similarly, input 1302 may likewise include a sign 1315, mantissa 1317, and exponent 1316. In some implementations, the mantissas, and exponents may have different precisions, as the sign of the result 1303 depends solely upon the signs of 1301 and 1302, or 1310 and 1315 respectively. In fact, neither 1301 nor 1302 need be floating point numbers, but can be in any integer or fixed point format as long as they are signed numbers and the most significant bit (MSB) is effectively the sign bit either explicitly or implicitly (e.g., if the numbers are one- or twos-complement, etc.).

Continuing with the example of FIG. 13, the two sign inputs 1310 and 1315 may be combined using an XOR (sometimes denoted alternatively herein as ExOR or EXOR) gate to generate a bitmap bit 1303, which may then be processed using hardware to identify down-stream multiplications that may be omitted in the next convolution block (e.g., 1390). The same XOR output 1303 can also be used to disable the multiplier 1314 in the event that the two input numbers 1313 (e.g., corresponding to 1301) and 1318 (e.g., corresponding to 1302) have opposite signs and will produce a negative output 1304 which would be set to zero by the ReLU block 1319 resulting in a zero value in the RELU output vector 13191 which is to be input to the following convolution stage 1390. Accordingly, in some implementations, the PreReLU bitmap 1320 may, in parallel, be transmitted to the bitmap scheduler 1360, which may schedules the multiplications to run (and/or omit) on the convolution unit 1390. For instance, for every zero in the bitmap 1320, a corresponding convolution operation may be skipped in the convolution unit 1390. In parallel, the bitmap 1320 may be consumed by an example address generator 1330, which controls the fetching of weights for use in the convolution unit 1390. A list of addresses corresponding to 1$s$ in the bitmap 1320 may be compiled in the address generator 1330 and controls either the path to DDR storage 1370 via the DDR controller 1350, or else controls the path to on chip RAM 1380. In either case, the weights corresponding to ones in the PreReLU bitmap 1320 may be fetched and presented (e.g., after some latency in terms of clock cycles to the weight input 1371) to the convolution block 1390, while fetches of weights corresponding to zeros may be omitted, among other examples.

As noted above, in some implementations, a delay (e.g., 1361) may be interposed between the bitmap scheduler 1360 and the convolution unit 1390 to balance the delay through the address generator 1330, DDR controller 1350, and DDR 1350, or the path through address generator 1330 and internal RAM 1380. The delay may enable convolutions driven by the bitmap scheduler to line up correctly in time with the corresponding weights for the convolution calculations in the convolution unit 1390. Indeed, from a timing point of view, generating a ReLU bitmap earlier than at the output of the ReLU block 1319 can allow additional time to be gained, which may be used to intercept reads to memory (e.g., RAM 1380 or DDR 1370) before they are generated by the address generator 1330, such that some of the reads (e.g., corresponding to zeros) may be foregone. As memory reads may be much higher than logical operations on chip, excluding such memory fetches may result in very significant energy savings, among other example advantages.

In some implementations, if there is still insufficient saving in terms of clock cycles to cover the DRAM access times, a block oriented technique may be used to read groups of sign-bits (e.g., 1301) from DDR ahead of time. These groups of sign bits may be used along with blocks of signs from the input images or intermediate convolutional layers 1302 in order to generate blocks of PreReLU bitmaps using a set of (multiple) XOR gates 1300 (e.g., to calculate the differences between sign bits in a 2D or 3D convolution between 2D or 3D arrays/matrices, among other examples). In such an implementation, an additional 1-bit of storage in DDR or on-chip RAM may be provided to store the signs of each weight, but this may allow many cycles of latency to be covered in such a way as to avoid ever reading weights from DDR or RAM that are going to be multiplied by zero from a ReLU stage. In some implementations, the additional 1-bit of storage per weight in DDR or on-chip RAM can be avoided as signs are stored in such a way that they are independently addressable from exponents and mantissas, among other example considerations and implementations.

In some implementations, it may be particularly difficult to access readily available training sets to train machine learning models, including models such as discussed above. Indeed, in some cases, the training set may not be in existence for a particular machine learning application or corresponding to a type of sensor that is to generate inputs for the to-be-trained model, among other example issues. In some implementations, synthetic training sets may be developed and utilized to train a neural network or other deep reinforcement learning models. For instance, rather than obtaining or capturing a training data set composed of hundreds or thousands of images of a particular person, animal, object, product, etc., a synthetic 3D representation of the subject may be generated, either manually (e.g., using graphic design or 3D photo editing tools) or automatically (e.g., using a 3D scanner), and the resulting 3D model may be used as the basis for automatically generating training data relating to the subject of the 3D model. This training data may be combined with other training data to form a training data set at least partially composed of synthetic training data, and the training data set may be utilized to train one or more machine learning models.

As an example, a deep reinforcement learning model or other machine learning model, such as introduced herein, may be used to allow an autonomous machine to scan shelves of a store, warehouse, or another business to assess the availability of certain products within the store. Accordingly, the machine learning model may be trained to allow the autonomous machine to detect individual products. In some cases, the machine learning model may not only identify what products are on the shelves, but may also identify how many products are on the shelves (e.g., using a depth model). Rather than training the machine learning model with a series of real world images (e.g., from the same or a different store) for each and every product that the store may carry, and each and every configuration of the product (e.g., each pose or view (full and partial) of the product on various displays, in various lighting, views of various orientations of the product packaging, etc.), a synthetic 3D model of each product (or at least some of the products) may be generated (e.g., by the provider of the product, the provider of the machine learning model, or another source). The 3D model may be at or near photo realistic quality in its detail and resolution. The 3D model may be provided for consumption, along with other 3D models, to generate a variety of different views of a given subject (e.g., product) or even a collection of different subjects (e.g., a collection of products on a store shelves with varying combinations of products positioned next to each other, at different orientations, in different lighting, etc.) to generate a synthetic set of training data images, among other example applications.

Figure 14:
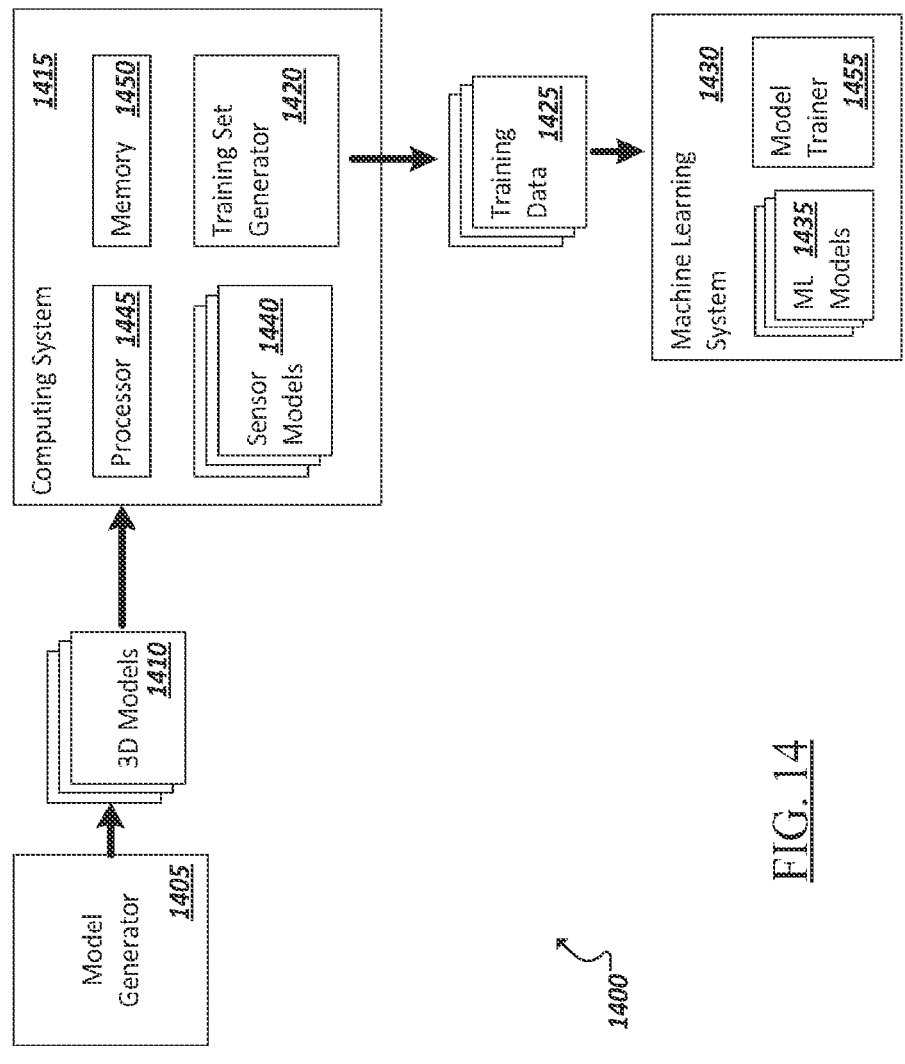
FIG. 14 illustrates an example system employing an example training set generator in accordance with at least some embodiments.

Turning to FIG. 14, a simplified block diagram 1400 is shown of an example computing system (e.g., 1415) implementing a training set generator 1420 to generate synthetic training data for use by a machine learning system 1430 to train one or more machine learning models (e.g., 1435) (such as deep reinforcement learning models, Siamese neural networks, convolutional neural networks, and other artificial neural networks). For instance, a 3D scanner 1405 or other tool may be used to generate a set of 3D models 1410 (e.g., of persons, interior and/or exterior architecture, landscape elements, products, furniture, transportation elements (e.g., road signs, automobiles, traffic hazards, etc.), and other examples) and these 3D models 1410 may be consumed by provided as an input a training set generator 1420. In some implementations, a training data generator 1420 may automatically render, from the 3D models 1410, a set of training images, point clouds, depth maps, or other training data 1425 from the 3D models 1410. For instance, the training set generator 1420 may be programmatically configured to automatically tilt, rotate, and zoom a 3D model and capture a collection of images of the 3D model in the resulting different orientations and poses, as well as in different (e.g., computer simulated) lighting, with all or a portion of the entire 3D model subject captured in the image, and so on, to capture a number and variety of images to satisfy a "complete" and diverse collection of images to capture the subject.

In some implementations, synthetic training images generated from a 3D model may possess photorealistic resolution that is comparable to the real-life subject(s) upon which they are based. In some cases, the training set generator 1420 may be configurable to automatically render or produce images or other training data from the 3D model in a manner that deliberately downgrades the resolution and quality of the resulting images (as compared with the high resolution 3D model). For instance, image quality may be degraded by adding noise, applying filters (e.g., Gaussian filters), and adjusting one or more rendering parameters to introduce noise, decrease contrast, decrease resolution, change brightness levels, among other adjustments to bring the images to a level of quality comparable with those that may be generated by sensors (e.g., 3D scanners, cameras, etc.), which are expected to provide inputs to the machine learning model to be trained.

When constructing a data set specifically for training deep neural networks, a number of different conditions or rules may be defined and considered by a training set generator system. For instance, CNNs traditionally require a large amount of data for training to produce accurate results. Synthetic data can circumvent instances where available training data sets are too small. Accordingly, a target number of training data samples may be identified for a particular machine learning model and the training set generator may base the amount and type of training samples generated to satisfy the desired amount of training samples. Further, conditions may be designed and considered by the training set generator to generate a set with more than a threshold amount of variance in the samples. This is to minimize over-fitting of machine learning models and provide the necessary generalization to perform well under a large number of highly varied scenarios. Such variance may be achieved through adjustable parameters applied by the training set generators, such as the camera angle, camera height, field of view, lighting conditions, etc. used to generate individual samples from a 3D model, among other examples.

In some implementations, sensor models (e.g., 1440) may be provided, which define aspects of a particular type or model of sensor (e.g., a particular 2D or 3D camera, a LIDAR sensor, etc.), with the model 1440 defining filters and other modifications to be made to a raw image, point cloud, or other training data (e.g., generated from a 3D model) to simulate data as generated by the modeled sensor (e.g., the resolution, susceptibility to glare, sensitivity to light/darkness, susceptibility to noise, etc.). In such instances, the training set generator may artificially degrade the samples generated from a 3D model to mimic an equivalent image or sample generated by the modeled sensor. In this manner, samples in the synthetic training data may be generated that are comparable in quality with the data that is to be input to the trained machine learning model (e.g., as generated by the real-world version of the sensor (s)).

Figure 15:
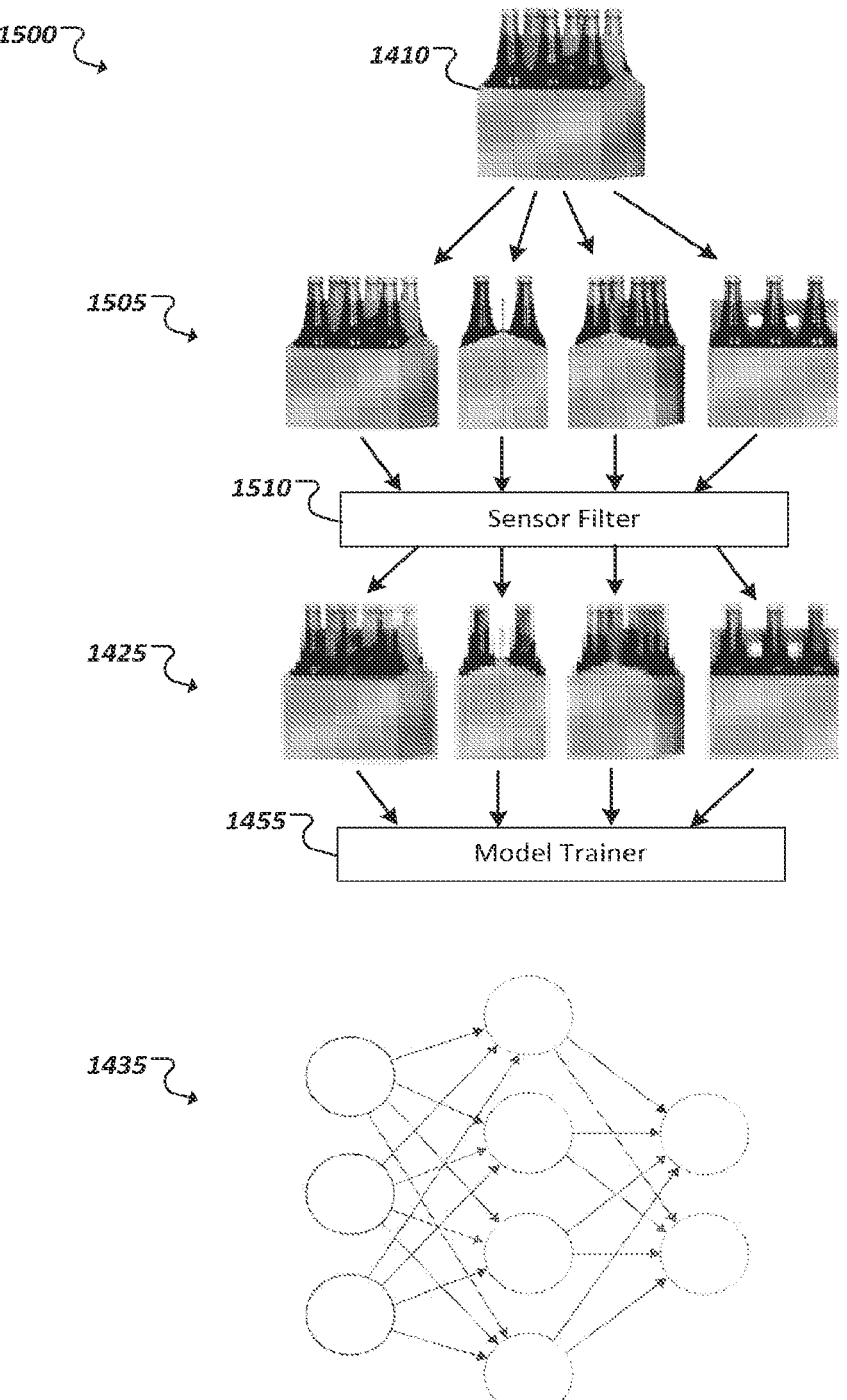
FIG. 15 illustrates an example generation of synthetic training data in accordance with at least some embodiments.

Turning to FIG. 15, a block diagram 1500 is shown illustrating example generation of synthetic training data. For instance, a 3D model 1410 may be generated of a particular subject. The 3D model may be a life-like or photorealistic representation of the subject. In the example of FIG. 15, the model 1410 represents a cardboard package containing a set of glass bottles. A collection of images (e.g.,

1505) may be generated based on the 3D model 1410, capturing a variety of views of the 3D model 1410, including views of the 3D model in varied lighting, environments, conditions (e.g., in use/at rest, opened/closed, damaged, etc.). The collection of images 1505 may be processed using a sensor filter (e.g., defined in a sensor model) of an example training data generator. Processing of the images 1505 may cause the images 1505 to be modified to degrade the images 1505 to generate "true to life" images 1425, which mimic the quality and features of images had they been captured using a real-life sensor.

In some implementations, to assist in generating a degraded version of a synthetic training data sample, a model (e.g., 1410) may include metadata to indicate materials and other characteristics of the subject of the model. The characteristics of the subject defined in the model may be considered, in such implementations, by a training data generator (e.g., in combination with a sensor model) to determine how a real-life image (or point cloud) would likely be generated by a particular sensor given the lighting, the position of the sensor relative to the modeled subject, the characteristics (e.g., the material(s)) of the subject, among other considerations. For instance, the model 1410 in the particular example of FIG. 15, modeling a package of bottles, may include metadata to define what portions (e.g., which pixels or polygons) of the 3D model correspond to a glass material (the bottles) and which correspond to cardboard (the package). Accordingly, when a training data generator generates synthetic images and applies sensor filtering 1510 to the images 1505 (e.g., to model the manner in which light reflects off of various surfaces of the 3D model) the modeled sensor's reaction to these characteristics may be more realistically applied to generate believable training data that are more in line with what would be created by the actual sensor should it be used to generate the training data. For instance, materials modeled in the 3D model may allow training data images to be generated that model the susceptibility of the sensor to generate an image with glare, noise, or other imperfections corresponding, for instance, to the reflections off of the bottles' glass surfaces in the example of FIG. 15, but with less noise or glare corresponding to the cardboard surfaces that are not as reflective. Similarly, material types, temperature, and other characteristics modeled in the 3D model representation of a subject may have different effects for different sensors (e.g., camera sensors vs. LIDAR sensors). Accordingly, an example test data generator system may consider both the metadata of the 3D model as well as a specific sensor model in automatically determining which filters or treatments to apply to images 1505 in order to generate degraded versions (e.g., 1425) of the images that simulate versions of the images as would likely be generated by a real-world sensor.

Additionally, in some implementations, further post-processing of images 1505 may include depth of field adjustments. In some 3D rendering programs, the virtual camera used in software is perfect and can capture objects both near and far, perfectly in focus. However, this may not be true for a real-world camera or sensor (and may be so defined within the attributes of a corresponding sensor model used by the training set generator). Accordingly, in some implementations, a depth of field effect may be applied on the image during post-processing (e.g., with the training set generator automatically identifying and selecting a point for which the camera is to focus on the background and cause features of the modeled subject to appear out of focus thereby creating an instance of a flawed, but more photo-realistic image (e.g., 1425). Additional post processing may involve adding noise onto the image to simulate the noisy artefacts that are present in photography. For instance, the training set generator may include adding noise by limiting the number of light bounces a ray-tracing algorithm calculates on the objects, among other example techniques. Additionally, slight pixelization may be applied on top of the rendered models in an effort to remove any overly or unrealistically smooth edges or surfaces that occur as a result of the synthetic process. For instance, a light blur layer may be added to average out the "blocks" of pixels, which in combination with other post-processing operations (e.g., based on a corresponding sensor model) may result in more realistic, synthetic training samples.

As shown in FIG. 15, upon generating training data samples (e.g., 1425) from an example 3D model 1410, the samples (e.g., images, point clouds, etc.) may be added to or included with other real or synthetically-generated training samples to build a training data set for a deep learning model (e.g., 1435). As is also shown in the example of FIG. 14, a model trainer 1455 (e.g., of an example machine learning system 1430) may be used to train one or more machine learning models 1435. In some cases, synthetic depth images may be generated from the 3D model(s). The trained machine learning models 1435 may then be used by an autonomous machine to perform various tasks, such as object recognition, automated inventory processing, navigation, among other examples.

In the example of FIG. 14, a computing system 1415 implementing an example training set generator 1420 may include one or more data processing apparatus 1445, one or more computer-readable memory elements 1450, and logic implemented in hardware and/or software to implement the training set generator 1420. It should be appreciated that while the example of FIG. 14 shows computing system 1415 (and its components) as separate from a machine learning system 1430 used to train and/or execute machine learning models (e.g., 1435), in some implementations, a single computing system may be used to implement the combined functionality of two or more of a model generator 1405, training set generator 1420, and machine learning system 1430, among other alternative implementations and example architectures.

Figure 16:
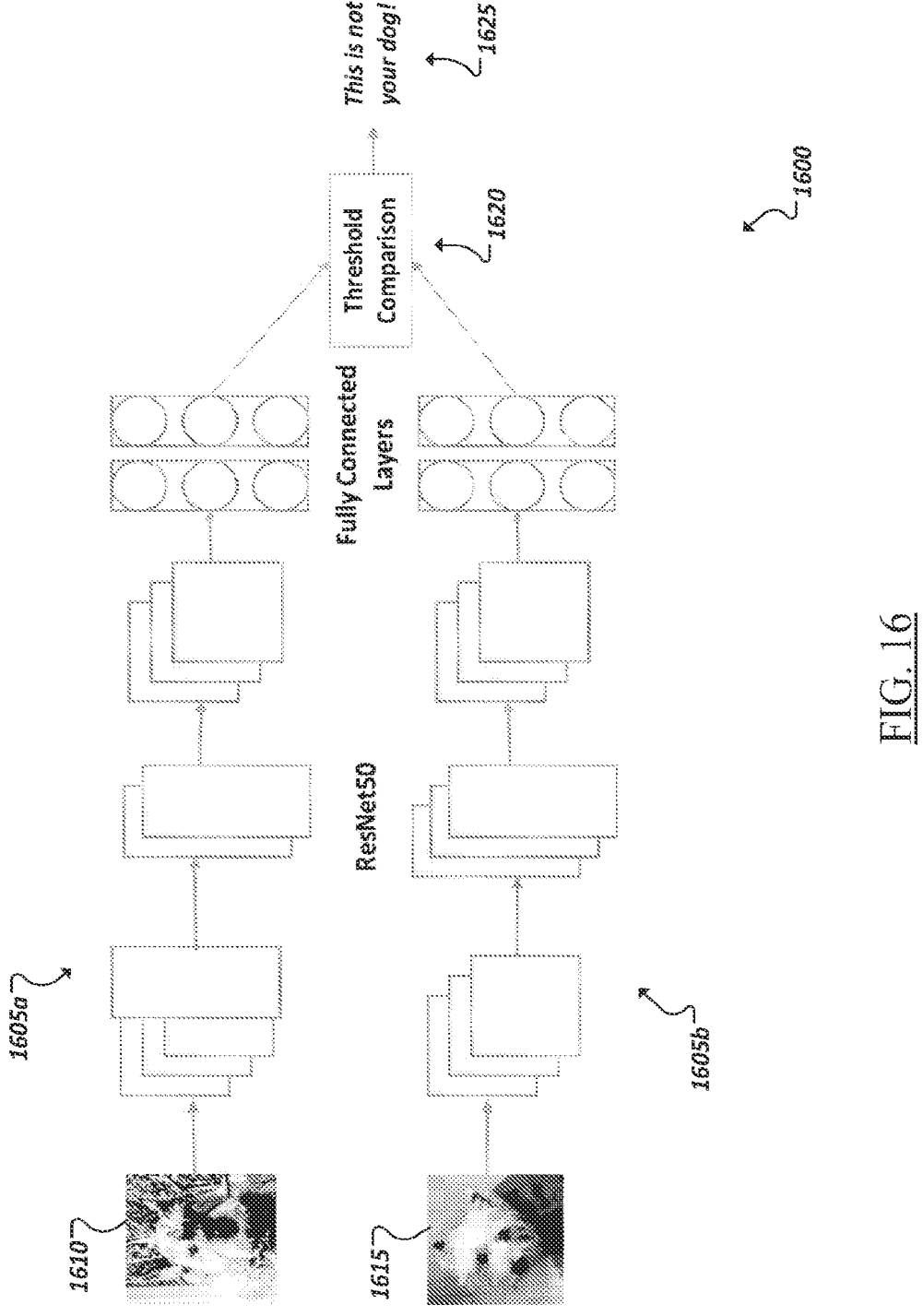
FIG. 16 illustrates an example Siamese network in accordance with at least some embodiments.
Figure 17:
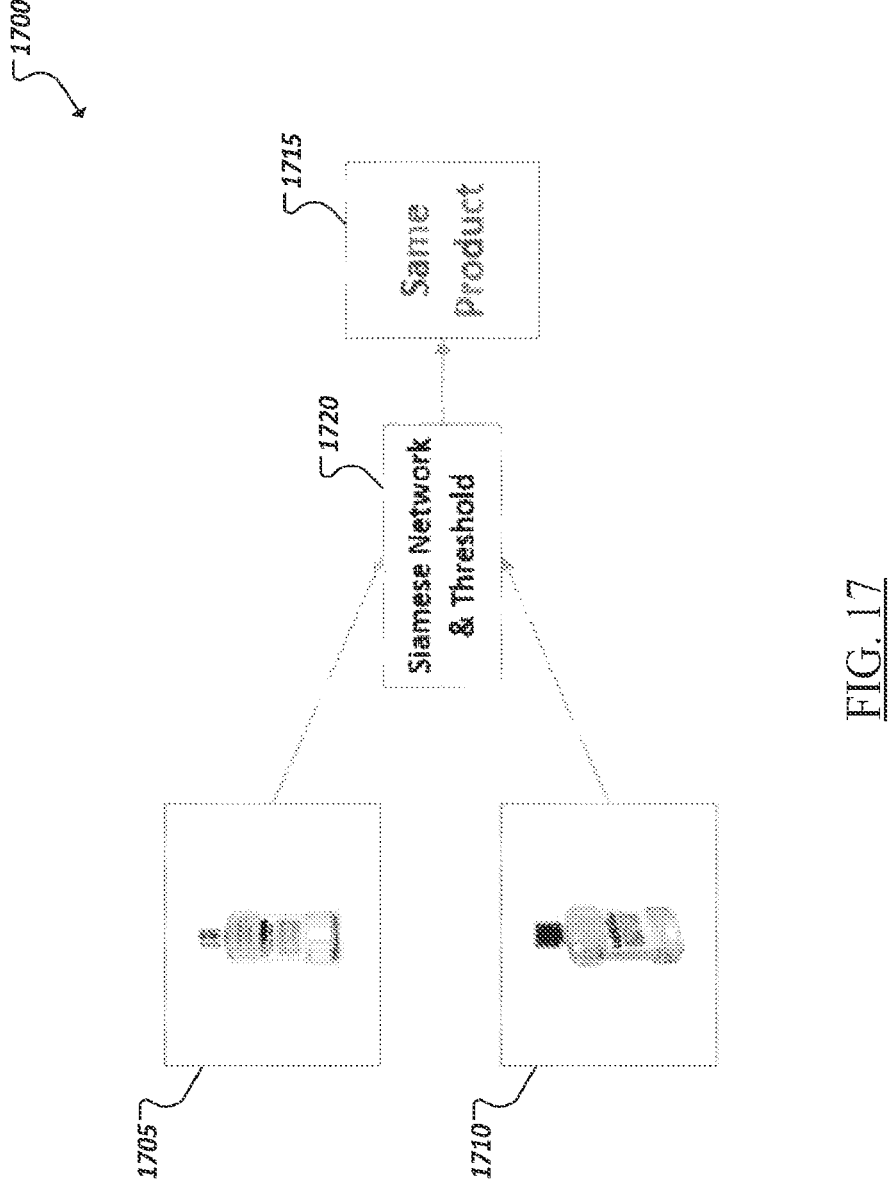
FIG. 17 illustrates example use of a Siamese network to perform an autonomous comparison in accordance with at least some embodiments.

In some implementations, a computing system may be provided that enables one-shot learning using synthetic training data. Such a system may allow object classification without the requirement to train on hundreds of thousands of images. One-shot learning allows classification from very few training images, even, in some cases, a single training image. This saves on time and resources in developing the training set to train a particular machine learning model. In some implementations, such as illustrated in the examples of FIGS. 16 and 17, the machine learning model may be a neural network that learns to differentiate between two inputs rather than a model learning to classify its inputs. The output of such a machine learning model may identify a measure of similarity between two inputs provided to the model.

In some implementations, a machine learning system may be provided, such as in the example of FIG. 14, that may simulate the ability to classify object categories from few training examples. Such a system may also remove the need for the creation of large datasets of multiple classes in order to effectively train the corresponding machine learning model. Likewise, the machine learning model may be selected, which does not require training for multiple classes. The machine learning model may be used to recognize an object (e.g., product, human, animal, or other object) by feeding the model a single image of that object to the system along with a comparison image. If the comparison picture is not recognized by the system, the objects are determined to not match using the machine learning model (e.g., a Siamese network).

In some implementations, a Siamese network may be utilized as the machine learning model trained using the synthetic training data, such as introduced in the examples above. For instance, FIG. 16 shows a simplified block diagram 1600 illustrating an example Siamese network composed of two identical neural networks 1605a, 1605b, with each of the networks having the same weights after training. A comparison block (e.g., 1620) may be provided to evaluate similarity of the outputs of the two identical network and compare the determined degree of similarity against a threshold. If the degree of similarity is within a threshold range (e.g., below or above a given threshold) the output of the Siamese network (composed of the two neural network 1605a, 1605b and comparison block 1620) may indicate (e.g., at 1625) whether two inputs reference a common subject. For instance, two samples 1610, 1615 (e.g., images, point clouds, depth images, etc.) may be provided as respective inputs to each of the two identical neural networks 1605a, 1605b. In one example, the neural networks 205a, 1605b may be implemented as a ResNet-based network (e.g., ResNet50 or another variant) and the output of each network may be a feature vector, which is input to the comparison block 1620. In some implementations, the comparison block may generate a similarity vector from the two feature vector inputs to indicate how similar the two inputs 1610, 1615 are. In some implementations, the inputs (e.g., 1610, 1615) to such a Siamese network implementation may constitute two images that represent an agent's current observation (e.g., the image or depth map generated by the sensors of an autonomous machine) and the target. Deep Siamese networks are a type of two-stream neural network models for discriminative embedding learning, which may enable one-shot learning utilizing synthetic training data. For instance, at least one of the two inputs (e.g., 1610, 1615) may be a synthetically generated training image or reference image, such as discussed above.

In some implementations, execution of the Siamese network or other machine learning model trained using the synthetic data may utilize specialized machine learning hardware, such as a machine learning accelerator (e.g., the Intel Movidius Neural Compute Stick (NCS)), which may interface with a general-purpose microcomputer, among other example implementations. The system may be utilized in a variety of applications. For instance, the network may be utilized in security or authentication applications, such as applications where a human, animal, or vehicle is to be recognized before allowing actuators to be triggered that allow access to the human, animal, or vehicle. As specific examples, a smart door may be provided with image sensors to recognize a human or animal approaching the door and may grant access (using the machine learning model) to only those that match one of a set of authorized users. Such machine learning models (e.g., trained with synthetic data) may also be used in industrial or commercial applications, such as product verification, inventorying, and other applications that make use of product recognition in a store to determine if (or how many) of a product is present or present within a particular position (e.g., on an appropriate shelf), among other examples. For instance, as illustrated in the example illustrated by the simplified block diagram 1700 of FIG. 17, two sample images 1705, 1710 relating to consumer products may be provided as inputs to Siamese network with threshold determination logic 1720. The Siamese network model 1720 may determine whether the two sample images 1705, 1710 are or are not likely images of the same product (at 1715). Indeed, in some implementations, such a Siamese network model 1720 may enable the identification of products at various rotations and occlusions. In some instances, 3D models may be utilized to generate multiple reference images for more complex products and objects for an additional level of verification, among other example considerations and features.

In some implementations, a computing system may be provided with logic and hardware adapted for performing machine learning tasks to perform point cloud registration, or the merging of two or more separate point clouds. To perform the merging of point clouds, a transformation is to be found, which aligns the contents of the point clouds. Such problems are common in applications involving autonomous machines, such as in robotic perception applications, creation of maps for unknown environments, among other use cases.

In some implementations, convolutional networks may be used as a solution to find the relative pose between 2D images, providing comparable results to the traditional featured-based approaches. Advances in 3D scanning technology allow for the further creation of multiple datasets with 3D data useful to train neural networks. In some implementations, a machine learning model may be provided, which may accept a stream of two or more different inputs, each of the two or more data inputs embodying a respective three-dimensional (3D) point cloud. The two 3D point clouds may be representations of the same physical (or virtualized version of a physical) space or object measured from two different, respective poses. The machine learning model may accept these two 3D point cloud inputs and generate, as an output, an indication of the relative or absolute pose between the sources of the two 3D point clouds. The relative pose information may then be used to generate, from multiple snapshots (of 3D point clouds) of an environment (from one or more multiple different sensors and devices (e.g., multiple drones or the same drone moving to scan the environment)), a global 3D point cloud representation of the environment. The relative pose may also be used to compare a 3D point cloud input measured by a particular machine against a previously-generated global 3D point cloud representation of an environment to determine the relative location of the particular machine within the environment, among other example uses.

Figure 18:
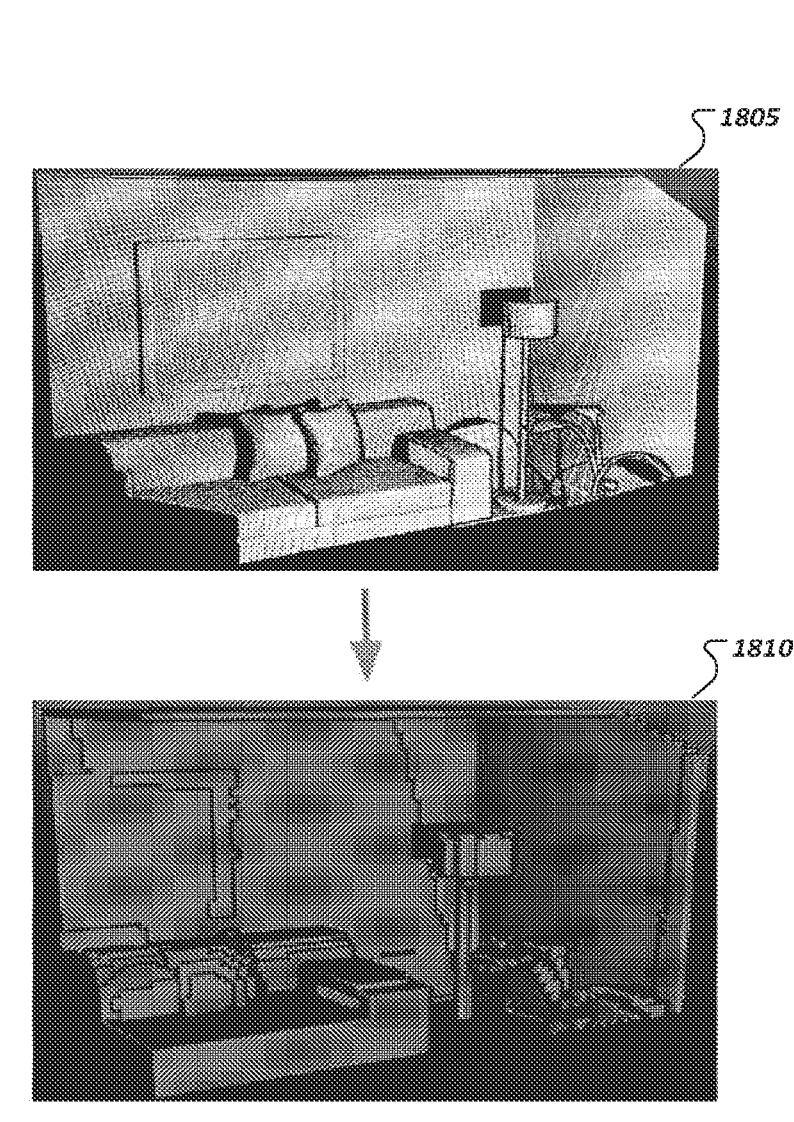
FIG. 18 illustrates an example voxelization of a point cloud in accordance with at least some embodiments.

In one example, a voxelization point cloud processing technique is used, which creates a 3D grid to sort the points, where convolutional layers can be applied, such as illustrated in the example of FIG. 18. In some implementations, the 3D grid or point cloud may be embodied or represented as a voxel-based data structure, such as discussed herein. For instance, in the example of FIG. 18, a voxel-based data structure (represented by 1810) may be generated from a point cloud 1805 generated from an RGB-D camera or LIDAR scan of an example 3D environment. In some implementations, two point cloud inputs that may be provided to a comparative machine learning model, such as one employing a Siamese network, may be a pair of 3D voxel grids (e.g., 1810). In some instances, the two inputs may be first voxelized (and transformed into voxel-based data structure (e.g., 1810)) at any one of multiple, potential voxel resolutions, such as discussed above.

Figure 19:
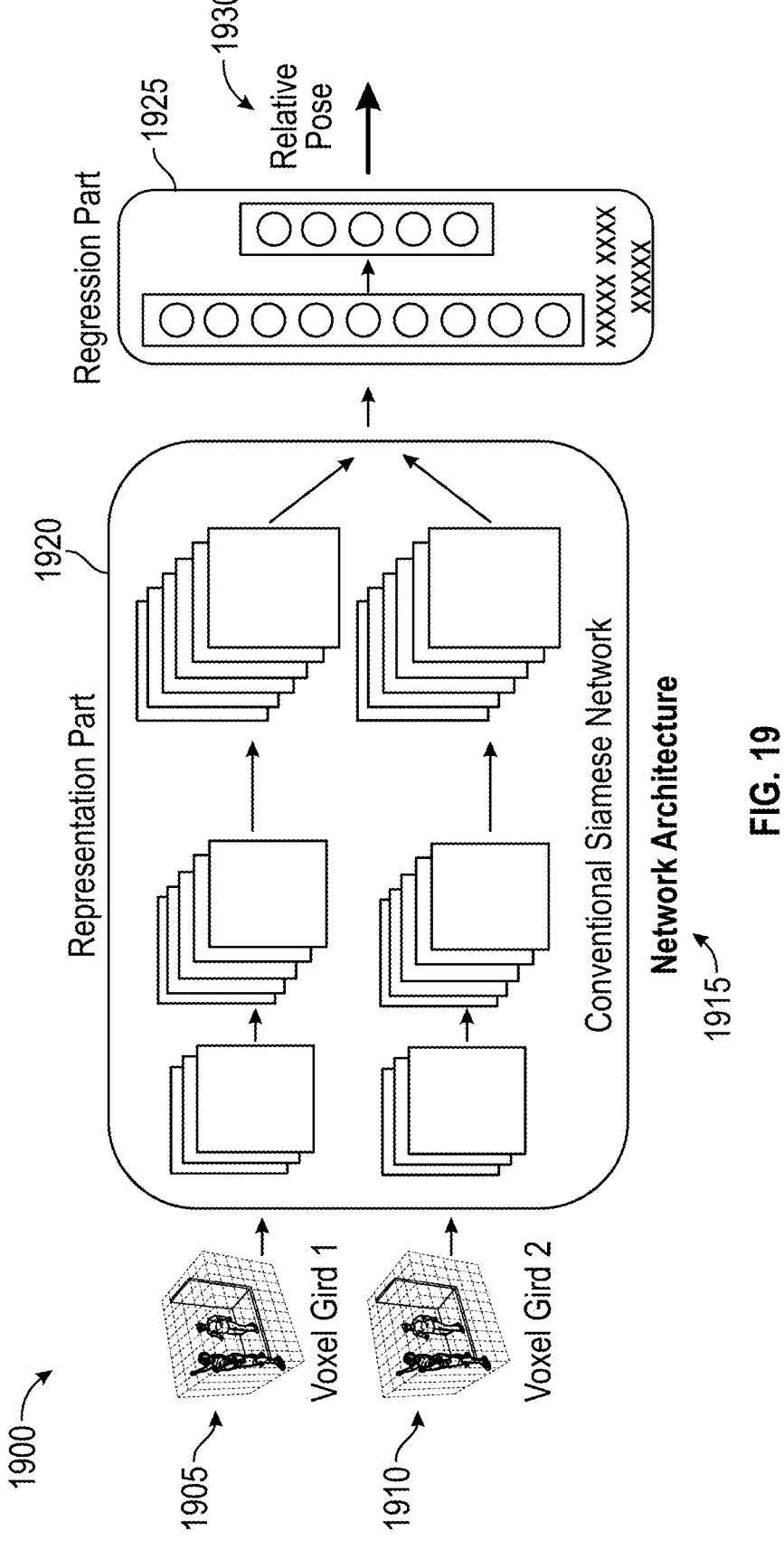
FIG. 19 is a simplified block diagram of an example machine learning model in accordance with at least some embodiments.

In one example, represented by the simplified block diagram 1900 of FIG. 19, the machine learning model may be composed of a representation portion 1920 and a regression portion 1925. As noted above, the Siamese network-based machine learning model may be configured to estimate, from a pair of 3D voxel grid inputs (e.g., 1905, 1910) or other point cloud data, relative camera pose directly. 3D voxel grids may be advantageously used, in some implementations, in a neural network with classical convolutional layers, given the organized structure of the voxel grid data. The relative camera pose determined using the network may be used to merge the corresponding points clouds of the voxel grid inputs.

In some implementations, the representation portion 1920 of the example network may include a Siamese network with shared weights and bias. Each branch (or channel of the Siamese network) is formed by consecutive convolutional layers to extract a feature vector of the respective inputs 1905, 1910. Further, in some implementations, after each convolutional layer, a rectified linear unit (ReLU) may be provided as the activation function. In some cases, pooling layers may be omitted to ensure that the spatial information of the data is preserved. The feature vectors output from the representation portion 1920 of the network may be combined to enter the regression portion 1925. The regression portion 1925 include fully connected sets of layers capable of producing an output 1930 representing the relative pose between the two input point clouds 1905, 1910. In some implementations, the regression portion 1925 may be composed of two full-connected sets of layers, one responsible for generating the rotation value of the pose estimation and the second set of layers responsible for generating the translation value of the pose. In some implementations, the full-connected layers of the regression portion 1925 may be followed by a ReLu activation function (with the exception of the final layers, as the output may have negative values), among other example features and implementations.

In some implementations, self-supervised learning may be conducted on a machine learning model in a training phase, such as in the example of FIG. 19 above. For instance, as the objective of the network (illustrated in the example of FIG. 19) is to solve a regression problem, a loss function may be provided that guides the network to achieve its solution. A training phase may be provided to derive the loss function, such as a loss function based in labels or through quantifying alignment of two points clouds. In one example, an example training phase 2020 may be implemented, as illustrated in the simplified block diagram 2000 of FIG. 20, where inputs 2005 are provided to an Iterative Closest Point (ICP)-based method 2015 used (e.g., in connection with a corresponding CNN 2010) to obtain a data-based ground truth used for y to predict a pose that the loss function 2025 compares with the network prediction. In such an example, there is no need to have datasets with labeled ground-truth.

Figure 20:
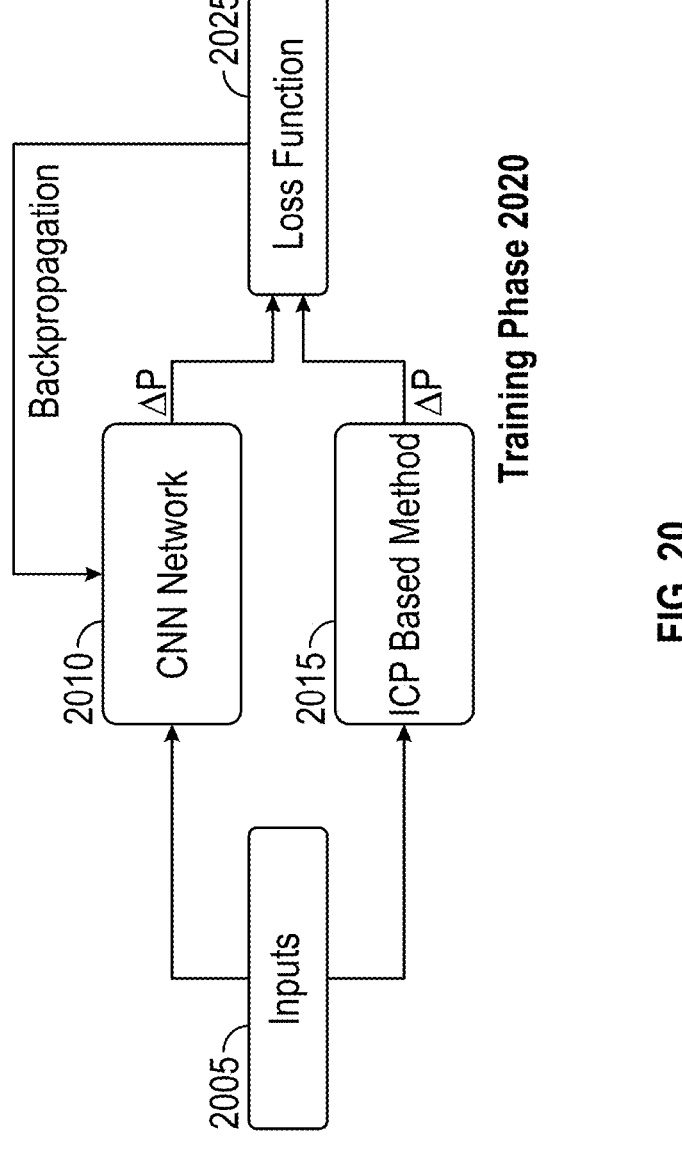
FIG. 20 is a simplified block diagram illustrating aspects of an example training of a model in accordance with at least some embodiments.
Figure 21:
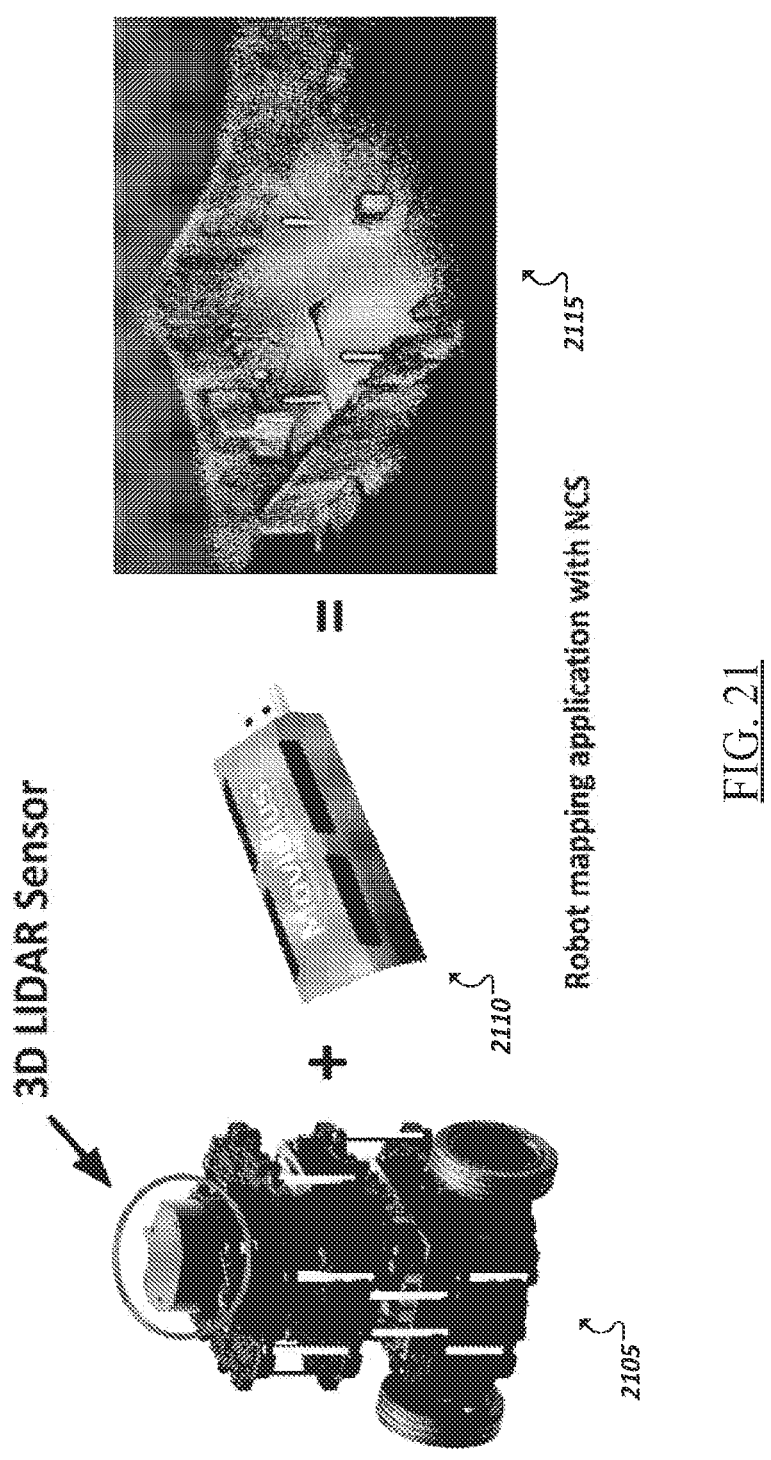
FIG. 21 illustrates an example robot using a neural network to generate a 3D map for navigation in accordance with at least some embodiments.

A trained Siamese-network-based model, such as discussed in the examples of FIGS. 19-20, may be utilized in applications such as 3D map generation and navigation and localization. For instance, as shown in the example of FIG. 21, such a network may be utilized (in connection with machine learning hardware (e.g., a NCS device 2110) by a mobile robot (e.g., 2105) or other autonomous machine to assist in navigating within an environment. The network may also be used to generate a 3D map of an environment 2115 (e.g., that may be later used by a robot or autonomous machine), among other Simultaneous Localization and Mapping (SLAM) applications.

In some implementations, edge to edge machine learning may be utilized to perform sensor fusion within an application. Such a solution may be applied to regress the movement of a robot over time by fusing different sensors' data. Although this is a well-studied problem, current solutions suffer from drift over time or are computationally expensive. In some examples, machine learning approaches may be utilized in computer vision tasks, while being less sensitive to noise in the data, changes in illumination, and motion blur, among other example advantages. For instance, convolutional neural networks (CNNs) may be used for object recognition and to compute optical flow. System hardware executing the CNN-based model may employ hardware components and sub-systems, such as long short-term memory (LSTM) blocks to recognize additional efficiencies, such as good results for signals regression, among other examples.

In one example, a system may be provided, which utilizes a machine learning model capable of accepting inputs from multiple sources of different types of data (e.g., such as RGB and IMU data) in order to overcome the weaknesses of each source independently (e.g., monocular RGB: lack of scale, IMU: drift over time, etc.). The machine learning module may include respective neural networks (or other machine learning models) tuned to the analysis of each type of data source, which may be concatenated and fed into a stage of fully-connected layers to generate a result (e.g., pose) from the multiple data streams. Such a system may find use, for instance, in computing systems purposed for enabling autonomous navigation of a machine, such as a robot, drone, or vehicle, among other example applications.

Figure 22:
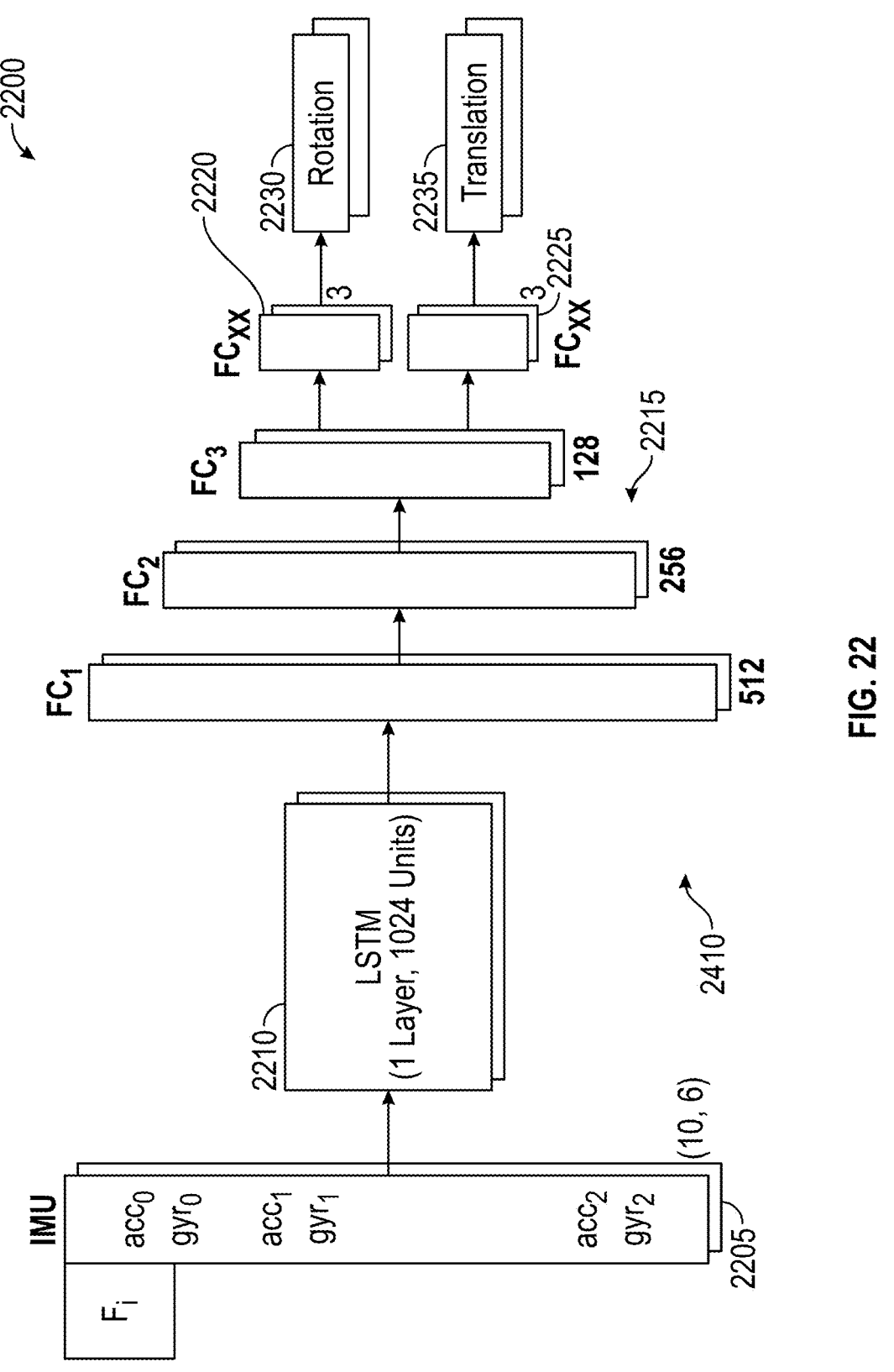
FIG. 22 is a block diagram illustrating an example machine learning model for use with inertial measurement data in accordance with at least some embodiments.

For instance, as illustrated in the example of FIG. 22, IMU data may be provided as an input to a network tuned for IMU data. IMU data may provide a way to track the movement of a subject by measuring acceleration and orientation. IMU data, however, in some cases, when utilized alone within machine learning applications, may suffer from drift over time. In some implementations, LSTMs may be used to track the relationship of this data over time, helping to reduce the drift. In one example, illustrated by the simplified block diagram 2200 of FIG. 22, a subsequence of n raw accelerometer and gyroscope data elements 2205 are used as an input to an example LSTM 2210 (e.g., where each data element is composed of 6 values (3 axes each from the accelerometer and gyroscope of the IMU)). In other instances, the input 2205 may include a subsequence of n (e.g., 10) relative poses between image frames (e.g., between frames $f_i$ and $f_{i+1}$ n IMU relative poses $T_j^i$, $j \in [0, n-1]$). Fully connected layers (FC) 2215 may be provided in the network to extract rotation and translation components of the transformation. For instance, following full-connected layers 2215, the resulting output may be fed to each of a full-connected layer 2220 for extracting a rotation value 2230 and a full-connected layer 2225 for extracting a translation value 2225. In some implementations, the model may be built to include fewer LSTM layers (e.g., 1 LSTM layer) and a higher number of LSTM units (e.g., 512 or 1024 units, etc.). In some implementations, a set of three full connected layers 2215 are used, followed by the rotational 2220 and translation 2225 fully connected layers.

Figure 23:
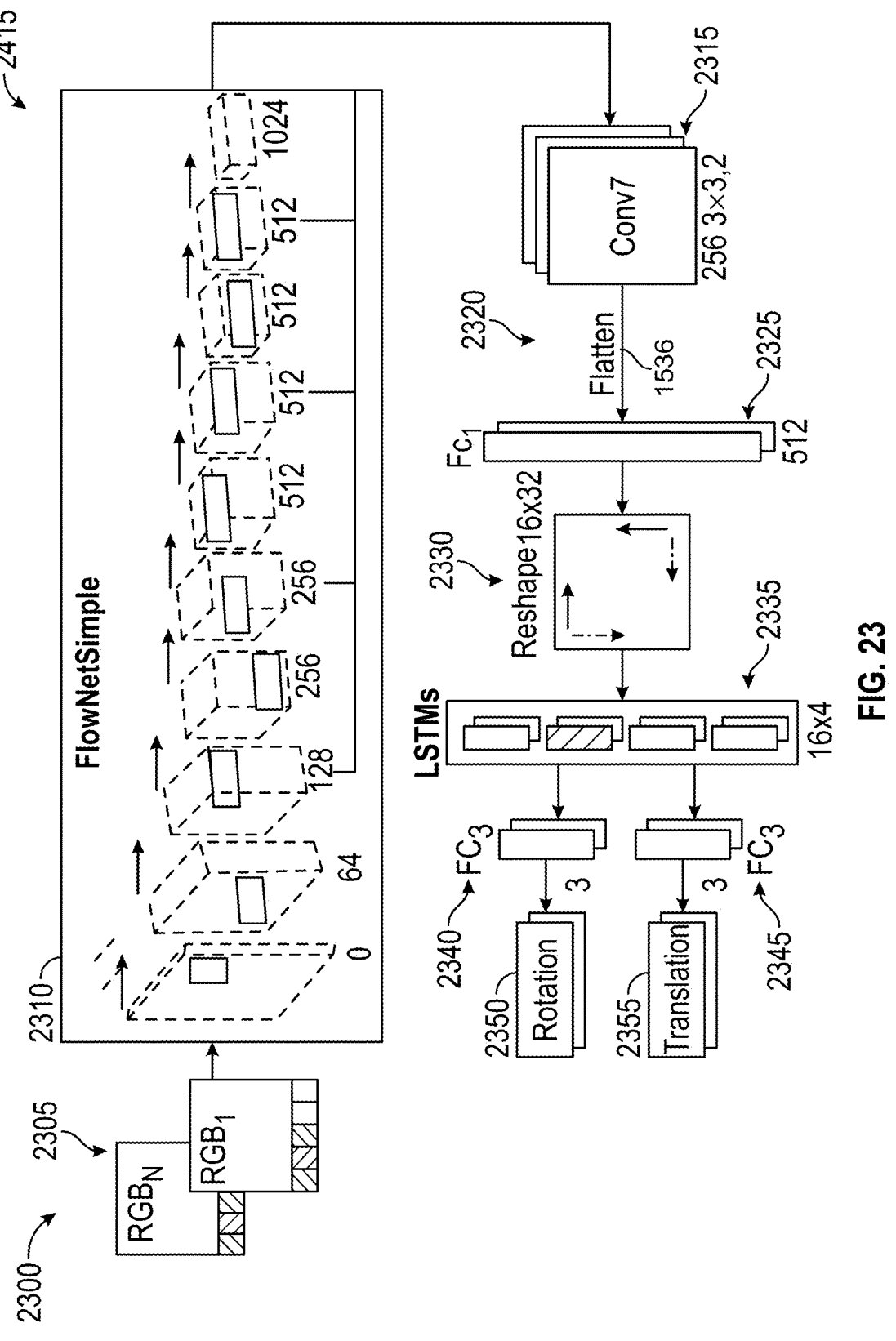
FIG. 23 is a block diagram illustrating an example machine learning model for use with image data in accordance with at least some embodiments.

Turning to the example of FIG. 23, a simplified block diagram 2300 is shown of a network capable of handling a data stream of image data, such as monocular RGB data. Accordingly, an RGB CNN portion may be provided, which is trained for computing optical flow and may feature dimensionality reduction for pose estimation. For instance, several fully connected layers may be provided to reduce dimensionality and/or the feature vector may be reshaped as a matrix and a set of 4 LSTMs may be used to find correspondences between features and reduce dimensionality, among other examples.

In the example of FIG. 23, a pre-trained optical flow CNN (e.g., 2310), such as a FlowNetSimple, FlowNetCorr, Guided Optical Flow, VINet, or other optical network, may be provided to accept a pair of consecutive RGB images as inputs 2305. The model may be further constructed to extract a feature vector from the image pair 2305 through the optical flow CNN 2310 and then reduce that vector to get a pose vector corresponding to the input 2305. For instance, an output of the optical network portion 2310 may be provided to a set of one or more additional convolutional layers 2315 (e.g., utilized to reduce the dimensionality from the output of the optical network portion 2310 and/or remove information used for estimating flow vectors, but which are not needed for pose estimation) the output of which may be a matrix, which may be flattened into a corresponding vector (at 2320). The vector may be provided to a fully connected layer 2325 to perform a reduction of the dimensionality of the flattened vector (e.g., a reduction from 1536 to 512). This reduced vector may be provided back to a reshaping block 2330 to convert, or reshape the vector into a matrix. A set of four LSTMs 2335, one for each direction (e.g., from left to right, top to bottom; from right to left, bottom to top; from top to bottom, left to right; and from bottom to top, right to left) of the reshaped matrix may then be used to track features correspondence along time and reduce dimensionality. The output of the LSTM set 2335 may then be provided to a rotational fully connected layer 2340 to generate a rotation value 2350 based on the pair of images 2305, as well as to a translation fully connected layer 2345 to generate a rotation value 2355 based on the pair of images 2305, among other example implementations.

Figure 24:
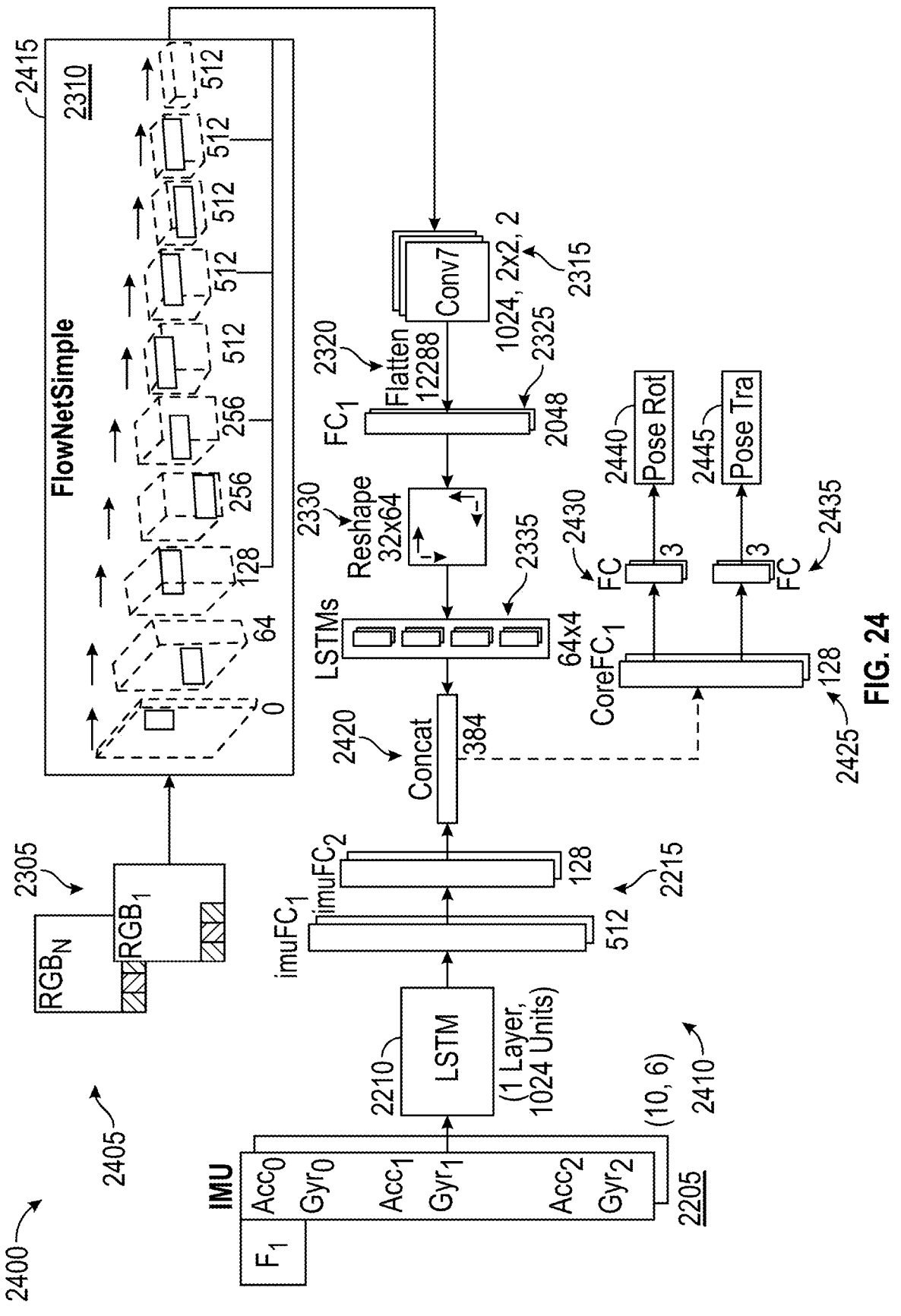
FIG. 24 is a block diagram illustrating an example machine learning model combining aspects of the models in the examples of FIGS. 22 and 23.

Turning to FIG. 24, a simplified block diagram 2400 is shown of a sensor fusion network 2405, which concatenates results of an IMU neural network portion 2410 (e.g., as illustrated in the example of FIG. 22) and an RGB neural network portion 2415 (e.g., as illustrated in the example of FIG. 23). Such a machine learning model 2405 may further enable sensor fusion by taking the best from each sensor type. For instance, a machine learning model may combine a CNN and LSTM to lead to more robust results (e.g., with the CNN able to extract features from a pair of consecutive images and the LSTM able to obtain information concerning progressive movement of the sensors). The output of both the CNN and LSTM are complementary in this regard, giving the machine an accurate estimate of the difference between two consecutive frames (and its relative transformation) and its representation in real world units.

Figure 25A:
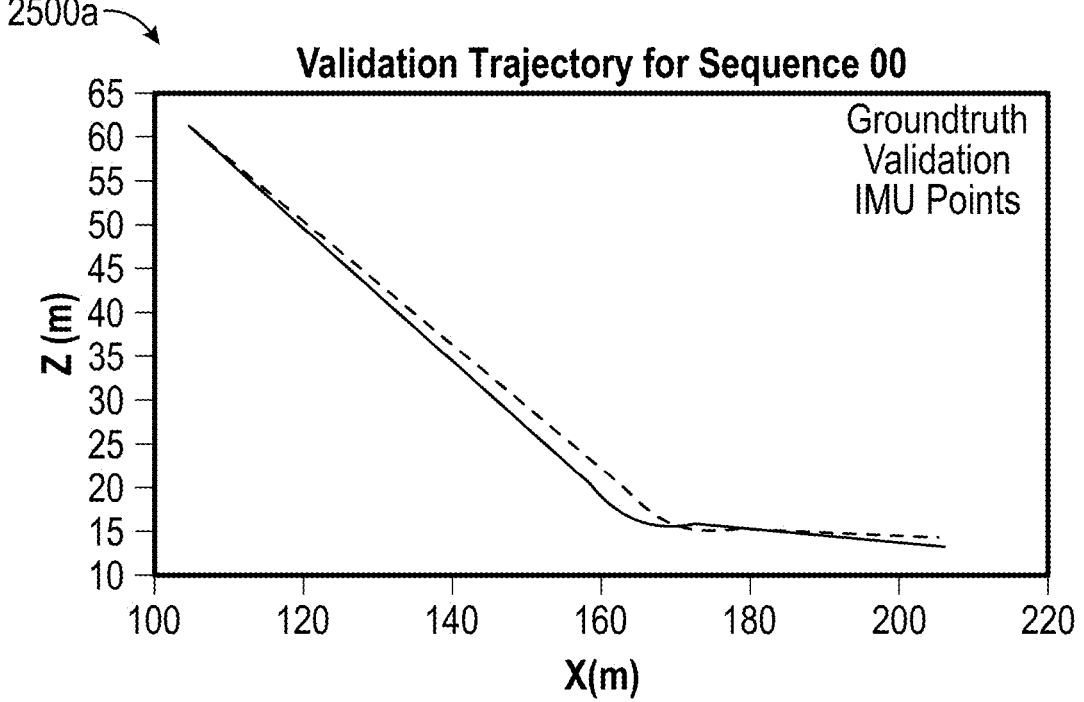
FIGS. 25A-25B are graphs illustrating results of a machine learning model similar to the example machine learning model of FIG. 24.
Figure 25B:
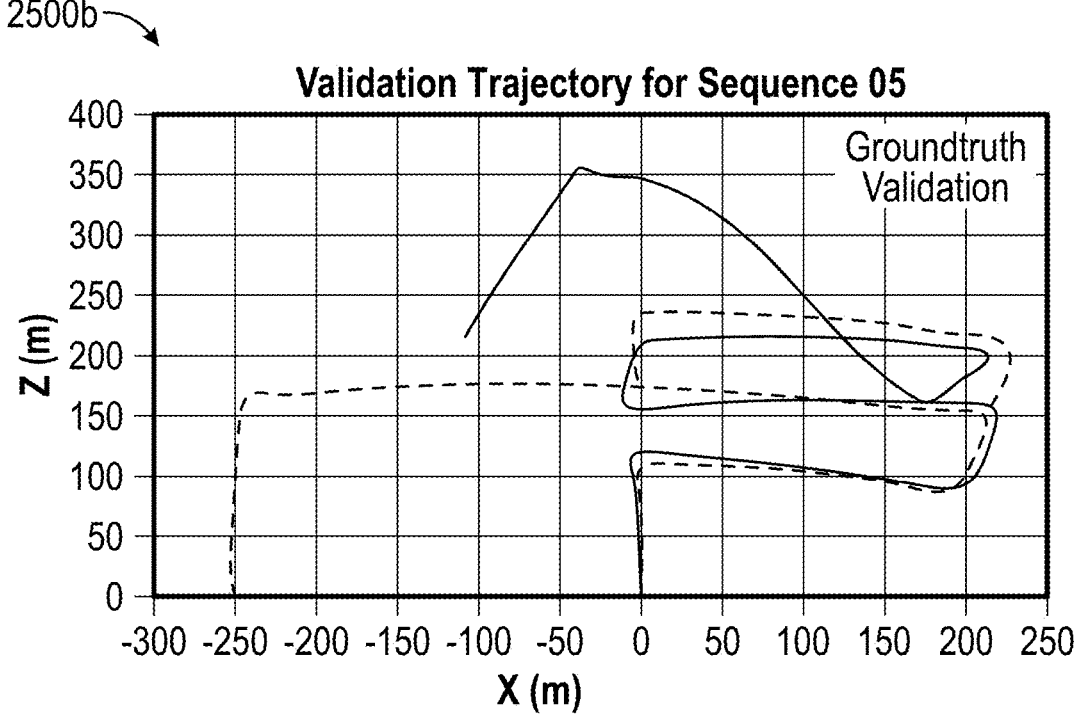

In the example of FIG. 24, the results of each sensor-specific portion (e.g., 2405, 2410) may be concatenated and provided to full-connected layers of the combined machine learning model 2405 (or sensor fusion network) to generate a pose result, which incorporates both rotational pose and translational pose, among other examples. While individually, IMU data and monocular RGBs, may not seem to provide enough information for a reliable solution to regression problems, combining these data inputs, such as shown and discussed herein, may provide more robust and reliable results (e.g., such as shown in the example results illustrated in graphs 2500a,b of FIGS. 25A-25B). Such a network 2405 takes advantage of both sensor type's (e.g., RGB and IMU) useful information. For instance, in this particular example, an RGB CNN portion 2415 of the network 2405 may extract information about the relative transformation between consecutive images, while the IMU LSTM-based portion 2410 provides scale to the transformation. The respective features vectors output by each portion 2410, 2415 may be fed to a concatenator block 2420 to concatenate the vectors and feed this result into a core fully connected layer 2425, followed by both a rotational fully connected layer 2430 to generate a rotation value 2440 and a translation fully connected layer 2435 to generate a translation value 2445 based on the combination of RGB image 2305 and IMU data 2205. It should be appreciated that while the examples of FIGS. 22-24 illustrate the fusion of RGB and IMU data, that other data types may be substituted (e.g., substituting and supplementing IMU data with GPS data, etc.) and combined in a machine learning model according to the principles discussed herein. Indeed, more than two data streams (and corresponding neural network portions fed into a concatenator) may be provided in other example implementations to allow for more robust solutions, among other example modifications and alternatives.

Figure 26:
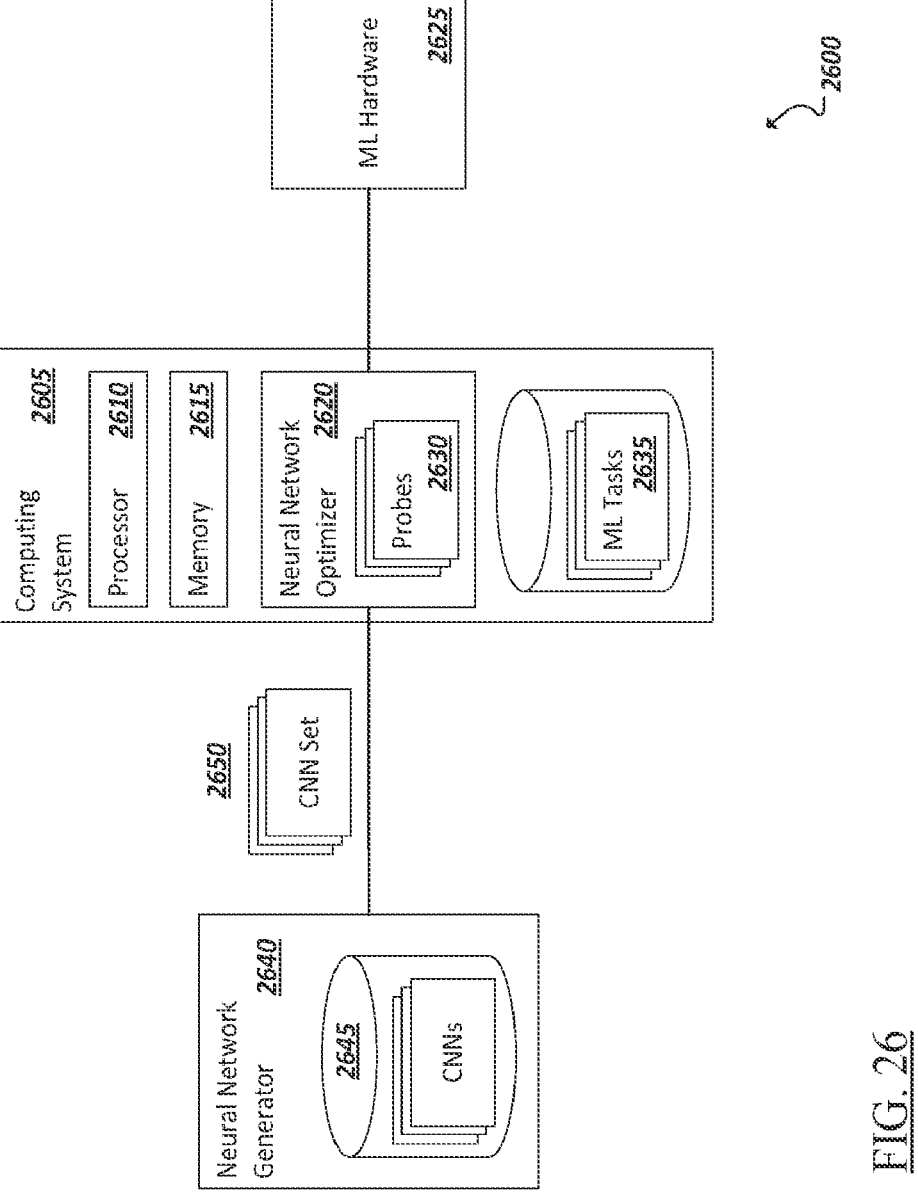
FIG. 26 illustrates an example system including an example neural network optimizer in accordance with at least some embodiments.

In some implementations, a neural network optimizer may be provided, which may identify to a user or a system, one or more recommended neural networks for a particular application and hardware platform that is to perform machine learning tasks using the neural network. For instance, as shown in FIG. 26, a computing system 2605 may be provided, which includes a microprocessor 2610 and computer memory 2615. The computing system 2605 may implement neural network optimizer 2620. The neural network optimizer 2620 may include an execution engine to cause a set of machine learning tasks (e.g., 2635) to be performed using machine learning hardware (e.g., 2625), such as described herein, among other example hardware. The neural network optimizer 2620 may additionally include one or more probes (e.g., 2630) to monitor the execution of the machine learning tasks as they are performed by machine learning hardware 2625 using one of a set of neural networks selected by the neural network optimizer 2620 for execution on the machine learning hardware 2625 and monitored by the neural network optimizer 2620. The probes 2630 may measure attributes such as the power consumed by the machine learning hardware 2625 during execution of the tasks, the temperature of the machine learning hardware during the execution, the speed or time elapsed to complete the tasks using a particular neural network, the accuracy of the task results using the particular neural network, the amount of memory utilized (e.g., to store the neural network being used), among other example parameters.

In some implementations, the computing system 2605 may interface with a neural network generating system (e.g., 2640). In some implementations, the computing system assessing the neural networks (e.g., 2605) and the neural network generating system 2640 may be implemented on the same computing system. The neural network generating system 2640 may enable users to manually design neural network models (e.g., CNNs) for various tasks and solutions. In some implementations, the neural network generating system 2640 may additionally include a repository 2645 of previously generated neural networks. In one example, the neural network generating system 2640 (e.g., a system such as CAFFE, TensorFlow, etc.) may generate a set of neural networks 2650. The set may be generated randomly, generating new neural networks from scratch (e.g., based on some generalized parameters appropriate for a given application, or according to a general neural network type or genus) and/or randomly selecting neural networks from repository 2645.

In some implementations, a set of neural networks 2650 may be generated by the neural network generating system

2640 and provided to the neural network optimizer 2620. The neural network optimizer 2620 may cause a standardized set of one or more machine learning tasks to be performed by particular machine learning hardware (e.g., 2625) using each one of the set of neural networks 2650. The neural network optimizer 2620 may monitor the performance of the tasks in connection with the hardware's 2625 use of each one of the set of neural networks 2650. The neural networks optimizer 2620 may additionally accept data as an input to identify, which parameters or characteristics measured by the neural network optimizer's probes (e.g., 2630) are to be weighted highest or given priority by the neural network optimizer in determining which of the set of neural networks is "best". Based on these criteria and the neural network optimizer's observations during the use of each one of the (e.g., randomly generated) set of neural networks, the neural network optimizer 2620 may identify and provide the best performing neural network for the particular machine learning hardware (e.g., 2625) based on the provided criteria. In some implementations, the neural network optimizer may automatically provide this top performing neural network to the hardware for additional use and training, etc.

In some implementations, a neural network optimizer may employ evolutionary exploration to iteratively improve upon the results identified from an initial (e.g., randomly generated) set of neural networks assessed by the neural network optimizer (e.g., 2620). For instance, the neural network optimizer may identify characteristics of the top-performing one or more neural networks from an initial set assessed by the neural network optimizer. The neural network optimizer may then send a request to the neural network generator (e.g., 2640) to generate another diverse set of neural networks with characteristics similar to those identified in the top-performing neural networks for particular hardware (e.g., 2625). The neural network optimizer 2620 may then repeat its assessment using the next set, or generation, of neural networks generated by the neural network generator based on the top-performing neural networks from the initial batch assessed by the neural network optimizer. Again, the neural network optimizer 2620 may identify which of this second generation of neural networks performed best according to the provided criteria and again determine traits of the best performing neural networks in the second generation as the basis for sending a request to the neural network generator to generate a third generation of neural networks for assessment and so, with the neural network optimizer 2620 iteratively assessing neural networks, which evolve (and theoretically improve) from one generation to the next. As in the prior example, the neural network optimizer 2620 may provide an indication or copy of the best performing neural network of the latest generation for use by machine learning hardware (e.g., 2625), among other example implementations.

Figure 27:
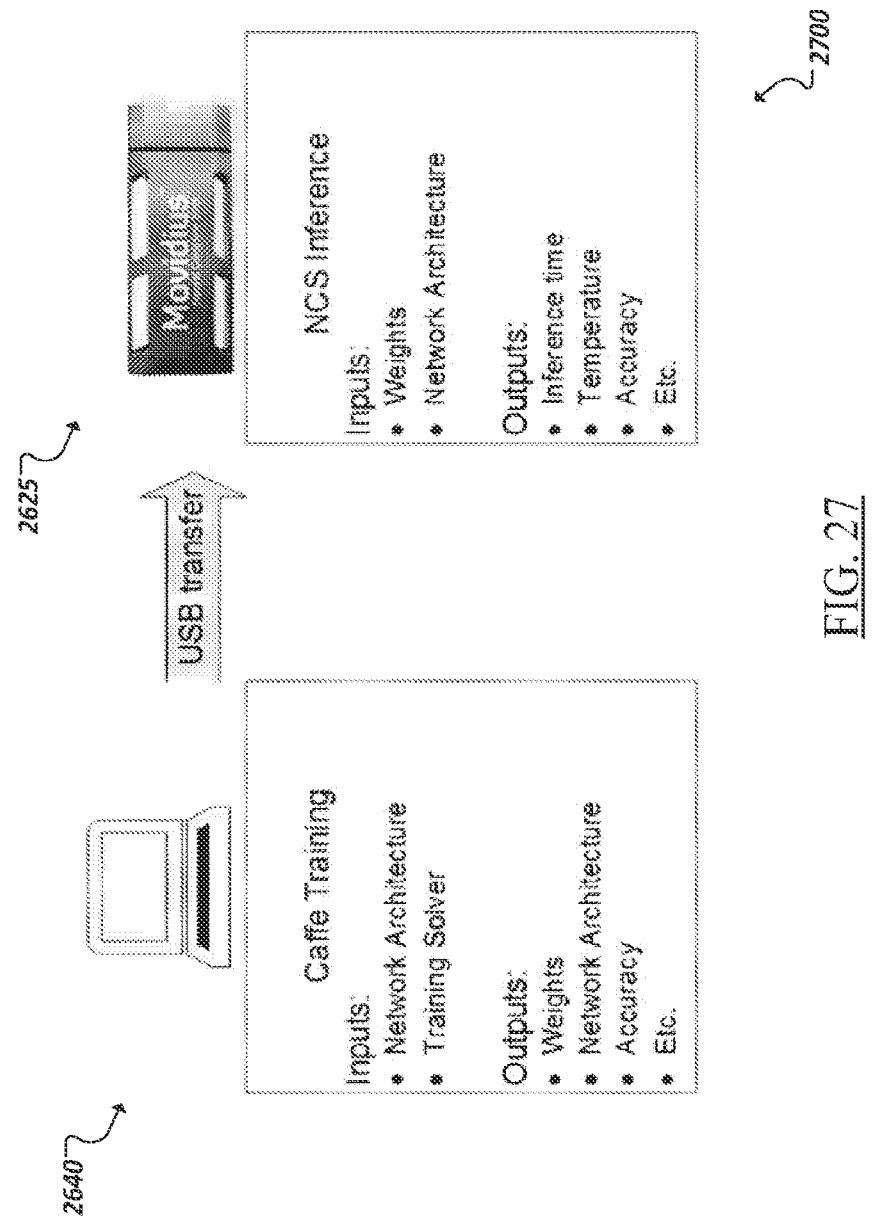
FIG. 27 is a block diagram illustrating an example optimization of a neural network model in accordance with at least some embodiments.

As a specific example, shown in the block diagram 2700 of FIG. 27, machine learning hardware 2625 such as the Movidius NCS may be utilized with a neural network optimizer functioning as a design-space exploration tool may make use of a neural network generator 2640 or provider, such as Caffe, to find the network with the highest accuracy subject to hardware constraints. Such design-space exploration (DSX) tools may be provided to take advantage of the full API including bandwidth measurement and network graph. Furthermore, some extensions may be been made to or provided in the machine learning hardware API to pull out additional parameters that are useful for design-space exploration such as temperature measurement, inference time measurement, among other examples.

Figure 28:
FIG. 28 is a table illustrating example results generated and used during an optimization of an example neural network model.
Figure 29:
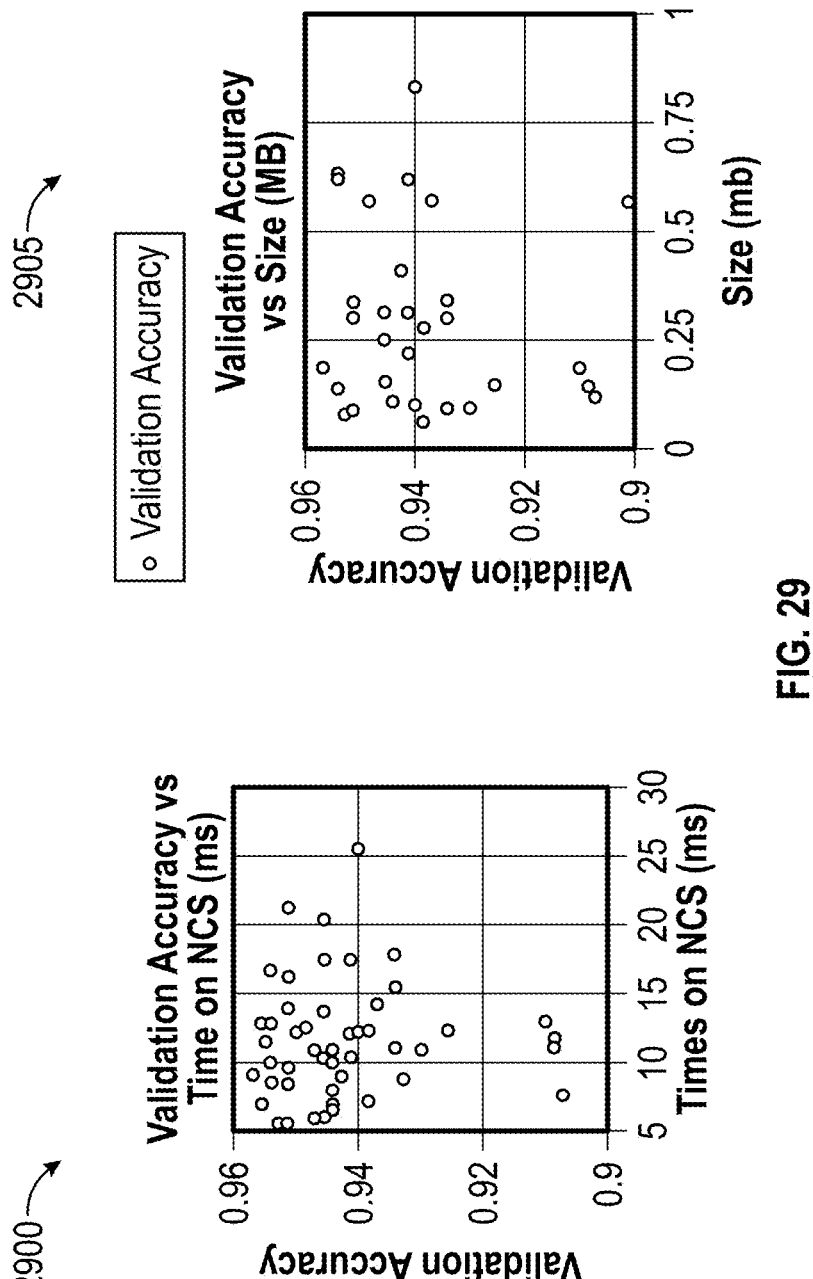
FIG. 29 illustrates graphs showing results generated and used during an optimization of an example neural network model.

To illustrate the power of the DSX concept an example is provided, where the neural network design space for a small always-on face detector is explored, such as those implemented in the latest mobile phones to wake-up on face detection as an example. Various neural networks may be provided to machine learning hardware and the performance may be monitored for each neural network's use, such as the power usage for the trained network during the inference stage. The DSX tool (or neural network optimizer) may generate different neural networks for a given classification task. Data may be transferred to the hardware (e.g., in the case of NCS, via USB to and from the NCS using the NCS API). With the implementation explained above, optimal models for different purposes can be found as a result of design space exploration rather than manually editing, copying and pasting any files. As an illustrative example, FIG. 28 shows a table 2800 illustrating example results of a DSX tool's assessment of multiple different, randomly generated neural networks, including the performance characteristics of machine learning hardware (e.g., a general purpose microprocessor connected to a NCS) during execution of machine learning tasks using each one of the neural networks (e.g., showing accuracy, time of execution, temperature, size of the neural network in memory, and measured power, among other example parameters, which may be measured by the DSX tool). FIG. 29 shows results comparing validation accuracy vs. time of execution (at 2900) and vs. size (at 2905). These relations and ratios may be considered by the NCS when determining which of the assessed neural networks is "best" for a particular machine learning platform, among other examples.

Deep Neural Networks (DNNs) provide state of the art accuracies on various computer vision tasks, such as image classification and object detection. However, the success of DNN is often accomplished through a significant increase in compute and memory, which makes them hard to deploy on resource constrained inference edge devices. In some implementations, network compression techniques like pruning and quantization can lower the compute and memory demands. This may also assist in preventing over-fitting, especially for transfer learning on small custom dataset, with no to little loss in accuracy.

In some implementations, a neural network optimizer (e.g., 2620) or other tool may also be provided to dynamically, and automatically, reduce the size of neural networks for use by particular machine learning hardware. For instance, the neural network optimizer may perform fine-grained pruning (e.g., connection or weight pruning) and coarse-grained pruning (e.g., kernel, neuron, or channel pruning) to reduce the size of the neural network to be stored and operated upon by given machine learning hardware. In some implementations, the machine learning hardware (e.g., 2625) may be equipped with arithmetic circuitry capable of performing sparse matrix multiplication, such that the hardware may effectively handle weight-pruned neural networks.

Figure 31:
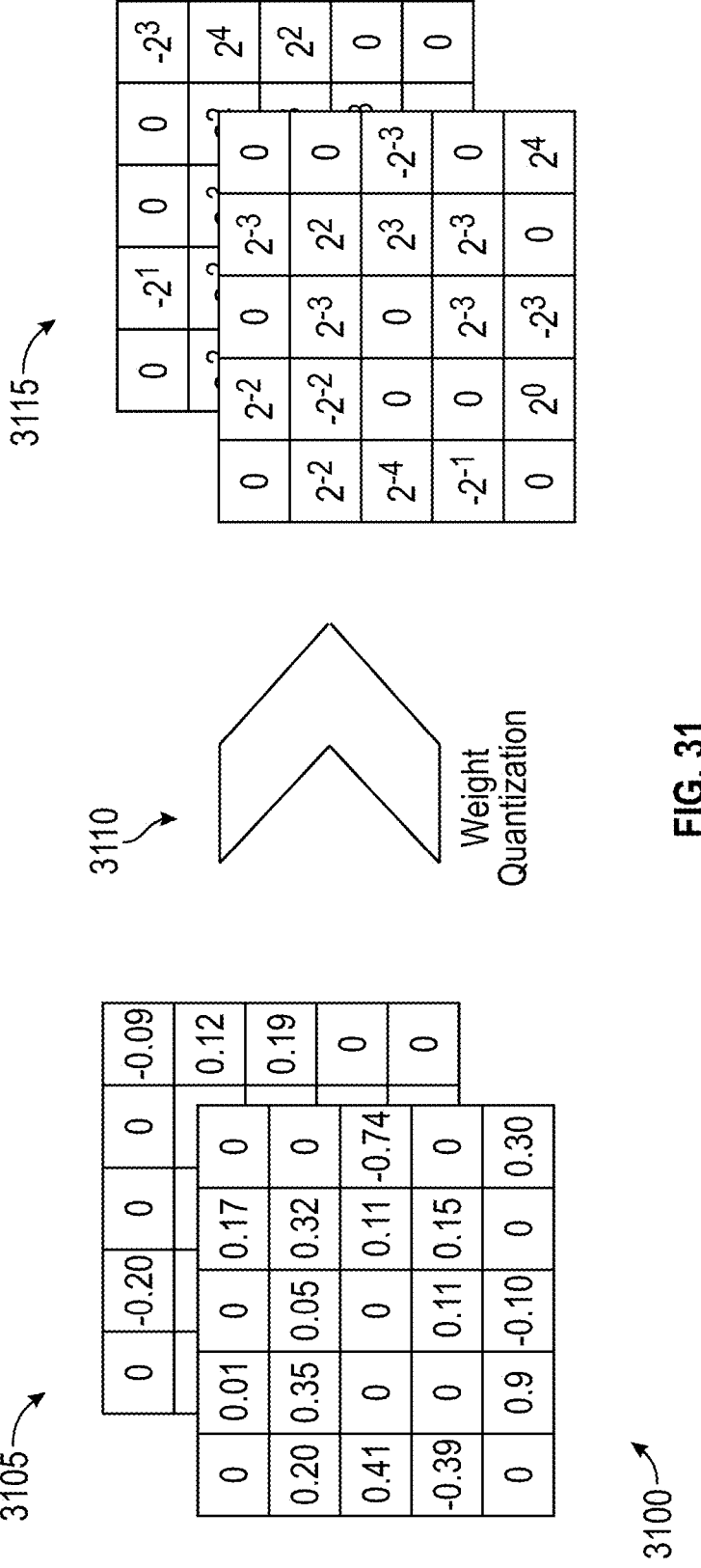
FIG. 31 is a simplified block diagram illustrating example weight quantization performed in connection with pruning of a neural network in accordance with at least some embodiments.
Figure 32:
FIG. 32 is a table comparing results of example neural network pruning techniques.

In one implementation, a neural network optimizer 2620 or other tool may perform hybrid pruning of a neural network (e.g., as illustrated in the block diagram 3000a of FIG. 30A), to prune both at the kernel level and the weight level. For instance, one or more algorithms, rules, or parameters may be considered by the neural network optimizer 2620 or other tool to automatically identify a set of kernels or channels (at 3005) which may be pruned 3010 from a given neural network. After this first channel pruning step is completed (at 3015), weight pruning 3020 may be performed on the remaining channels 3015, as shown in the example illustration of FIG. 30A. For instance, a rule may govern weight pruning, such that a threshold is set whereby weights below the threshold are pruned (e.g., reassigned a weight of "0") (at 3025). The hybrid pruned network may then be run or iterated to allow the accuracy of the network to recover from the pruning, with a compact version of the network resulting, without detrimentally lowering the accuracy of the model. Additionally, in some implementations, weights remaining following the pruning may be quantized to further reduce the amount of memory needed to store the weights of the pruned model. For instance, as shown in the block diagram 3100 of FIG. 31, log scale quantization 3110 may be performed, such that floating-point weight values (at 3105) are replaced by their nearest base 2 counterparts (at 3115). In this manner, a 32-bit floating point value may be replaced with a 4-bit base 2 value to dramatically reduce the amount of the memory needed to store the network weights, while only minimally sacrificing accuracy of the compact neural network, among other example quantizations and features (e.g., as illustrated in the example results shown in the table 3200 of FIG. 32). Indeed, in the particular example of FIG. 32, a study of the application of hybrid pruning is shown as applied to an example neural network, such as ResNet50. Additionally, illustrated is the application of weight quantization onto the pruned sparse thin ResNet50 to further reduce the model size and to be more hardware friendly.

Figures 30A, 30B:
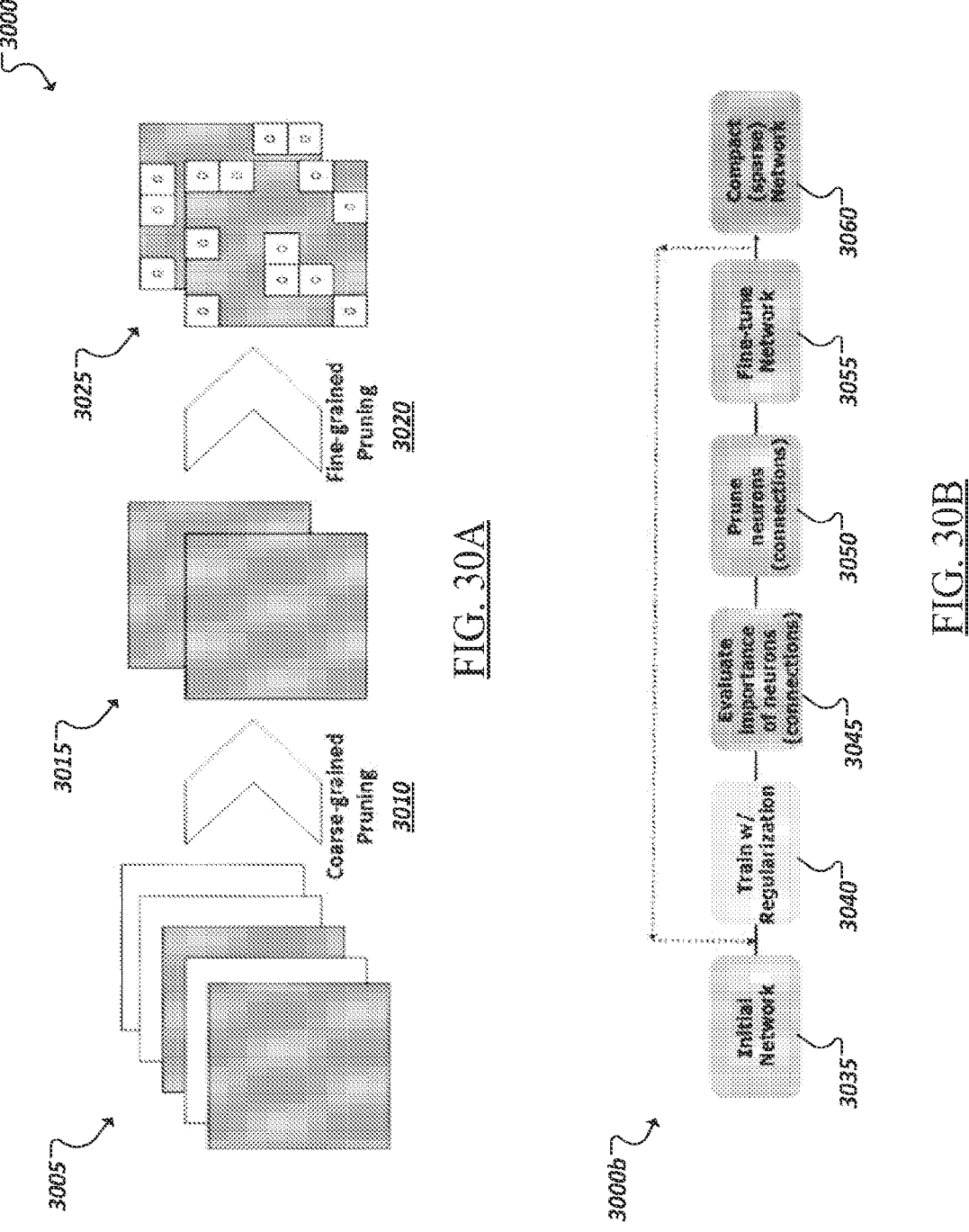
FIG. 30A is a simplified block diagram illustrating an example of hybrid neural network pruning in accordance with at least some embodiments.
FIG. 30B is a simplified flow diagram illustrating an example pruning of a neural network in accordance with at least some embodiments.

As illustrated by the simplified block diagram 3000b of FIG. 30B, in one example, hybrid pruning of an example neural network may be performed by accessing an initial or reference neural network model 3035 and (optionally) training the model with regularization (L1, L2 or L0) 3040. Importance of individual neurons (or connections) within the network may be evaluated 3045, with neurons determined to be of less importance pruned (at 3050) from the network. The pruned network may be fine-tuned 3055 the pruned network and a final compact (or sparse) network generated 3060 from the pruning. As shown in the example of FIG. 30B, in some cases, a network may be iteratively pruned, with additional training and pruning (e.g., 3040-3050) performed following the fine tuning 3055 of the pruned network, among other example implementations. In some implementations, determining the importance 3045 of neuron may be performed utilizing a hybrid pruning technique, such as described above. For instance, fine-grained weight pruning/sparsification may be performed (e.g., with global gradual pruning with (mean+std*factor). Coarse-grained channel pruning may be performed layer-by-layer (e.g., weight sum pruning) based on a sensitivity test and/or a number of target MACs. Coarse pruning may be performed before sparse pruning. Weight quantization may also be performed, for instance, to set a constraint on non-zero weights to be power of two or zero and/or to use 1 bit for zeros and 4 bits for representing weights. In some cases, low precision (e.g., weight and activation) quantization may be performed, among other example techniques. Pruning techniques, such as discussed above, may yield a variety of example benefits. For instance, a compact matrix may reduce the size of stored network parameters and the run-time weight decompression may reduce DDR Bandwidth. Accelerated compute may also be provided, among other example advantages.

FIG. 33A is a simplified flow diagram 3300a of an example technique for generating a training data set including synthetic training data samples (e.g., synthetically generated images or synthetically generated point clouds). For instance, a digital 3D model may be accessed 3302 from computer memory and a plurality of training samples may be generated 3304 from various views of the digital 3D model. The training samples may be modified 3306 to add imperfections to the training samples to simulate training samples as they would be generated by one or more real world samples. A training data set is generated 3308 to include the modified, synthetically generated training samples. One or more neural networks may be trained 3310 using the generated training data set.

FIG. 33B is a simplified flow diagram 3300b of an example technique for performing a one-shot classification using a Siamese neural network model. A subject input may be provided 3312 as an input to a first portion of the Siamese neural network model and a reference input may be provided 3314 as an input to a second portion of the Siamese neural network model. The first and second portions of the model may be identical and have identical weights. An output of the Siamese network may be generated 3316 from the outputs of the first and second portions based on the subject input and reference input, such as a difference vector. The output may be determined 3318 to either indicate whether the subject input is adequately similar to the reference input (e.g., to indicate that the subject of the subject input is the same as the subject of the reference input), for instance, based on a threshold value of similarity for the outputs of the Siamese neural network model.

FIG. 33C is a simplified flow diagram 3300c of an example technique for determining a relative pose using an example Siamese neural network model. For instance, a first input may be received 3320 as an input to a first portion of the Siamese neural network model, the first input representing a view of a 3D space (e.g., point cloud data, depth map data, etc.) from a first pose (e.g., of an autonomous machine). A second input may be received 3322 as an input to a second portion of the Siamese neural network model, the second input representing a view of the 3D space from a second pose. An output of the Siamese network may be generated 3324 based on the first and second inputs, the output representing the relative pose between the first and second poses. A location of a machine associated with the first and second poses and/or a 3D map in which the machine resides may be determined 3326 based on the determined relative pose.

FIG. 33D is a simplified flow diagram 3300d of an example technique involving a sensor fusion machine learning model, which combines at least portions of two or more machine learning models tuned for use with a corresponding one of two or more different data types. First sensor data of a first type may be received 3330 as an input at a first one of the two or more machine learning models in the sensor fusion machine learning model. Second sensor data of a second type (e.g., generated contemporaneously with the first sensor data (e.g., by sensors on the same or different machines)) may be received 3332 as an input to a second one of the two or more machine learning models. Outputs of the first and second machine learning models may be concatenated 3334, the concatenated output being provided 3336 to a set of fully-connected layers of the sensor fusion machine learning model. An output may be generated 3338 by the sensor fusion machine learning model, based on the first and second sensor data, to define a pose of a device (e.g., a machine on which sensors generating the first and second sensor data are positioned).

FIG. 33E is a simplified flow diagram 3300e of an example technique for generating, according to evolutional algorithm, improved or optimized neural networks tuned to particular machine learning hardware. For instance, a set of neural networks may be accessed 3340 or generated (e.g., automatically according to randomly selected attributes). Machine learning tasks may be performed 3342 by particular hardware using the set of neural networks and attributes of the particular hardware's performance of these tasks may be monitored 3344. Based on the results of this monitoring, one or more top performing neural networks in the set may be identified 3346. Characteristics of the top performing neural networks (for the particular hardware) may be determined 3348, and another set of neural networks may be generated 3350 that include such characteristics. In some instances, this new set of neural networks may also be tested (e.g., through steps 3342-3348) to iteratively improve the sets of neural networks considered for use with the hardware until one or more sufficiently well-performing, or optimized, neural networks are identified for the particular hardware.

FIG. 33F is a simplified flow diagram 3300f of an example technique for pruning neural networks. For instance, a neural network may be identified 3352 and a subset of the kernels of the neural network may be determined 3354 as less important or as otherwise good candidates for pruning. This subset of kernels may be pruned 3356 to generate a pruned version of the neural network. The remaining kernels may then be further pruned 3358 to prune a subset of weights from these remaining kernels to further prune the neural network at both a coarse- and fine-grained level.

Figure 34:
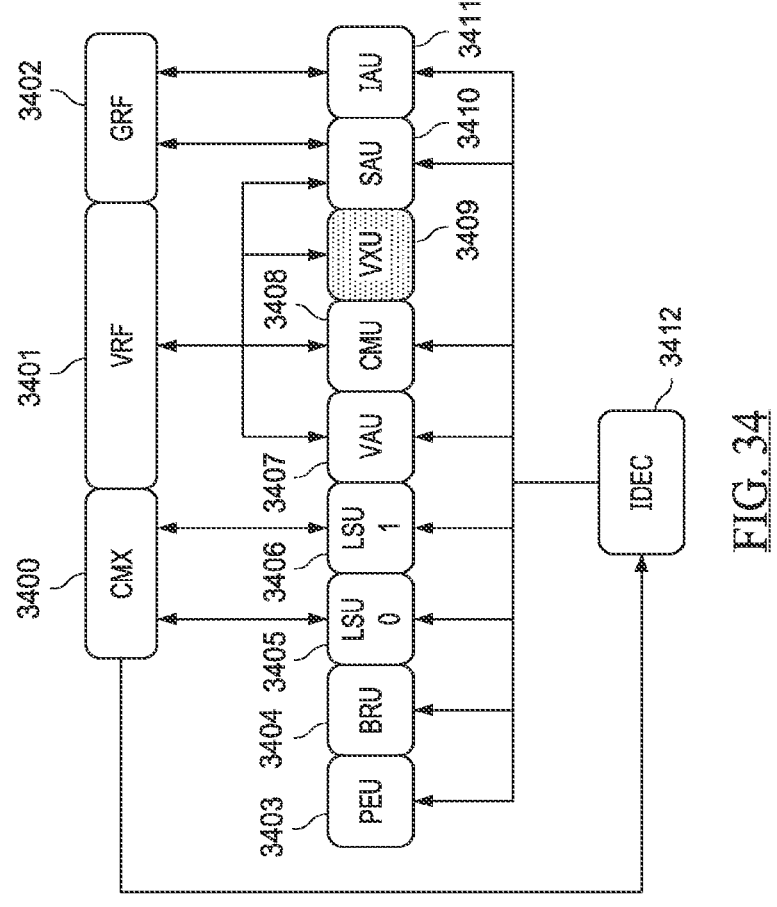
FIG. 34 depicts an example multi-slot vector processor in accordance with some embodiments.

FIG. 34 is a simplified block diagram representing an example multislot vector processor (e.g., a very long instruction word (VLIW) vector processor) in accordance with some embodiments. In this example the vector processor may include multiple (e.g., 9) functional units (e.g., 3403-3411), which may be fed by a multi-ported memory system 3400, backed up by a vector register file (VRF) 3401 and general register file (GRF) 3402. The processor contains an instruction decoder (IDEC) 3412, which decodes instructions and generates control signals which control the functional units 3403-3411. The functional units 3403-3411 are the predicated execution unit (PEU) 3403, branch and repeat unit (BRU) 3404, load store port units (e.g., LSU0 3405 and LSU1 3406), a vector arithmetic unit (VAU) 3407, scalar arithmetic unit (SAU) 3410, compare and move unit (CMU) 3408, integer arithmetic unit (IAU) 3411, and a volumetric acceleration unit (VXU) 3409. In this particular implementation, the VXU 3409 may accelerate operations on volumetric data, including both storage/retrieval operations, logical operations, and arithmetic operations. While the VXU circuitry 3409 is shown in the example of FIG. 34 as a unitary component, it should be appreciated that the functionality of the VXU (as well as an of the other functional units 3403-3411) may be distributed among multiple circuitry. Further, in some implementations, the functionality of the VXU 3409 may be distributed, in some implementations, within one or more of the other functional units (e.g., 3403-3408, 3410, 3411) of the processor, among other example implementations.

Figure 35:
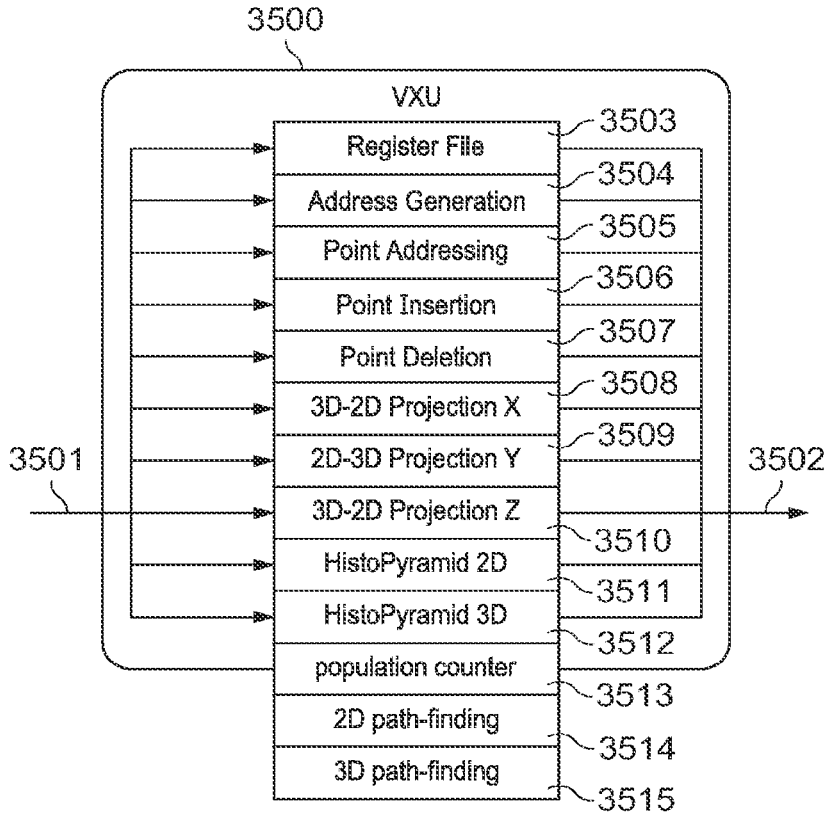
FIG. 35 illustrates an example volumetric acceleration hardware in accordance with some embodiments.

FIG. 35 is a simplified block diagram illustrating an example implementation of a VXU 3500 in accordance with some embodiments. For instance, VXU 3500 may provide at least one 64-bit input port 3501 to accept inputs from either the vector register file 3401 or general register file 3402. This input may be connected to a plurality of functional units including a register file 3503, address generator 3504, point addressing logic 3505, point insertion logic 3506, point deletion logic 3507, 3D to 2D projection logic in X dimension 3508, 3D to 2D projection logic in Y dimension 3509, 3D to 2D projection logic in X dimension 3510, 2D histogram pyramid generator 3511, 3D histopyramid generator 3512, population counter 3513, 2D path-finding logic 3514, 3D path-finding logic 3515 and possibly additional functional units to operate on 64-bit unsigned integer volumetric bitmaps. The output from the block 3502 can be written back to either the vector register file VRF 3401 or general register file GRF 3402 register files.

Figure 36:
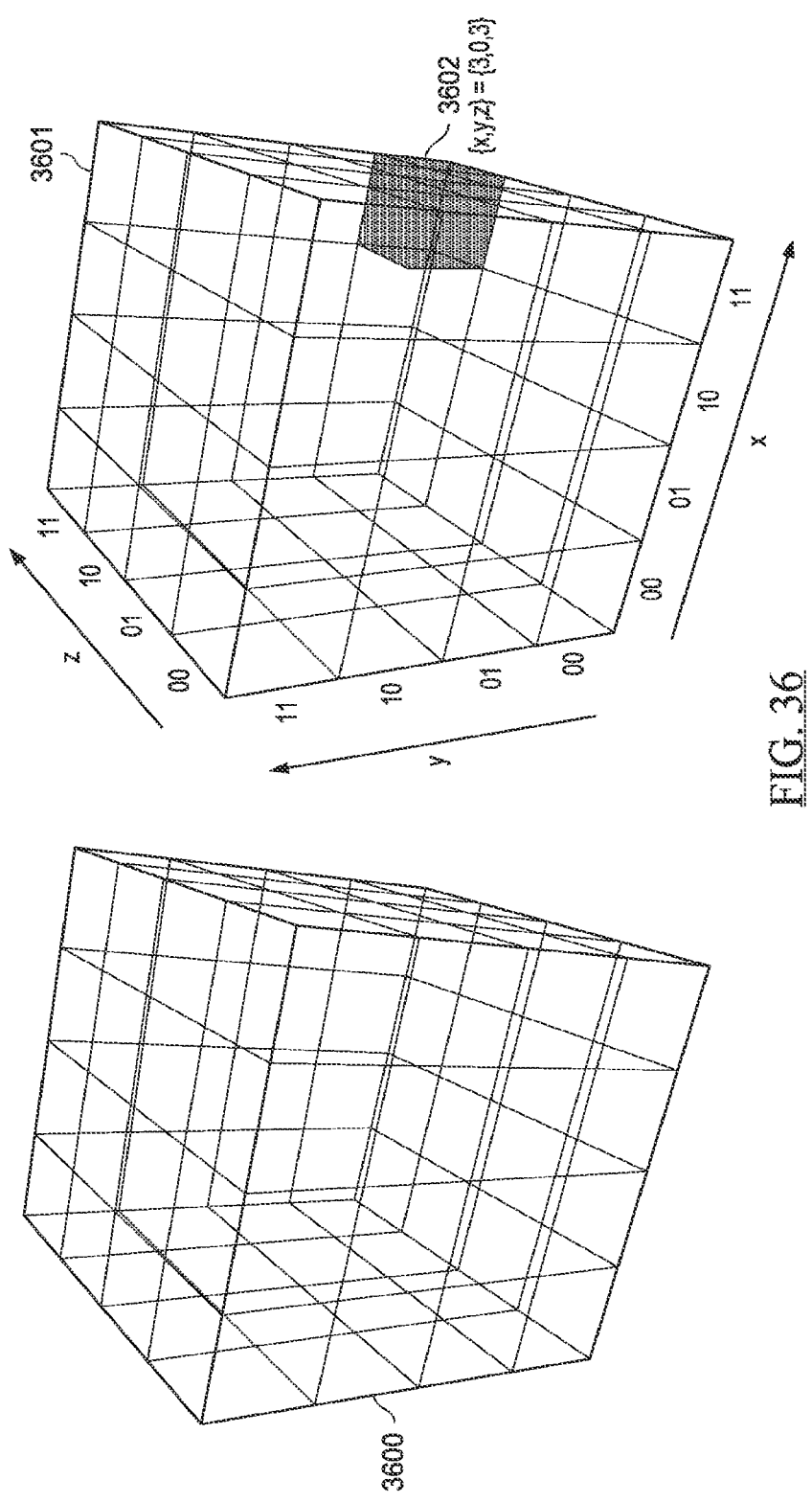
FIG. 36 illustrates the organization of a voxel cube in accordance with some embodiments.
Figure 37:
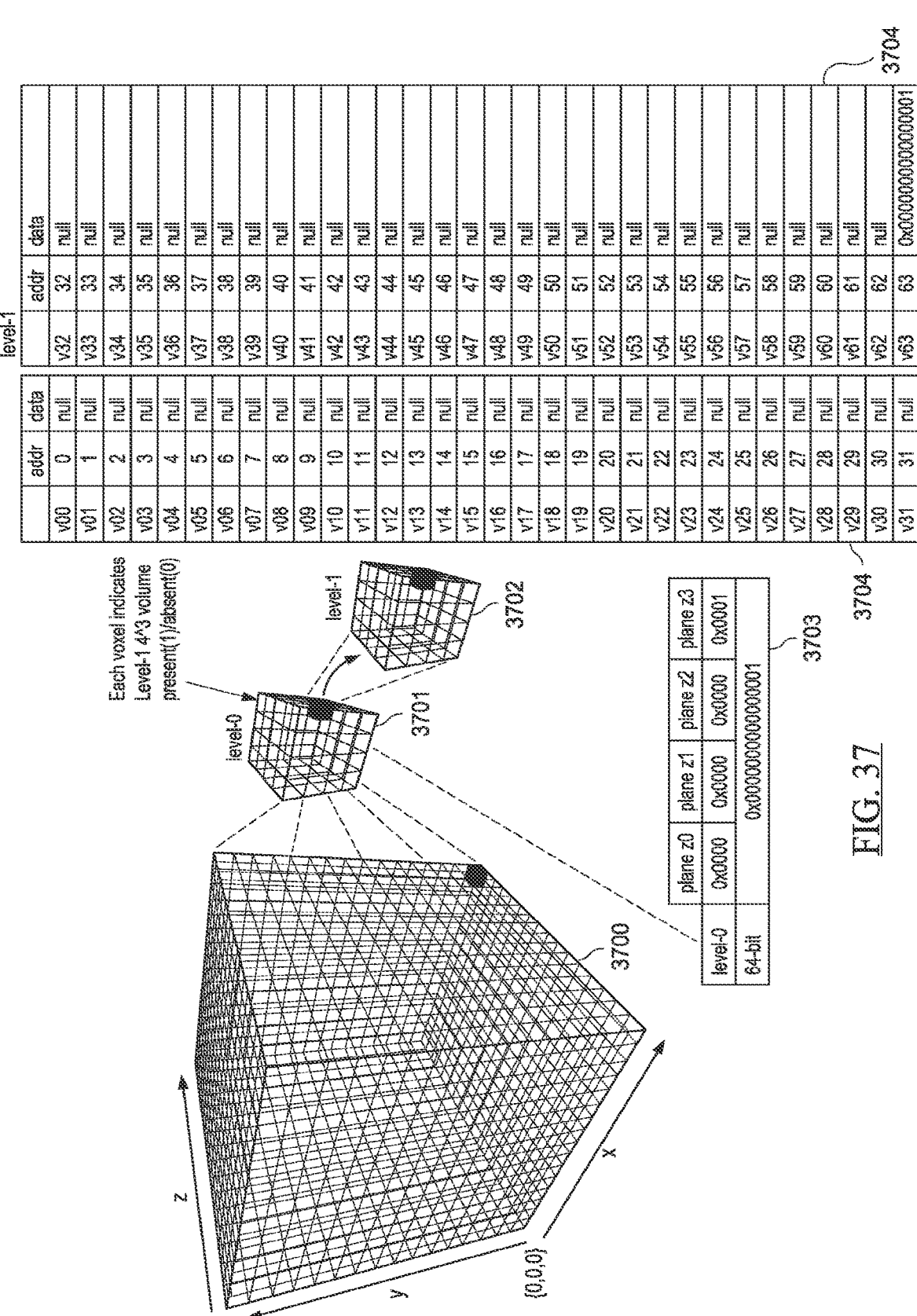
FIG. 37 illustrates a two-level sparse voxel tree in accordance with some embodiments.

Turning to the example of FIG. 36, a representation of the organization of a 4ˆ3voxel cube 3600 is represented. A second voxel cube 3601 is also represented. In this example, a voxel cube may be defined in data as a 64-bit integer 3602, in which each single voxel within the cube is represented by a single corresponding bit in the 64-bit integer. For instance, the voxel 3512 at address {x,y,z}={3,0,3} may be set to "1" to indicate the presence of geometry at that coordinate within the volumetric space represented by the voxel cube 3601. Further, in this example, all other voxels (beside voxel 3602) may corresponding to "empty" space, and may be set to "0" to indicate the absence of physical geometry at those coordinates, among other examples. Turning to FIG. 37, an example two-level sparse voxel tree 3700 is illustrated in accordance with some embodiments. In this example, only a single "occupied" voxel is included within a volume (e.g., in location {15,0,15}). The upper level-0 of the tree 3701 in this case contains a single voxel entry {3,0,3}. That voxel in turn points to the next level of the tree 3702 which contains a single voxel in element {3,0,3}. The entry in the data-structure corresponding to level 0 of the sparse voxel tree is a 64-bit integer 3703 with one voxel set as occupied. The set voxel means that an array of 64-bit integers is then allocated in level 1 of the tree corresponding to the voxel volume set in 3703. In the level 1 sub-array 3704 only one of the voxels is set as occupied with all other voxels set as unoccupied. As the tree, in this example, is a two level tree, level 1 represents the bottom of the tree, such that the hierarchy terminates here.

Figure 38:
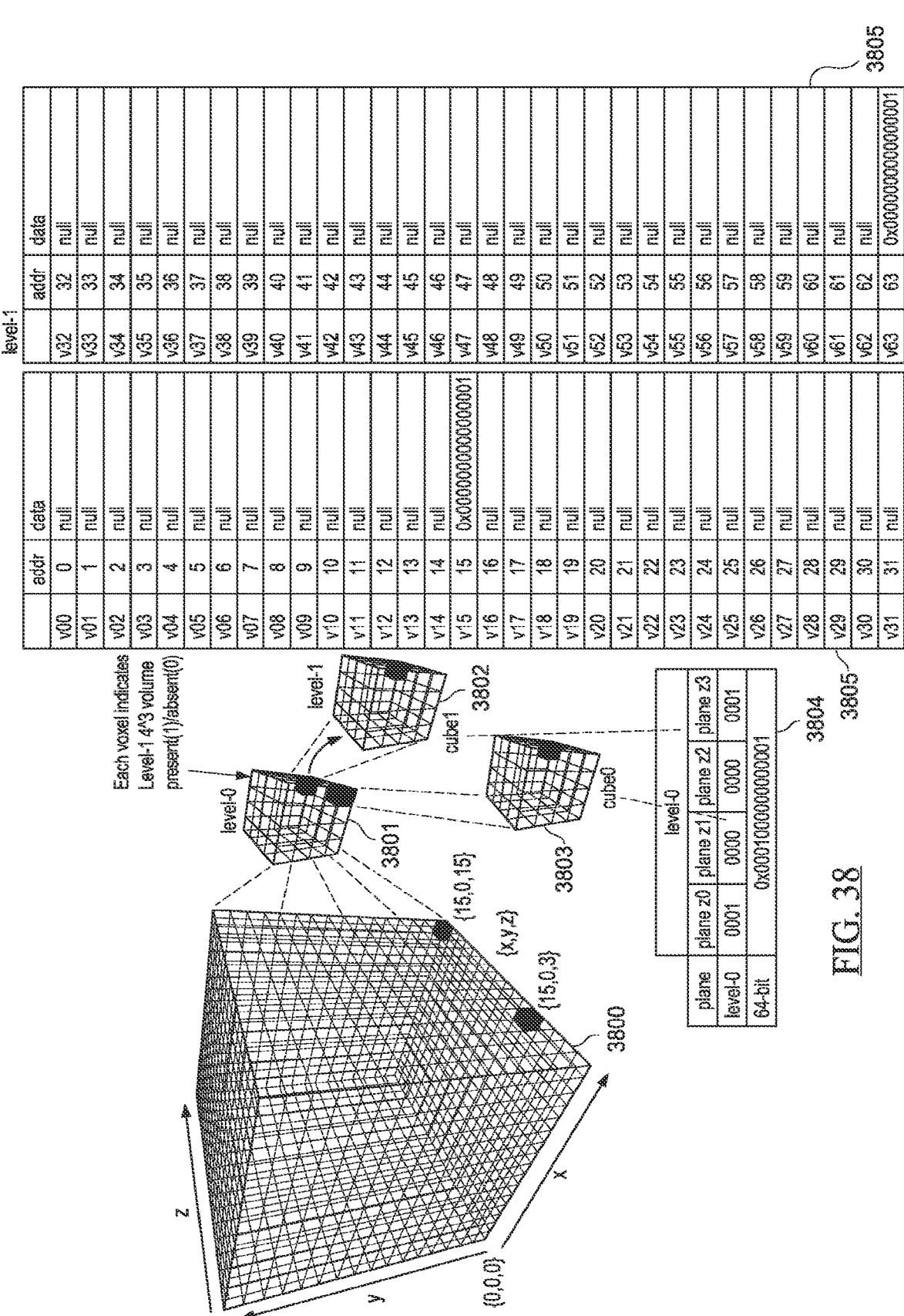
FIG. 38 illustrates a two-level sparse voxel tree in accordance with some embodiments.

FIG. 38 illustrates a two-level sparse voxel tree 3800 in accordance with some embodiments which contains occupied voxels in locations {15,0,3} and {15,0,15} of a particular volume. The upper level-0 of the tree 3801 in this case (which subdivides the particular volume into 64 upper level-0 voxels) contains two voxel entries {3,0,0} and {3,0,3} with corresponding data 3804 that shows two voxels are set (or occupied). The next level of the sparse voxel tree (SVT) is provided as an array of 64-bit integers that contains two sub-cubes 3802 and 3803, one for each voxel set in level 0. In the level 1 sub-array 3805, two voxels are set as occupied, v15 and v63, and all other voxels set as unoccupied and the tree. This format is flexible as 64-entries in the next level of the tree are always allocated in correspondence to each set voxel in the upper layer of the tree. This flexibility can allow dynamically changing scene geometry to be inserted into an existing volumetric data structure in a flexible manner (i.e., rather than in a fixed order, such as randomly), as long as the corresponding voxel in the upper layers have been set. If not, either a table of pointers would be maintained, leading to higher memory requirements, or else the tree would be required to be at least partially rebuilt in order to insert unforeseen geometry.

Figure 39:
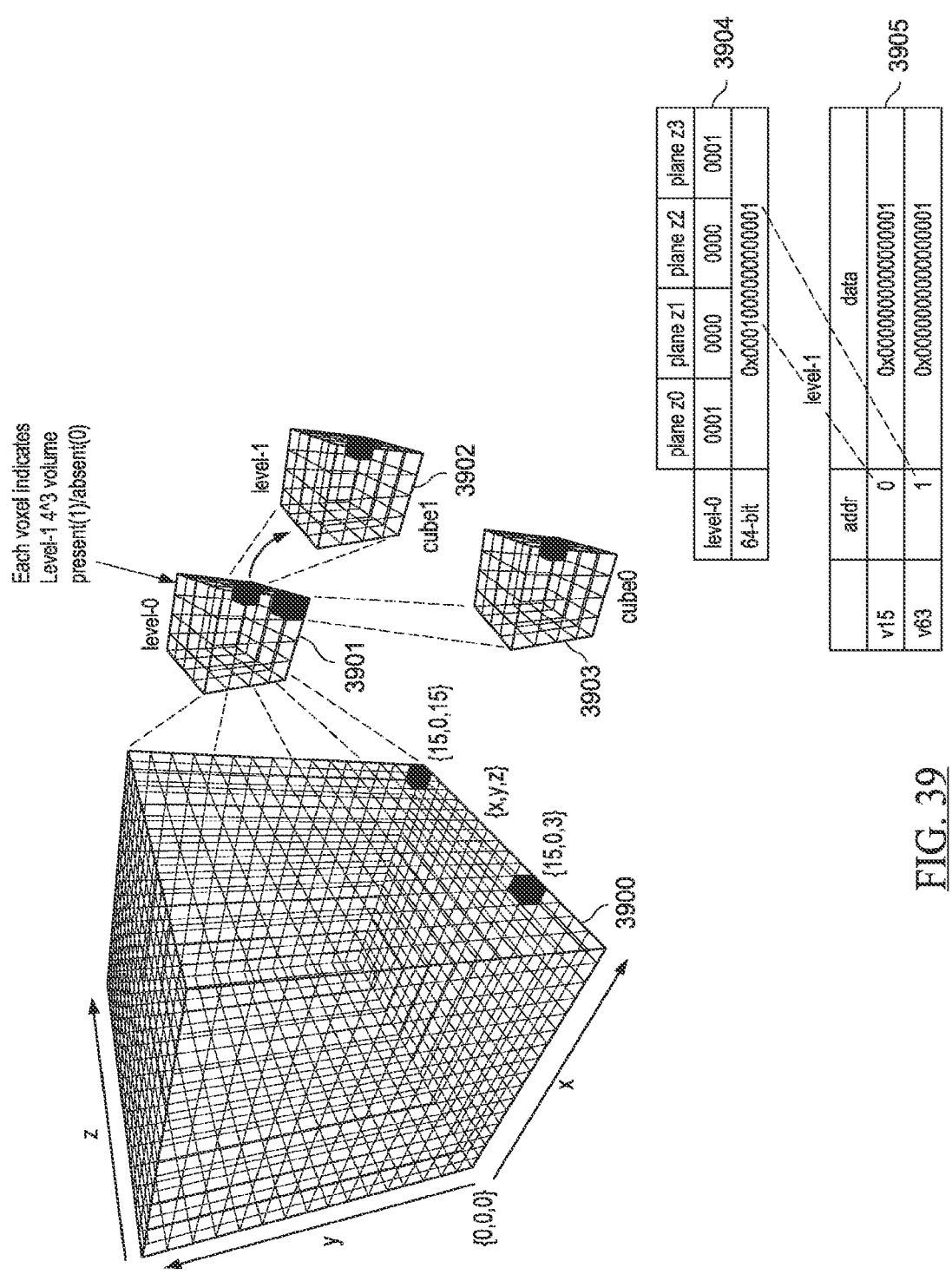
FIG. 39 illustrates storage of example voxel data in accordance with some embodiments.

FIG. 39 illustrates an alternate technique for storing the voxels from FIG. 38 in accordance with some embodiments. In this example, the overall volume 3900 contains two voxels stored at global coordinates {15,0,3} and {15,0,15} as in FIG. 23. In this approach, rather than allocating a 64-entry array to represent all of the sub-cubes in level 1 below level 0, only those elements in level 1, which actually contain geometry (e.g., as indicated by whether or not the corresponding level 0 voxels are occupier or not) are allocated as corresponding 64-bit level 1 records, such that the level 1, in this example, has only two 64-bit entries rather than sixty-four (i.e., for each of the 64 level-1 voxels, whether occupied or empty). Accordingly, in this example, the first level 0 3904 is equivalent to 3804 in FIG. 38 while the next level 3905 is 62 times smaller in terms of memory requirement than the corresponding 3805 in FIG. 38. In some implementations, if new geometry is to be inserted into level 0 for which space has not been allocated in level 1, the tree has to be copied and rearranged.

In the example of FIG. 39, the sub-volumes can be derived by counting the occupied voxels in the layer above the current layer. In this way, the system may determine where, in the voxel data, one higher layer ends and the next lower layer begins. For instance, if three layer-0 voxels are occupied, the system may expect that three corresponding layer-1 entries will following in the voxel data, and that the next entry (after these three) corresponds to the first entry in layer-2, and so on. Such optimal compaction can be very useful where certain parts of the scene do not vary over time or where remote transmission of volumetric data is required in the application, say from a space probe scanning the surface of Pluto where every bit is costly and time-consuming to transmit.

Figure 40:
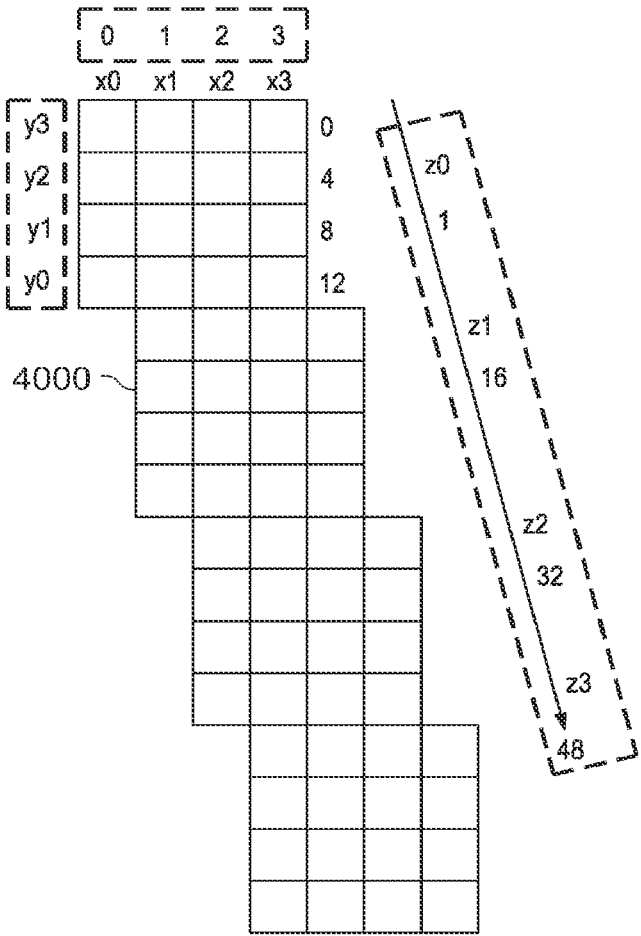
FIG. 40 illustrates insertion of a voxel into an example volumetric data structure in accordance with some embodiments.

FIG. 40 illustrates the manner in which a voxel may be inserted into a 4ˆ3 cube represented as a 64 bit integer volumetric data structure entry, to reflect a change to geometry within the corresponding volume, in accordance with some embodiments. In one example, each voxel cube may be organized as four logical 16-bit planes within a 64-bit integer as shown in 4000. Each of the planes corresponds to Z values 0 through to 3, and within each plane each y-value codes for 4 logical 4-bit displacements 0 through 3, and finally within each 4-bit y-plane each bit codes for 4 possible values of x, 0 through 3, among other example organizations. Thus, in this example, to insert a voxel into a 4ˆ3 volume, first a 1-bit may be shifted by the x-value 0 to 3, then that value may be shifted by 0/4/8/12 bits to encode the y-value, and finally the z-value may be represented by a shift of 0/16/32/48-bits as shown in the C-code expression in 4001. Finally, as each 64-bit integer may be a combination of up to 64 voxels, each of which is written separately, the new bitmap must be logically combined with the old 64-bit value read from the sparse voxel tree by ORing the old and new bitmap values as shown in 4002.

Figure 41:
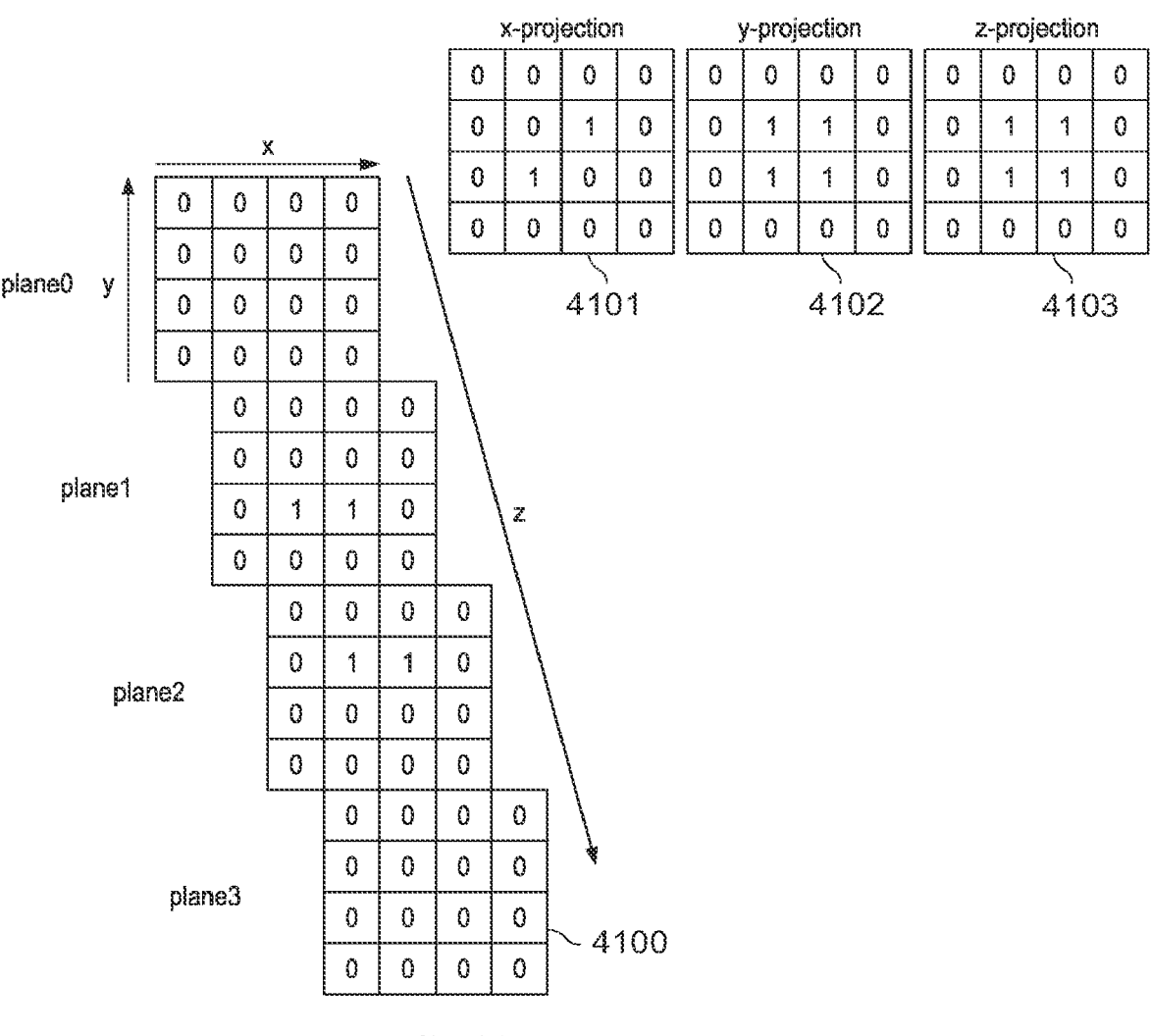
FIG. 41 illustrates projection of an example 3D volumetric object, in accordance with some embodiments.
Figure 42A:
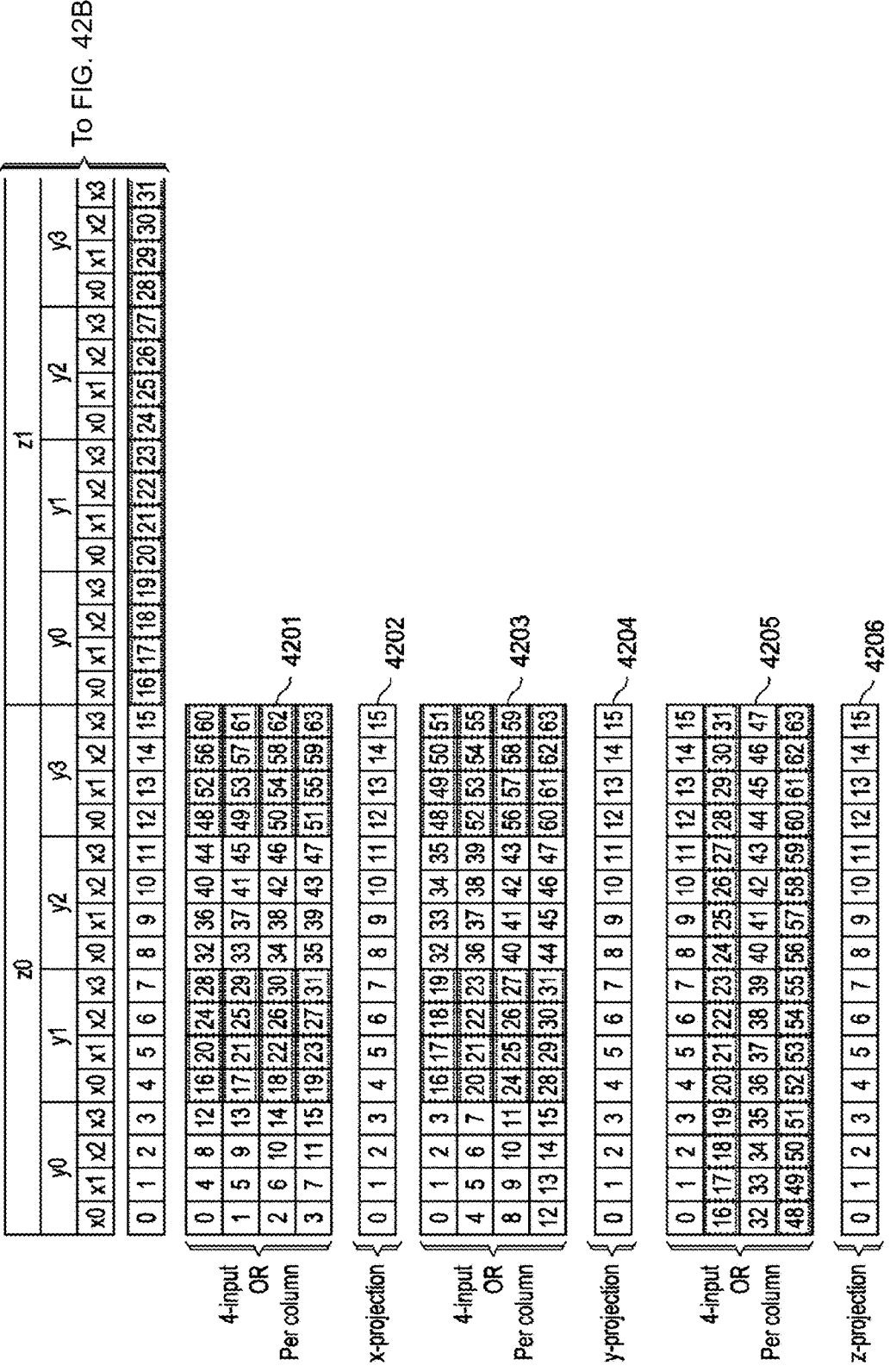
FIG. 42 illustrates example operations involving an example volumetric data structure.
Figure 42B:
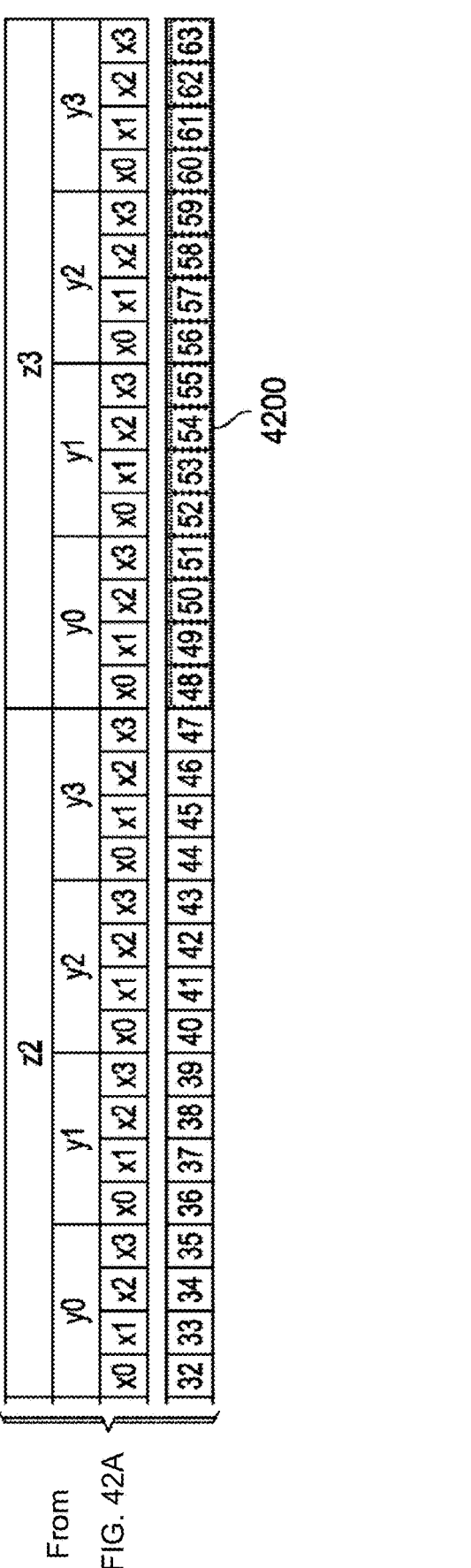

Turning to FIG. 41, a representation is shown to illustrate, in accordance with some embodiments, how a 3D volumetric object stored in a 64-bit integer 4100 can be projected by logical ORing in the X direction to produce the 2D pattern 4101, in the Y-direction to produce the 2D output 4102 and finally in the Z-direction to produce the pattern shown in 4103. FIG. 42 illustrates, in accordance with some embodiments, how bits from the input 64-bit integer are logically ORed to produce the output projections in X, Y and Z. In this example, table 4201 shows column-wise which element indices from the input vector 4200 are ORed to produce the x-projection output vector 4202. Table 4203 shows column-wise which element indices from the input vector 4200 are ORed to produce the y-projection output vector 4204. Finally 4205 shows column-wise which element indices from the input vector 4200 are ORed to produce the z-projection output vector 4206.

The X-projection logically ORs bits 0,1,2,3 from the input data 4200 to produce bit 0 of the X-projection 4201. For instance, bit 1 in 4201 may be produced by ORing bits 4, 5,

6, and 7 from 4200, and so on. Similarly, bit 0 in the Y-projection 4204 may be produced by ORing together bits 0, 4, 8, and 12 of 4200. And bit 1 of 4204 is produced by ORing together bits 1, 5, 9, and 13 of 4200 etc. Finally bit 0 in the Z-projection 4206 is produced by ORing together bits 0, 16, 32, and 48 of 4200. And bit 1 of 4206 may be produced by ORing together bits 1, 17, 33, and 49 of 4200, and so on.

Figure 43:
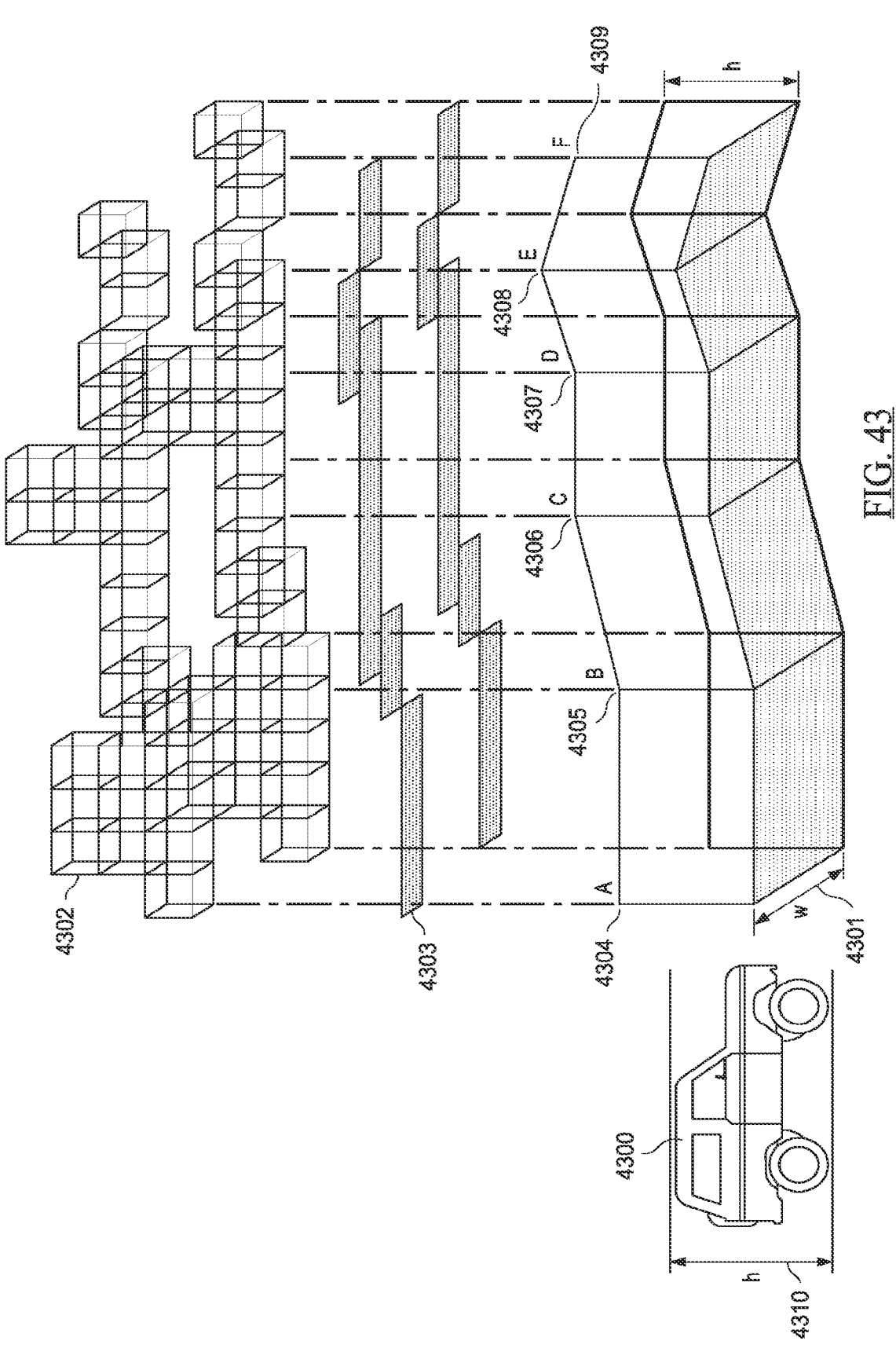
FIG. 43 shows using projections to generate simplified maps in accordance with some embodiments.

FIG. 43 shows an example of how projections can be used to generate simplified maps in accordance with some embodiments. In this scenario, the goal may be to produce a compact 2D map of paths down which a vehicle 4300 of height h 4310 and width w 4301 from a voxel volume 4302. Here the Y-projection logic can be used to generate an initial crude 2D map 4303 from the voxel volume 4302. In some implementations the map may be processed to check whether a particular vehicle (e.g., a car (or autonomous car), drone, etc.) of particular dimensions can pass through the width 4301 and height constraints 4310 of the path. This may be performed in order to ensure the paths are passable by performing projections in Z to check the width constraint 4301 and the projections in Y can be masked to limit calculations to the height of the vehicle 4310. With additional post processing (e.g., in software) it can be seen that for paths which are passable and satisfy the width and height constraints only the X and Z, coordinates of the points A 4304, B 4305, C 4306, D 4307, E 4308 and F 4309 along the path may only be stored or transmitted over a network in order to fully reconstruct the legal paths along which the vehicle can travel. Given that the path can be resolved into such piecewise segments it's possible to fully describe the path with only a byte or two per piecewise linear section of the path. This may assist in the fast transmission and processing of such path data (e.g., by an autonomous vehicle), among other examples.

Figures 44, 45:
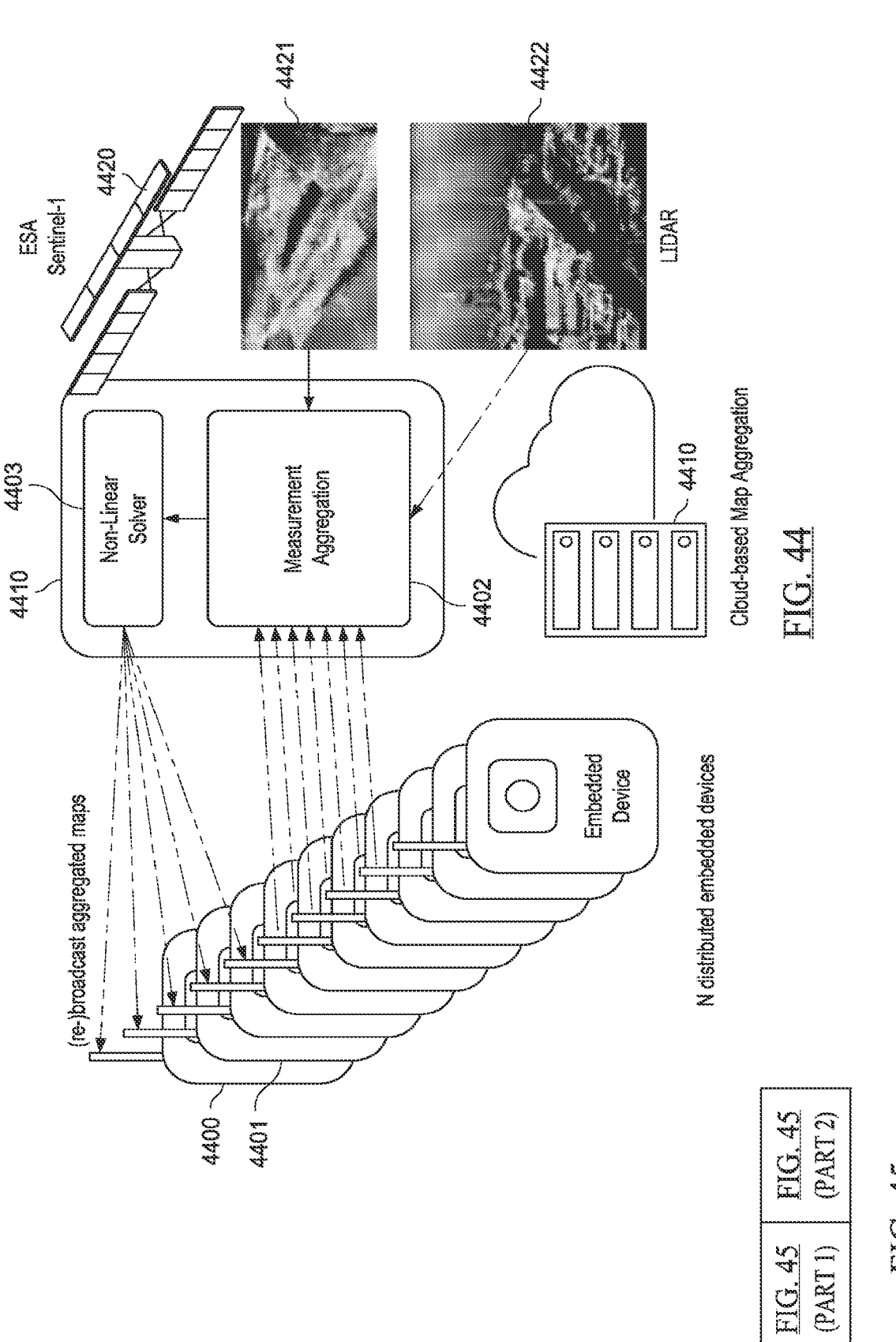
FIG. 44 illustrates example aggregation of example volumetric 3D and/or simple 2D measurements from embedded devices in accordance with some embodiments.
FIG. 45 shows the example acceleration of 2D Path-Finding on a 2D 2×2 bitmap in accordance with some embodiments.
Figure 45B:
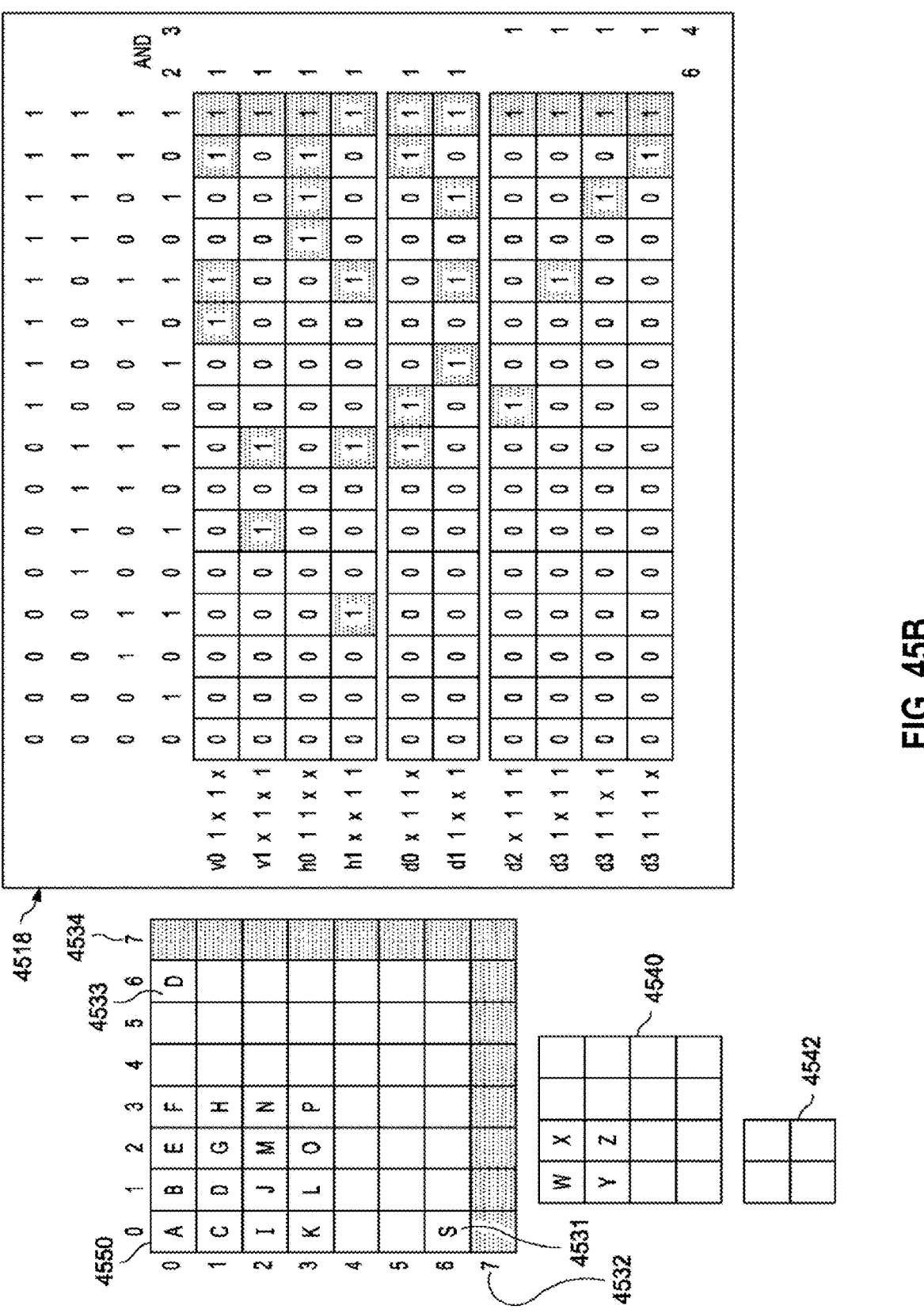

FIG. 44 illustrates how either volumetric 3D or simple 2D measurements from embedded devices can be aggregated in accordance with some embodiments by mathematical means in order to generate high-quality crowd-sourced maps as an alternative to using LIDAR or other expensive means to make precision measurements. In the proposed system a plurality of embedded devices 4400, 4401, etc. may be equipped with various sensors capable of taking measurements, which may be transmitted to a central server 4410. Software running on the server performs aggregation of all of the measurements 4402 and performs a numerical solve by non-linear solver 4403 of the resulting matrix to produce a highly accurate map, which can then be redistributed back to the embedded devices. Indeed, the data aggregation can also include high accuracy survey data from satellites 4420, aerial LIDAR surveys 4421 and terrestrial LIDAR measurements 4422 to increase the accuracy of the resulting maps where these high fidelity datasets are available. In some implementations, the map and/or the recorded measurements may be generated in, converted to, or otherwise expressed using sparse voxel data structures with formats such as described herein, among other example implementations.

Figure 45A:
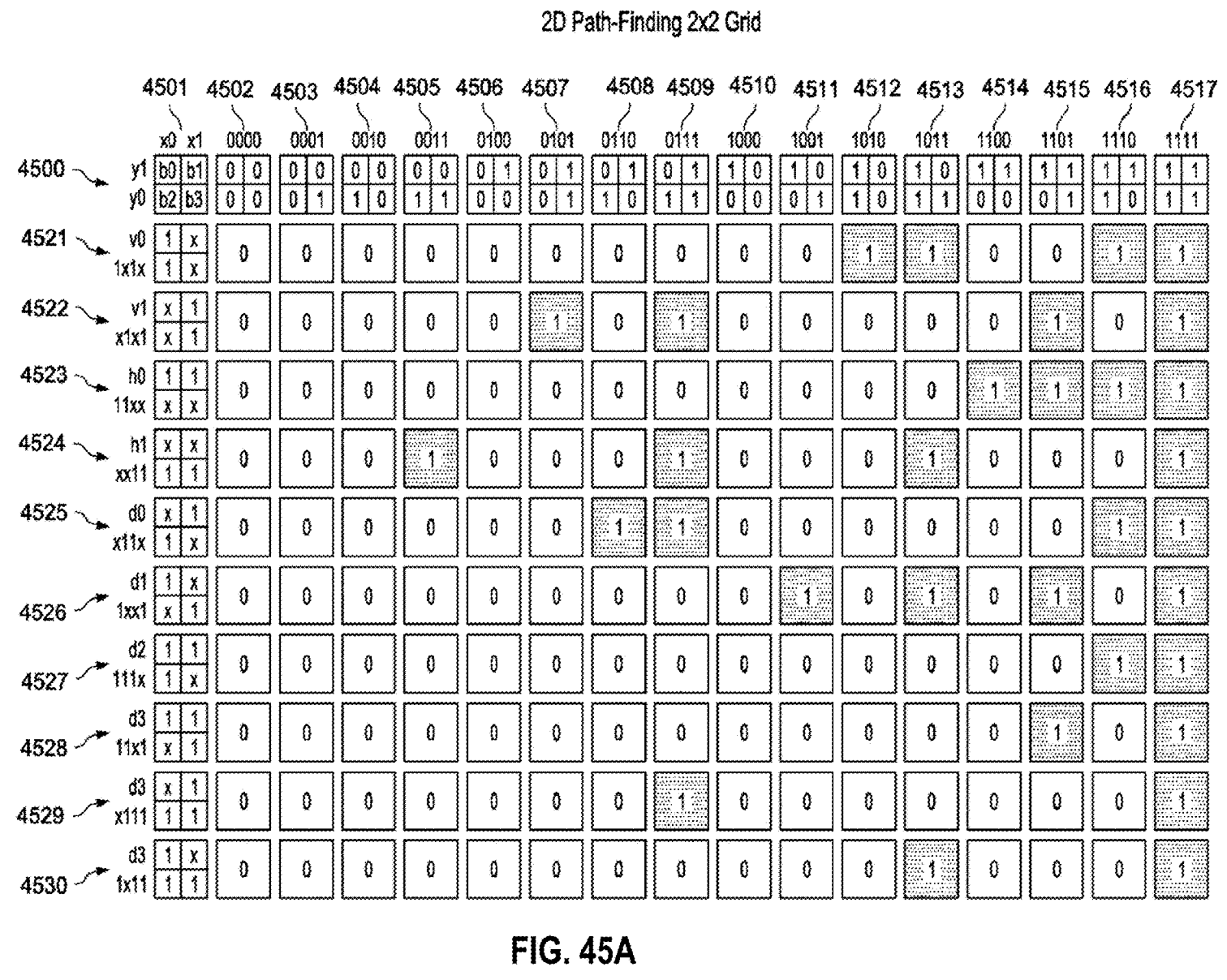

FIG. 45 is a diagram showing how 2D Path-Finding on a 2D 2×2 bitmap can be accelerated in accordance with some embodiments. The principal of operation is that for connectivity to exist between points on a map of identical grid cells the values of a contiguous run of cells in x or y or x and y must all be set to one. So a logical AND of bits drawn from those cells can be instantiated to test the bitmap in the grid for the existence of a valid path, and a different AND gate can be instantiated for each valid path through the N×N grid.

In some instances, this approach may introduce combinatorial complexity in that even an 8×8 2D grid could contain $2^{64}-1$ valid paths. Accordingly, in some improved implementations, the grid may be reduced to 2×2 or 4×4 tiles which can be hierarchically tested for connectivity. A 2×2 bitmap 4500, contains 4 bits labeled b0, b1, b2 and b3. The 4 bits can take on the values 0000 through to 1111 with corresponding labels 4501 through to 4517. Each of these bit patterns expresses varying levels of connectivity between faces of the 2×2 grid labelled 4521 through to 4530. For instance 4521 or v0 denoting vertical connectivity between x0 and y0 in 4500 exists when the 2×2 grid 4500 contains bitmaps 1010 (7112), 1011 (7113), 1110 (7116) or 1111 (7117). A 2-input logical AND or b0 and b3 in 4500 as shown in row 1 of table 4518 generates v0 in the connectivity map that can be used in higher level hardware or software to decide on global connectivity through a global grid that has been subdivided into 2×2 sub grids. If the global map contains an odd number of grid points on either x or y axis the top level grid will require padding out to the next highest even number of grid points (e.g., such that 1 extra row of zeroes will need is added to the x- and/or y-axes on the global grid). FIG. 45 further shows an exemplary 7×7 grid 4550 showing how it is padded out to 8×8 by adding an additional row 4532 and column 4534 filled with zeroes. In order to speed up path-finding compared to the other techniques (e.g., depth-first search, breadth-first search or Dijkstra's algorithm, or other graph-based approaches), the present example may sub-sample the N×N map 4550 progressively town to a 2×2 map. For instance in this example cell W in 4540 is populated by ORing the contents of cells A, B, C and D in 4550, and so on. In turn the bits in 2×2 cells in 4540 are ORed to populate the cells in 4542. In terms of path-finding the algorithm starts from the smallest 2×2 representation of the grid 4542 and tests each of the bits. Only the parts of the 4×4 grid in 4540 (composed of four 2×2 grids) corresponding to one bits in the 2×2 grid 4542 need be tested for connectivity as we know that a zero bit means that there is no corresponding 2×2 grid cell in 4540. This approach can also be used in searching the 8×8 grid in 4520, for example if cell W in 4540 contains a zero then we know that there is no path in ABCD in 4520 etc. This approach prunes branches from the graph search algorithm used whether it be A*, Dijkstra, DFS, BFS or variants thereof. In addition to this, the use of a hardware basic path-finder with 2×2 organization 4518 may further limit the associated computations. Indeed, a 4×4 basic hardware element can be composed using a five 2×2 hardware blocks with the same arrangement as 4540 and 4542 further constraining the amount of graph searching that needs to be performed. Furthermore an 8×8 hardware-based search engine can be constructed with twenty one 2×2 HW blocks (7118) with the same arrangement as 4542, 4540, 4500, and so on for potentially any N×N topology.

Figure 46:
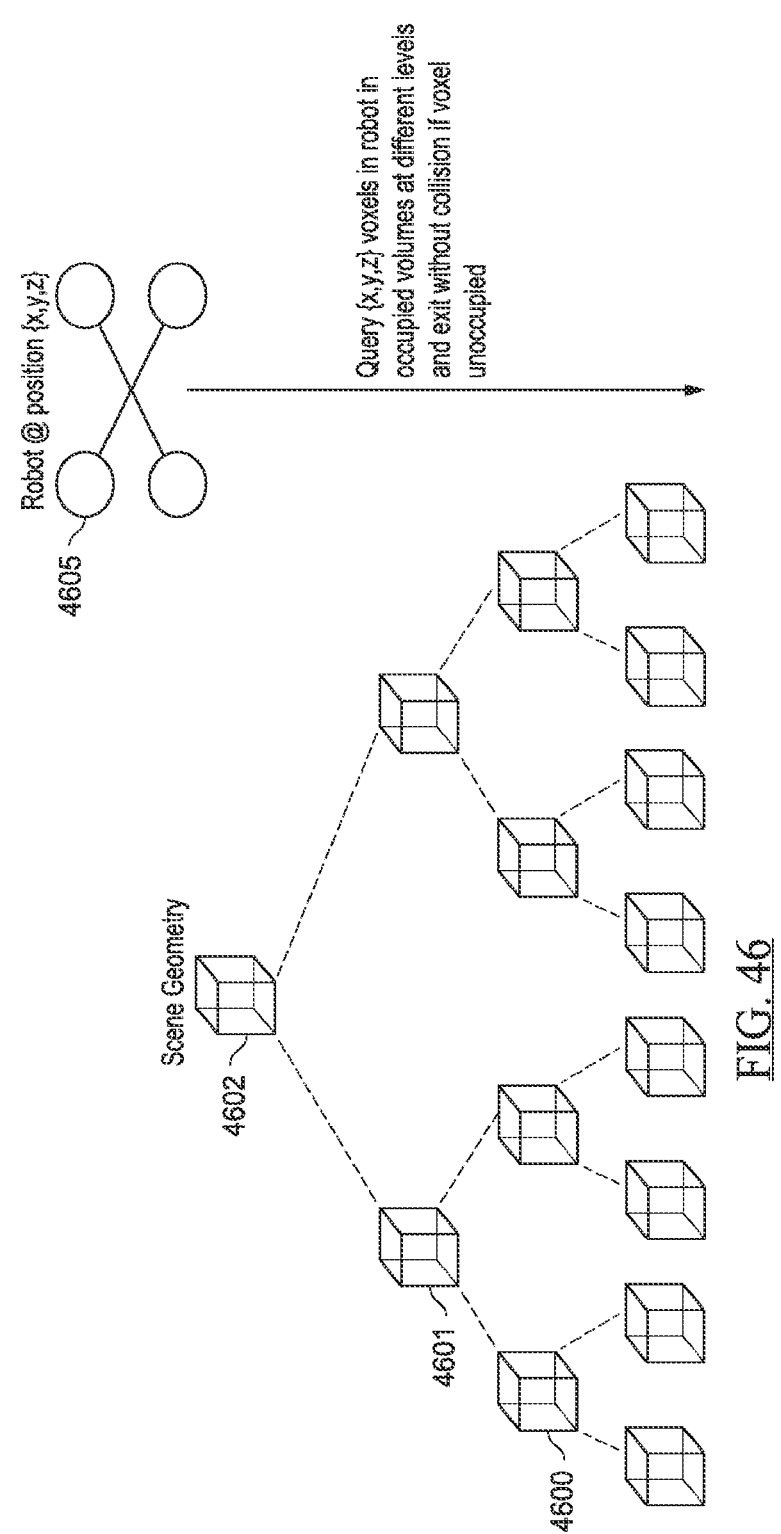
FIG. 46 shows the example acceleration of collision detection using an example volumetric data structure in accordance with some embodiments.

FIG. 46 is a simplified block diagram showing how collision detection can be accelerated using the proposed volumetric data structure in accordance with some embodiments. The 3D N×N×N map of the geometry can be sub-sampled into a pyramid consisting of a lowest Level of Detail (LoD) 2×2×2 volume 4602, a next highest 4×4×4 volume 4601, an 8×8×8 volume 4600, and so on all the way up to N×N×N. If the position of the drone, vehicle, or robot 4605 is known in 3D space via either a location means such as GPS, or via relocalization from a 3D map, then it can rapidly be used to test for the presence or absence of geometry in a quadrant of the relevant 2×2×2 sub-volume by scaling the x, y and z positions of the drone/robot appropriately (dividing them by 2 the relevant number of times) and querying 4602 for the presence of geometry (e.g., checking if the corresponding bitmap bit is one indicating a possible collision). If a possible collision exists (e.g., a "1" is found) then further checks in volumes 4601, 4600, etc. may be performed to establish if the drone/robot can move or not. However, if a voxel in 4602 is free (e.g., "0"), then the robot/drone can interpret the same as free space and manipulate directional control to move freely through a large part of the map.

While some of the systems and solution described and illustrated herein have been described as containing or being associated with a plurality of elements, not all elements explicitly illustrated or described may be utilized in each alternative implementation of the present disclosure. Additionally, one or more of the elements described herein may be located external to a system, while in other instances, certain elements may be included within or as a portion of one or more of the other described elements, as well as other elements not described in the illustrated implementation. Further, certain elements may be combined with other components, as well as used for alternative or additional purposes in addition to those purposes described herein.

Further, it should be appreciated that the examples presented above are non-limiting examples provided merely for purposes of illustrating certain principles and features and not necessarily limiting or constraining the potential embodiments of the concepts described herein. For instance, a variety of different embodiments can be realized utilizing various combinations of the features and components described herein, including combinations realized through the various implementations of components described herein. Other implementations, features, and details should be appreciated from the contents of this Specification.

FIGS. 47-52 are block diagrams of exemplary computer architectures that may be used in accordance with embodiments disclosed herein. Indeed, computing devices, processors, and other logic and circuitry of the systems described herein may incorporate all or a portion of the functionality and supporting software and/or hardware circuitry to implement such functionality. Further, other computer architecture designs known in the art for processors and computing systems may also be used beyond the examples shown here. Generally, suitable computer architectures for embodiments disclosed herein can include, but are not limited to, configurations illustrated in FIGS. 47-52.

Figure 47:
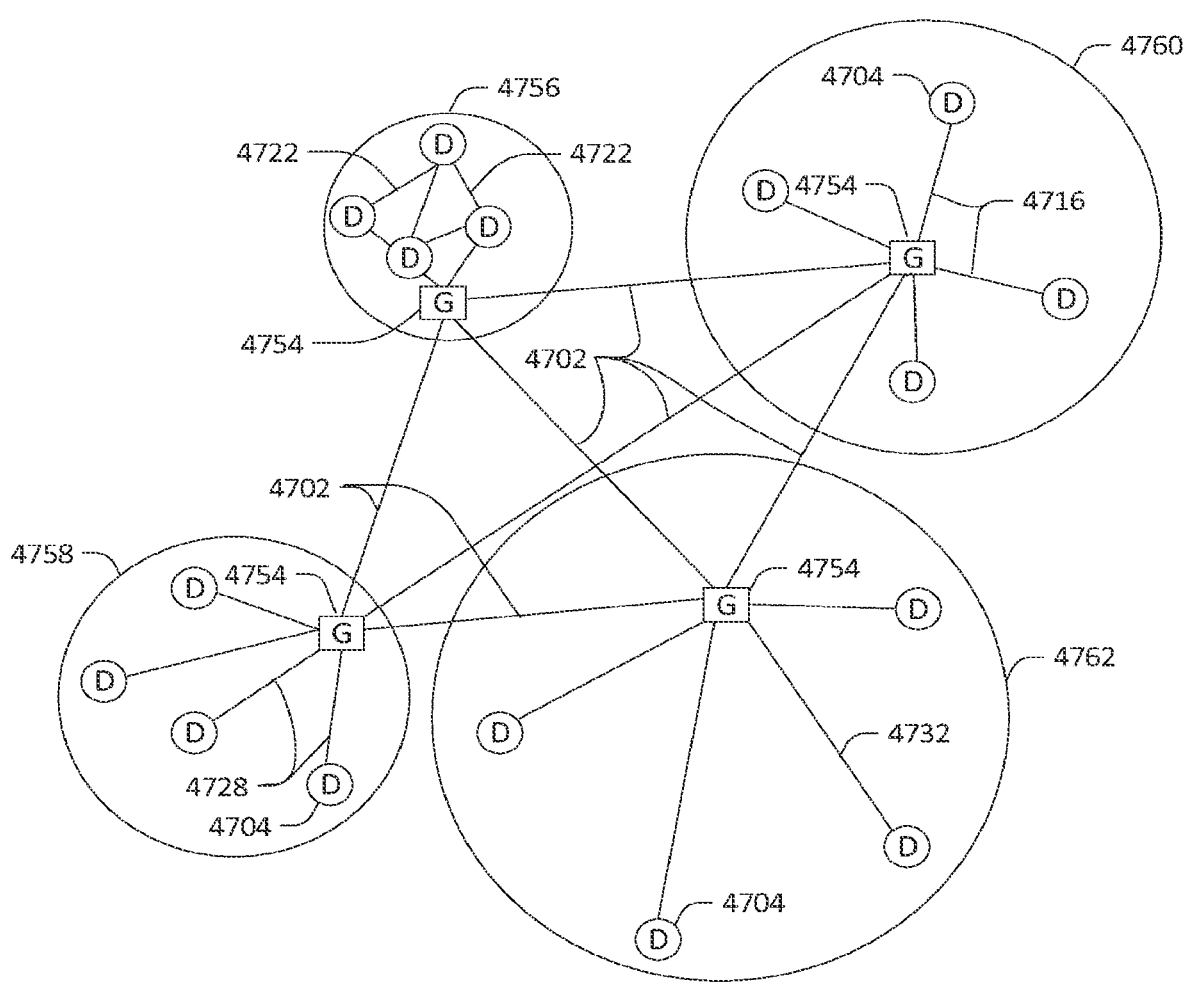
FIG. 47 is a simplified block diagram of an exemplary network with devices in accordance with at least some embodiments.

FIG. 47 illustrates an example domain topology for respective internet-of-things (IoT) networks coupled through links to respective gateways. The internet of things (IoT) is a concept in which a large number of computing devices are interconnected to each other and to the Internet to provide functionality and data acquisition at very low levels. Thus, as used herein, an IoT device may include a semiautonomous device performing a function, such as sensing or control, among others, in communication with other IoT devices and a wider network, such as the Internet. Such IoT devices may be equipped with logic and memory to implement and use hash tables, such as introduced above.

Often, IoT devices are limited in memory, size, or functionality, allowing larger numbers to be deployed for a similar cost to smaller numbers of larger devices. However, an IoT device may be a smart phone, laptop, tablet, or PC, or other larger device. Further, an IoT device may be a virtual device, such as an application on a smart phone or other computing device. IoT devices may include IoT gateways, used to couple IoT devices to other IoT devices and to cloud applications, for data storage, process control, and the like.

Networks of IoT devices may include commercial and home automation devices, such as water distribution systems, electric power distribution systems, pipeline control systems, plant control systems, light switches, thermostats, locks, cameras, alarms, motion sensors, and the like. The IoT devices may be accessible through remote computers, servers, and other systems, for example, to control systems or access data.

Figure 48:
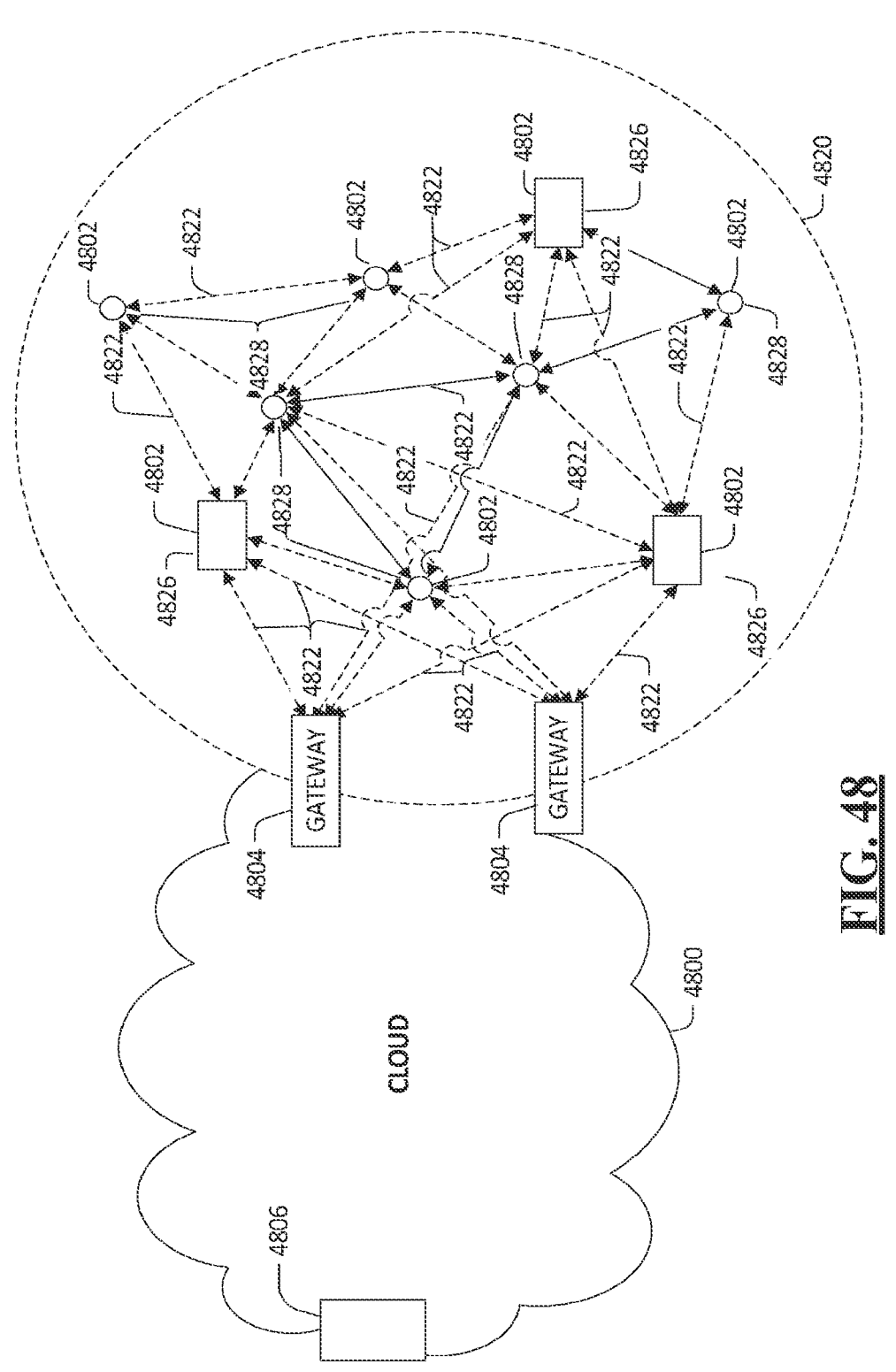
FIG. 48 is a simplified block diagram of an exemplary fog or cloud computing network in accordance with at least some embodiments.

The future growth of the Internet and like networks may involve very large numbers of IoT devices. Accordingly, in the context of the techniques discussed herein, a number of innovations for such future networking will address the need for all these layers to grow unhindered, to discover and make accessible connected resources, and to support the ability to hide and compartmentalize connected resources. Any number of network protocols and communications standards may be used, wherein each protocol and standard is designed to address specific objectives. Further, the protocols are part of the fabric supporting human accessible services that operate regardless of location, time or space. The innovations include service delivery and associated infrastructure, such as hardware and software; security enhancements; and the provision of services based on Quality of Service (QoS) terms specified in service level and service delivery agreements. As will be understood, the use of IoT devices and networks, such as those introduced in FIGS. 47 and 48, present a number of new challenges in a heterogeneous network of connectivity comprising a combination of wired and wireless technologies.

FIG. 47 specifically provides a simplified drawing of a domain topology that may be used for a number of internet-of-things (IoT) networks comprising IoT devices 4704, with the IoT networks 4756, 4758, 4760, 4762, coupled through backbone links 4702 to respective gateways 4754. For example, a number of IoT devices 4704 may communicate with a gateway 4754, and with each other through the gateway 4754. To simplify the drawing, not every IoT device 4704, or communications link (e.g., link 4716, 4722, 4728, or 4732) is labeled. The backbone links 4702 may include any number of wired or wireless technologies, including optical networks, and may be part of a local area network (LAN), a wide area network (WAN), or the Internet. Additionally, such communication links facilitate optical signal paths among both IoT devices 4704 and gateways 4754, including the use of MUXing/deMUXing components that facilitate interconnection of the various devices.

The network topology may include any number of types of IoT networks, such as a mesh network provided with the network 4756 using Bluetooth low energy (BLE) links 4722. Other types of IoT networks that may be present include a wireless local area network (WLAN) network 4758 used to communicate with IoT devices 4704 through IEEE 802.11 (Wi-Fi®) links 4728, a cellular network 4760 used to communicate with IoT devices 4704 through an LTE/LTE-A (4G) or 5G cellular network, and a low-power wide area (LPWA) network 4762, for example, a LPWA network compatible with the LoRaWan specification promulgated by the LoRa alliance, or a IPv6 over Low Power Wide-Area Networks (LPWAN) network compatible with a specification promulgated by the Internet Engineering Task Force (IETF). Further, the respective IoT networks may communicate with an outside network provider (e.g., a tier 2 or tier 3 provider) using any number of communications links, such as an LTE cellular link, an LPWA link, or a link based on the IEEE 802.15.4 standard, such as Zigbee®. The respective IoT networks may also operate with use of a variety of network and internet application protocols such as Constrained Application Protocol (CoAP). The respective IoT networks may also be integrated with coordinator devices that provide a chain of links that forms cluster tree of linked devices and networks.

Each of these IoT networks may provide opportunities for new technical features, such as those as described herein. The improved technologies and networks may enable the exponential growth of devices and networks, including the use of IoT networks into as fog devices or systems. As the use of such improved technologies grows, the IoT networks may be developed for self-management, functional evolution, and collaboration, without needing direct human intervention. The improved technologies may even enable IoT networks to function without centralized controlled systems. Accordingly, the improved technologies described herein may be used to automate and enhance network management and operation functions far beyond current implementations.

In an example, communications between IoT devices 4704, such as over the backbone links 4702, may be protected by a decentralized system for authentication, authorization, and accounting (AAA). In a decentralized AAA system, distributed payment, credit, audit, authorization, and authentication systems may be implemented across interconnected heterogeneous network infrastructure. This allows systems and networks to move towards autonomous operations. In these types of autonomous operations, machines may even contract for human resources and negotiate partnerships with other machine networks. This may allow the achievement of mutual objectives and balanced service delivery against outlined, planned service level agreements as well as achieve solutions that provide metering, measurements, traceability and trackability. The creation of new supply chain structures and methods may enable a multitude of services to be created, mined for value, and collapsed without any human involvement.

Such IoT networks may be further enhanced by the integration of sensing technologies, such as sound, light, electronic traffic, facial and pattern recognition, smell, vibration, into the autonomous organizations among the IoT devices. The integration of sensory systems may allow systematic and autonomous communication and coordination of service delivery against contractual service objectives, orchestration and quality of service (QoS) based swarming and fusion of resources. Some of the individual examples of network-based resource processing include the following.

The mesh network 4756, for instance, may be enhanced by systems that perform inline data-to-information transforms. For example, self-forming chains of processing resources comprising a multi-link network may distribute the transformation of raw data to information in an efficient manner, and the ability to differentiate between assets and resources and the associated management of each. Furthermore, the proper components of infrastructure and resource based trust and service indices may be inserted to improve the data integrity, quality, assurance and deliver a metric of data confidence.

The WLAN network 4758, for instance, may use systems that perform standards conversion to provide multi-standard connectivity, enabling IoT devices 4704 using different protocols to communicate. Further systems may provide seamless interconnectivity across a multi-standard infrastructure comprising visible Internet resources and hidden Internet resources.

Communications in the cellular network 4760, for instance, may be enhanced by systems that offload data, extend communications to more remote devices, or both. The LPWA network 4762 may include systems that perform non-Internet protocol (IP) to IP interconnections, addressing, and routing. Further, each of the IoT devices 4704 may include the appropriate transceiver for wide area communications with that device. Further, each IoT device 4704 may include other transceivers for communications using additional protocols and frequencies. This is discussed further with respect to the communication environment and hardware of an IoT processing device depicted in FIGS. 49 and 50.

Finally, clusters of IoT devices may be equipped to communicate with other IoT devices as well as with a cloud network. This may allow the IoT devices to form an ad-hoc network between the devices, allowing them to function as a single device, which may be termed a fog device. This configuration is discussed further with respect to FIG. 48 below.

FIG. 48 illustrates a cloud computing network in communication with a mesh network of IoT devices (devices 4802) operating as a fog device at the edge of the cloud computing network. The mesh network of IoT devices may be termed a fog 4820, operating at the edge of the cloud 4800. To simplify the diagram, not every IoT device 4802 is labeled.

The fog 4820 may be considered to be a massively interconnected network wherein a number of IoT devices 4802 are in communications with each other, for example, by radio links 4822. As an example, this interconnected network may be facilitated using an interconnect specification released by the Open Connectivity Foundation™ (OCF). This standard allows devices to discover each other and establish communications for interconnects. Other interconnection protocols may also be used, including, for example, the optimized link state routing (OLSR) Protocol, the better approach to mobile ad-hoc networking (B.A.T-.M.A.N.) routing protocol, or the OMA Lightweight M2M (LWM2M) protocol, among others.

Three types of IoT devices 4802 are shown in this example, gateways 4804, data aggregators 4826, and sensors 4828, although any combinations of IoT devices 4802 and functionality may be used. The gateways 4804 may be edge devices that provide communications between the cloud 4800 and the fog 4820, and may also provide the backend process function for data obtained from sensors 4828, such as motion data, flow data, temperature data, and the like. The data aggregators 4826 may collect data from any number of the sensors 4828, and perform the back end processing function for the analysis. The results, raw data, or both may be passed along to the cloud 4800 through the gateways 4804. The sensors 4828 may be full IoT devices 4802, for example, capable of both collecting data and processing the data. In some cases, the sensors 4828 may be more limited in functionality, for example, collecting the data and allowing the data aggregators 4826 or gateways 4804 to process the data.

Communications from any IoT device 4802 may be passed along a convenient path (e.g., a most convenient path) between any of the IoT devices 4802 to reach the gateways 4804. In these networks, the number of interconnections provide substantial redundancy, allowing communications to be maintained, even with the loss of a number of IoT devices 4802. Further, the use of a mesh network may allow IoT devices 4802 that are very low power or located at a distance from infrastructure to be used, as the range to connect to another IoT device 4802 may be much less than the range to connect to the gateways 4804.

The fog 4820 provided from these IoT devices 4802 may be presented to devices in the cloud 4800, such as a server 4806, as a single device located at the edge of the cloud 4800, e.g., a fog device. In this example, the alerts coming from the fog device may be sent without being identified as coming from a specific IoT device 4802 within the fog 4820. In this fashion, the fog 4820 may be considered a distributed platform that provides computing and storage resources to perform processing or data-intensive tasks such as data analytics, data aggregation, and machine-learning, among others.

In some examples, the IoT devices 4802 may be configured using an imperative programming style, e.g., with each IoT device 4802 having a specific function and communication partners. However, the IoT devices 4802 forming the fog device may be configured in a declarative programming style, allowing the IoT devices 4802 to reconfigure their operations and communications, such as to determine needed resources in response to conditions, queries, and device failures. As an example, a query from a user located at a server 4806 about the operations of a subset of equipment monitored by the IoT devices 4802 may result in the fog 4820 device selecting the IoT devices 4802, such as particular sensors 4828, needed to answer the query. The data from these sensors 4828 may then be aggregated and analyzed by any combination of the sensors 4828, data aggregators 4826, or gateways 4804, before being sent on by the fog 4820 device to the server 4806 to answer the query. In this example, IoT devices 4802 in the fog 4820 may select the sensors 4828 used based on the query, such as adding data from flow sensors or temperature sensors. Further, if some of the IoT devices 4802 are not operational, other IoT devices 4802 in the fog 4820 device may provide analogous data, if available.

In other examples, the operations and functionality described above may be embodied by a IoT device machine in the example form of an electronic processing system, within which a set or sequence of instructions may be executed to cause the electronic processing system to perform any one of the methodologies discussed herein, according to an example embodiment. The machine may be an IoT device or an IoT gateway, including a machine embodied by aspects of a personal computer (PC), a tablet PC, a personal digital assistant (PDA), a mobile telephone or smartphone, or any machine capable of executing instructions (sequential or otherwise) that specify actions to be taken by that machine. Further, while only a single machine may be depicted and referenced in the example above, such machine shall also be taken to include any collection of machines that individually or jointly execute a set (or multiple sets) of instructions to perform any one or more of the methodologies discussed herein. Further, these and like examples to a processor-based system shall be taken to include any set of one or more machines that are controlled by or operated by a processor (e.g., a computer) to individually or jointly execute instructions to perform any one or more of the methodologies discussed herein. In some implementations, one or more multiple devices may operate cooperatively to implement functionality and perform tasks described herein. In some cases, one or more host devices may supply data, provide instructions, aggregate results, or otherwise facilitate joint operations and functionality provided by multiple devices. While functionality, when implemented by a single device, may be considered functionality local to the device, in implementations of multiple devices operating as a single machine, the functionality may be considered local to the devices collectively, and this collection of devices may provide or consume results provided by other, remote machines (implemented as a single device or collection devices), among other example implementations.

Figure 49:
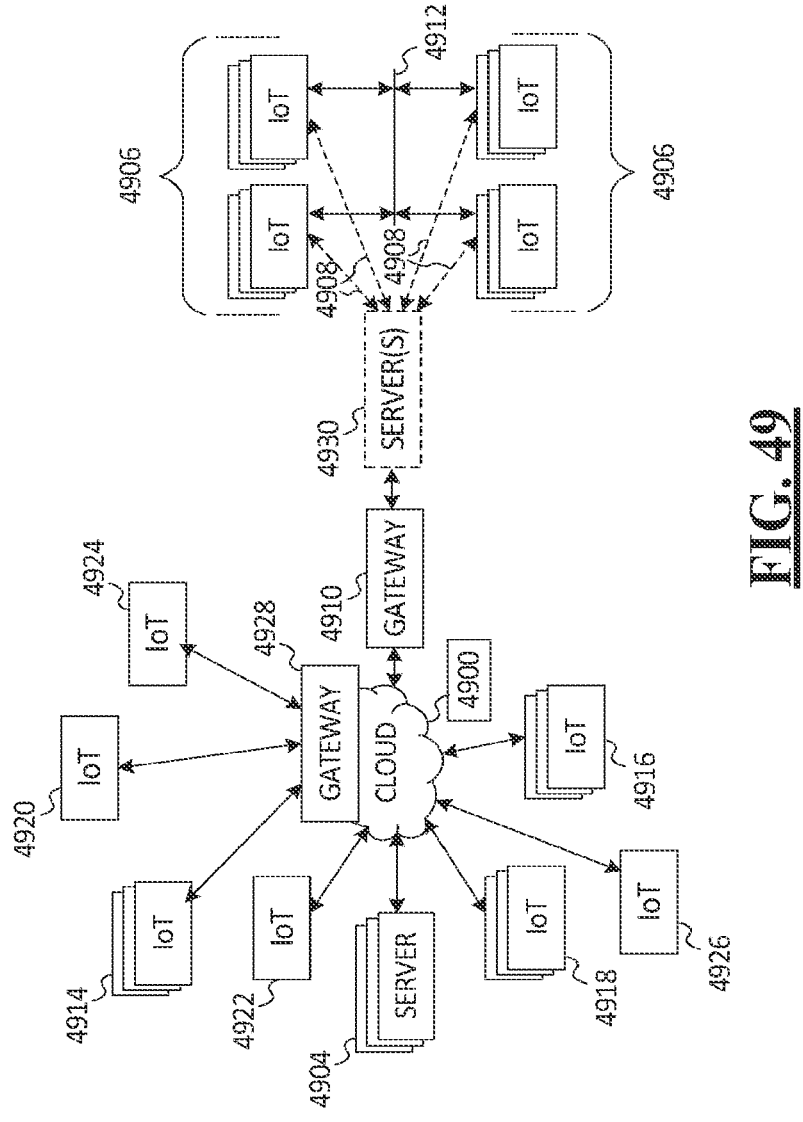
FIG. 49 is a simplified block diagram of a system including example devices in accordance with at least some embodiments.

For instance, FIG. 49 illustrates a drawing of a cloud computing network, or cloud 4900, in communication with a number of Internet of Things (IoT) devices. The cloud 4900 may represent the Internet, or may be a local area network (LAN), or a wide area network (WAN), such as a proprietary network for a company. The IoT devices may include any number of different types of devices, grouped in various combinations. For example, a traffic control group 4906 may include IoT devices along streets in a city. These IoT devices may include stoplights, traffic flow monitors, cameras, weather sensors, and the like. The traffic control group 4906, or other subgroups, may be in communication with the cloud 4900 through wired or wireless links 4908, such as LPWA links, optical links, and the like. Further, a wired or wireless sub-network 4912 may allow the IoT devices to communicate with each other, such as through a local area network, a wireless local area network, and the like. The IoT devices may use another device, such as a gateway 4910 or 4928 to communicate with remote locations such as the cloud 4900; the IoT devices may also use one or more servers 4930 to facilitate communication with the cloud 4900 or with the gateway 4910. For example, the one or more servers 4930 may operate as an intermediate network node to support a local edge cloud or fog implementation among a local area network. Further, the gateway 4928 that is depicted may operate in a cloud-to-gateway-to-many edge devices configuration, such as with the various IoT devices 4914, 4920, 4924 being constrained or dynamic to an assignment and use of resources in the cloud 4900.

Other example groups of IoT devices may include remote weather stations 4914, local information terminals 4916, alarm systems 4918, automated teller machines 4920, alarm panels 4922, or moving vehicles, such as emergency vehicles 4924 or other vehicles 4926, among many others. Each of these IoT devices may be in communication with other IoT devices, with servers 4904, with another IoT fog device or system (not shown, but depicted in FIG. 48), or a combination therein. The groups of IoT devices may be deployed in various residential, commercial, and industrial settings (including in both private or public environments).

As can be seen from FIG. 49, a large number of IoT devices may be communicating through the cloud 4900. This may allow different IoT devices to request or provide information to other devices autonomously. For example, a group of IoT devices (e.g., the traffic control group 4906) may request a current weather forecast from a group of remote weather stations 4914, which may provide the forecast without human intervention. Further, an emergency vehicle 4924 may be alerted by an automated teller machine 4920 that a burglary is in progress. As the emergency vehicle 4924 proceeds towards the automated teller machine 4920, it may access the traffic control group 4906 to request clearance to the location, for example, by lights turning red to block cross traffic at an intersection in sufficient time for the emergency vehicle 4924 to have unimpeded access to the intersection.

Clusters of IoT devices, such as the remote weather stations 4914 or the traffic control group 4906, may be equipped to communicate with other IoT devices as well as with the cloud 4900. This may allow the IoT devices to form an ad-hoc network between the devices, allowing them to function as a single device, which may be termed a fog device or system (e.g., as described above with reference to FIG. 48).

Figure 50:
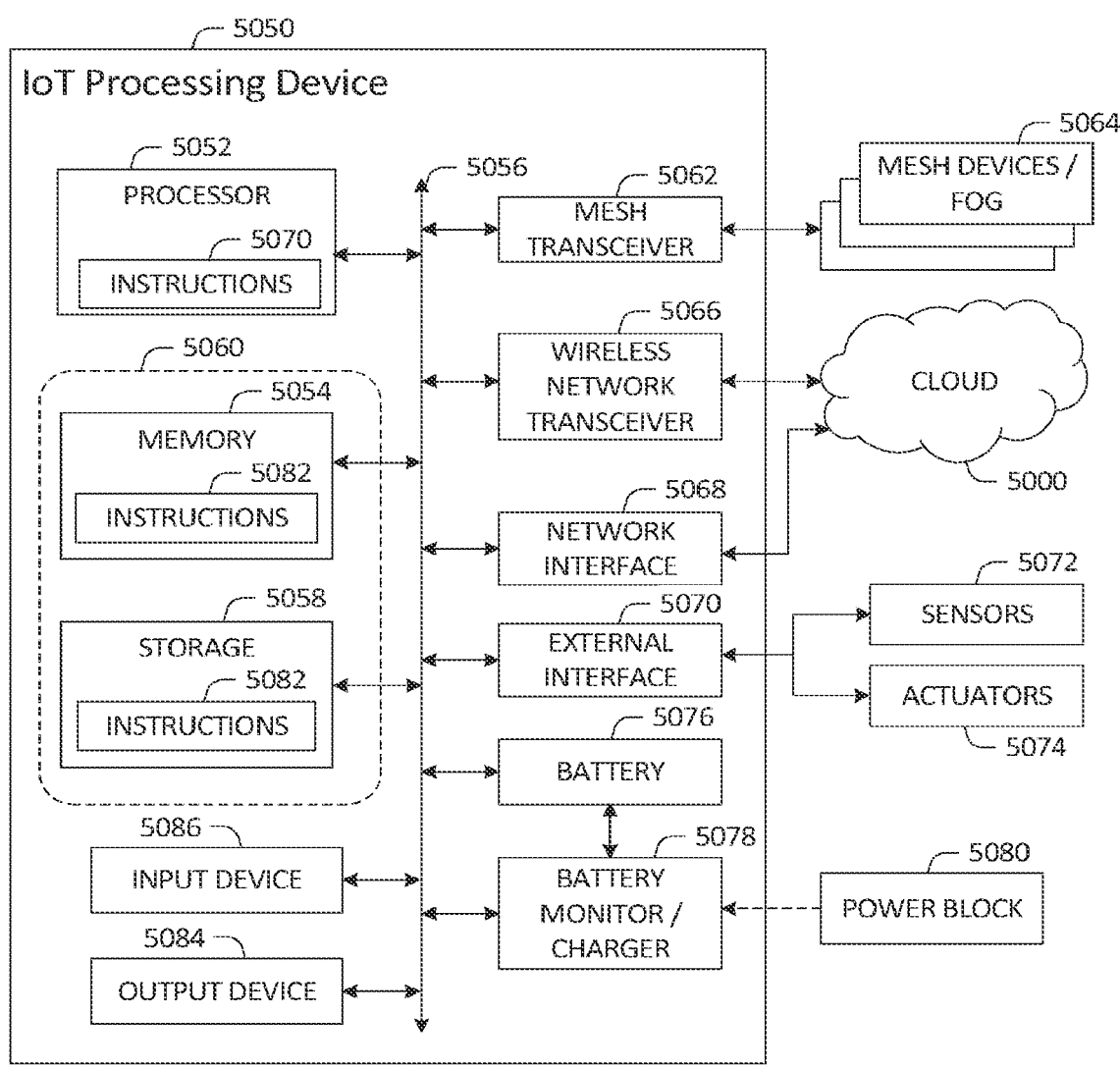
FIG. 50 is a simplified block diagram of an example processing device in accordance with at least some embodiments.

FIG. 50 is a block diagram of an example of components that may be present in an IoT device 5050 for implementing the techniques described herein. The IoT device 5050 may include any combinations of the components shown in the example or referenced in the disclosure above. The components may be implemented as ICs, portions thereof, discrete electronic devices, or other modules, logic, hardware, software, firmware, or a combination thereof adapted in the IoT device 5050, or as components otherwise incorporated within a chassis of a larger system. Additionally, the block diagram of FIG. 50 is intended to depict a high-level view of components of the IoT device 5050. However, some of the components shown may be omitted, additional components may be present, and different arrangement of the components shown may occur in other implementations.

The IoT device 5050 may include a processor 5052, which may be a microprocessor, a multi-core processor, a multithreaded processor, an ultra-low voltage processor, an embedded processor, or other known processing element. The processor 5052 may be a part of a system on a chip (SoC) in which the processor 5052 and other components are formed into a single integrated circuit, or a single package, such as the Edison™ or Galileo™ SoC boards from Intel. As an example, the processor 5052 may include an Intel® Architecture Core™ based processor, such as a Quark™, an Atom™, an i3, an i5, an i7, or an MCU-class processor, or another such processor available from Intel® Corporation, Santa Clara, California. However, any number other processors may be used, such as available from Advanced Micro Devices, Inc. (AMD) of Sunnyvale, California, a MIPS-based design from MIPS Technologies, Inc. of Sunnyvale, California, an ARM-based design licensed from ARM Holdings, Ltd. or customer thereof, or their licensees or adopters. The processors may include units such as an A5-A10 processor from Apple® Inc., a Snapdragon™ processor from Qualcomm® Technologies, Inc., or an OMAP™ processor from Texas Instruments, Inc.

The processor 5052 may communicate with a system memory 5054 over an interconnect 5056 (e.g., a bus). Any number of memory devices may be used to provide for a given amount of system memory. As examples, the memory may be random access memory (RAM) in accordance with a Joint Electron Devices Engineering Council (JEDEC) design such as the DDR or mobile DDR standards (e.g., LPDDR, LPDDR2, LPDDR3, or LPDDR4). In various implementations the individual memory devices may be of any number of different package types such as single die package (SDP), dual die package (DDP) or quad die package (Q17P). These devices, in some examples, may be directly soldered onto a motherboard to provide a lower profile solution, while in other examples the devices are configured as one or more memory modules that in turn couple to the motherboard by a given connector. Any number of other memory implementations may be used, such as other types of memory modules, e.g., dual inline memory modules (DIMMs) of different varieties including but not limited to microDIMMs or MiniDIMMs.

To provide for persistent storage of information such as data, applications, operating systems and so forth, a storage 5058 may also couple to the processor 5052 via the interconnect 5056. In an example the storage 5058 may be implemented via a solid state disk drive (SSDD). Other devices that may be used for the storage 5058 include flash memory cards, such as SD cards, microSD cards, xD picture cards, and the like, and USB flash drives. In low power implementations, the storage 5058 may be on-die memory or registers associated with the processor 5052. However, in some examples, the storage 5058 may be implemented using a micro hard disk drive (HDD). Further, any number of new technologies may be used for the storage 5058 in addition to, or instead of, the technologies described, such resistance change memories, phase change memories, holographic memories, or chemical memories, among others.

The components may communicate over the interconnect 5056. The interconnect 5056 may include any number of technologies, including industry standard architecture (ISA), extended ISA (EISA), peripheral component interconnect (PCI), peripheral component interconnect extended (PCIx), PCI express (PCIe), or any number of other technologies. The interconnect 5056 may be a proprietary bus, for example, used in a SoC based system. Other bus systems may be included, such as an 12C interface, an SPI interface, point to point interfaces, and a power bus, among others.

The interconnect 5056 may couple the processor 5052 to a mesh transceiver 5062, for communications with other mesh devices 5064. The mesh transceiver 5062 may use any number of frequencies and protocols, such as 2.4 Gigahertz (GHz) transmissions under the IEEE 802.15.4 standard, using the Bluetooth® low energy (BLE) standard, as defined by the Bluetooth® Special Interest Group, or the ZigBee® standard, among others. Any number of radios, configured for a particular wireless communication protocol, may be used for the connections to the mesh devices 5064. For example, a WLAN unit may be used to implement Wi-Fi™ communications in accordance with the Institute of Electrical and Electronics Engineers (IEEE) 802.11 standard. In addition, wireless wide area communications, e.g., according to a cellular or other wireless wide area protocol, may occur via a WWAN unit.

The mesh transceiver 5062 may communicate using multiple standards or radios for communications at different range. For example, the IoT device 5050 may communicate with close devices, e.g., within about 10 meters, using a local transceiver based on BLE, or another low power radio, to save power. More distant mesh devices 5064, e.g., within about 50 meters, may be reached over ZigBee or other intermediate power radios. Both communications techniques may take place over a single radio at different power levels, or may take place over separate transceivers, for example, a local transceiver using BLE and a separate mesh transceiver using ZigBee.

A wireless network transceiver 5066 may be included to communicate with devices or services in the cloud 5000 via local or wide area network protocols. The wireless network transceiver 5066 may be a LPWA transceiver that follows the IEEE 802.15.4, or IEEE 802.15.4g standards, among others. The IoT device 5050 may communicate over a wide area using LoRaWAN™ (Long Range Wide Area Network) developed by Semtech and the LoRa Alliance. The techniques described herein are not limited to these technologies, but may be used with any number of other cloud transceivers that implement long range, low bandwidth communications, such as Sigfox, and other technologies. Further, other communications techniques, such as time-slotted channel hopping, described in the IEEE 802.15.4e specification may be used.

Any number of other radio communications and protocols may be used in addition to the systems mentioned for the mesh transceiver 5062 and wireless network transceiver 5066, as described herein. For example, the radio transceivers 5062 and 5066 may include an LTE or other cellular transceiver that uses spread spectrum (SPA/SAS) communications for implementing high speed communications. Further, any number of other protocols may be used, such as Wi-Fi® networks for medium speed communications and provision of network communications.

The radio transceivers 5062 and 5066 may include radios that are compatible with any number of 3GPP (Third Generation Partnership Project) specifications, notably Long Term Evolution (LTE), Long Term Evolution-Advanced (LTE-A), and Long Term Evolution-Advanced Pro (LTE-A Pro). It can be noted that radios compatible with any number of other fixed, mobile, or satellite communication technologies and standards may be selected. These may include, for example, any Cellular Wide Area radio communication technology, which may include e.g. a 5th Generation (5G) communication systems, a Global System for Mobile Communications (GSM) radio communication technology, a General Packet Radio Service (GPRS) radio communication technology, or an Enhanced Data Rates for GSM Evolution (EDGE) radio communication technology, a UMTS (Universal Mobile Telecommunications System) communication technology, In addition to the standards listed above, any number of satellite uplink technologies may be used for the wireless network transceiver 5066, including, for example, radios compliant with standards issued by the ITU (International Telecommunication Union), or the ETSI (European Telecommunications Standards Institute), among others. The examples provided herein are thus understood as being applicable to various other communication technologies, both existing and not yet formulated.

A network interface controller (NIC) 5068 may be included to provide a wired communication to the cloud 5000 or to other devices, such as the mesh devices 5064. The wired communication may provide an Ethernet connection, or may be based on other types of networks, such as Controller Area Network (CAN), Local Interconnect Network (LIN), DeviceNet, ControlNet, Data Highway+, PROFIBUS, or PROFINET, among many others. An additional NIC 5068 may be included to allow connect to a second network, for example, a NIC 5068 providing communications to the cloud over Ethernet, and a second NIC 5068 providing communications to other devices over another type of network.

The interconnect 5056 may couple the processor 5052 to an external interface 5070 that is used to connect external devices or subsystems. The external devices may include sensors 5072, such as accelerometers, level sensors, flow sensors, optical light sensors, camera sensors, temperature sensors, a global positioning system (GPS) sensors, pressure sensors, barometric pressure sensors, and the like. The external interface 5070 further may be used to connect the IoT device 5050 to actuators 5074, such as power switches, valve actuators, an audible sound generator, a visual warning device, and the like.

In some optional examples, various input/output (I/O) devices may be present within, or connected to, the IoT device 5050. For example, a display or other output device 5084 may be included to show information, such as sensor readings or actuator position. An input device 5086, such as a touch screen or keypad may be included to accept input. An output device 5084 may include any number of forms of audio or visual display, including simple visual outputs such as binary status indicators (e.g., LEDs) and multi-character visual outputs, or more complex outputs such as display screens (e.g., LCD screens), with the output of characters, graphics, multimedia objects, and the like being generated or produced from the operation of the IoT device 5050.

A battery 5076 may power the IoT device 5050, although in examples in which the IoT device 5050 is mounted in a fixed location, it may have a power supply coupled to an electrical grid. The battery 5076 may be a lithium ion battery, or a metal-air battery, such as a zinc-air battery, an aluminum-air battery, a lithium-air battery, and the like.

A battery monitor/charger 5078 may be included in the IoT device 5050 to track the state of charge (SoCh) of the battery 5076. The battery monitor/charger 5078 may be used to monitor other parameters of the battery 5076 to provide failure predictions, such as the state of health (SoH) and the state of function (SoF) of the battery 5076. The battery monitor/charger 5078 may include a battery monitoring integrated circuit, such as an LTC4020 or an LTC2990 from Linear Technologies, an ADT7488A from ON Semiconductor of Phoenix Arizona, or an IC from the UCD90xxx family from Texas Instruments of Dallas, TX. The battery monitor/charger 5078 may communicate the information on the battery 5076 to the processor 5052 over the interconnect 5056. The battery monitor/charger 5078 may also include an analog-to-digital (ADC) convertor that allows the processor 5052 to directly monitor the voltage of the battery 5076 or the current flow from the battery 5076. The battery parameters may be used to determine actions that the IoT device 5050 may perform, such as transmission frequency, mesh network operation, sensing frequency, and the like.

A power block 5080, or other power supply coupled to a grid, may be coupled with the battery monitor/charger 5078 to charge the battery 5076. In some examples, the power block 5080 may be replaced with a wireless power receiver to obtain the power wirelessly, for example, through a loop antenna in the IoT device 5050. A wireless battery charging circuit, such as an LTC4020 chip from Linear Technologies of Milpitas, California, among others, may be included in the battery monitor/charger 5078. The specific charging circuits chosen depend on the size of the battery 5076, and thus, the current required. The charging may be performed using the Airfuel standard promulgated by the Airfuel Alliance, the Qi wireless charging standard promulgated by the Wireless Power Consortium, or the Rezence charging standard, promulgated by the Alliance for Wireless Power, among others.

The storage 5058 may include instructions 5082 in the form of software, firmware, or hardware commands to implement the techniques described herein. Although such instructions 5082 are shown as code blocks included in the memory 5054 and the storage 5058, it may be understood that any of the code blocks may be replaced with hardwired circuits, for example, built into an application specific integrated circuit (ASIC).

In an example, the instructions 5082 provided via the memory 5054, the storage 5058, or the processor 5052 may be embodied as a non-transitory, machine readable medium 5060 including code to direct the processor 5052 to perform electronic operations in the IoT device 5050. The processor 5052 may access the non-transitory, machine readable medium 5060 over the interconnect 5056. For instance, the non-transitory, machine readable medium 5060 may be embodied by devices described for the storage 5058 of FIG. 50 or may include specific storage units such as optical disks, flash drives, or any number of other hardware devices. The non-transitory, machine readable medium 5060 may include instructions to direct the processor 5052 to perform a specific sequence or flow of actions, for example, as described with respect to the flowchart(s) and block diagram(s) of operations and functionality depicted above.

Figure 51:
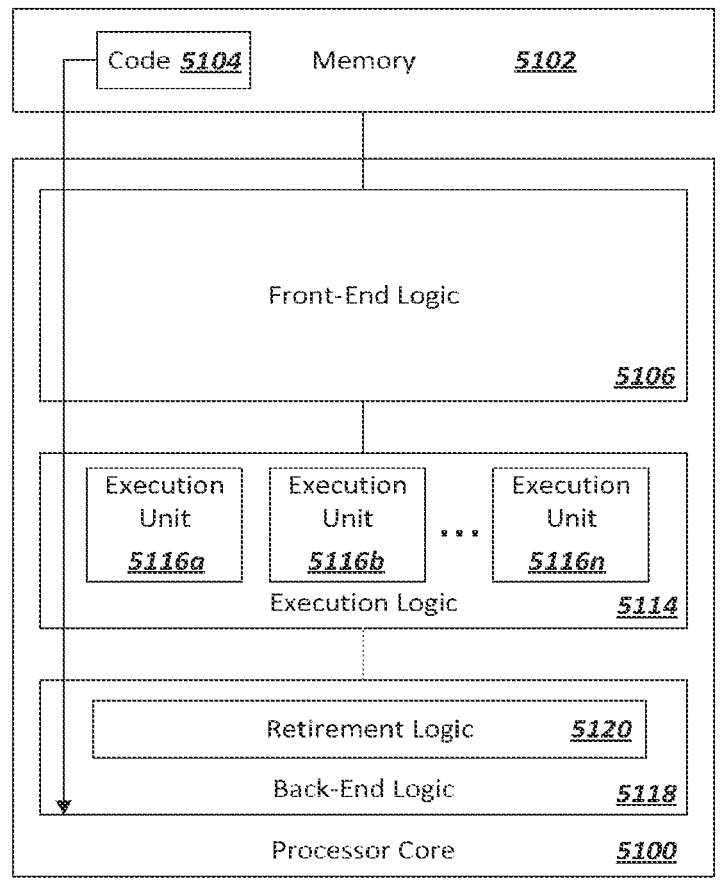
FIG. 51 is a block diagram of an exemplary processor in accordance with at least some embodiments.

FIG. 51 is an example illustration of a processor according to an embodiment. Processor 5100 is an example of a type of hardware device that can be used in connection with the implementations above. Processor 5100 may be any type of processor, such as a microprocessor, an embedded processor, a digital signal processor (DSP), a network processor, a multi-core processor, a single core processor, or other device to execute code. Although only one processor 5100 is illustrated in FIG. 51, a processing element may alternatively include more than one of processor 5100 illustrated in FIG. 51. Processor 5100 may be a single-threaded core or, for at least one embodiment, the processor 5100 may be multi-threaded in that it may include more than one hardware thread context (or "logical processor") per core.

FIG. 51 also illustrates a memory 5102 coupled to processor 5100 in accordance with an embodiment. Memory 5102 may be any of a wide variety of memories (including various layers of memory hierarchy) as are known or otherwise available to those of skill in the art. Such memory elements can include, but are not limited to, random access memory (RAM), read only memory (ROM), logic blocks of a field programmable gate array (FPGA), erasable programmable read only memory (EPROM), and electrically erasable programmable ROM (EEPROM).

Processor 5100 can execute any type of instructions associated with algorithms, processes, or operations detailed herein. Generally, processor 5100 can transform an element or an article (e.g., data) from one state or thing to another state or thing.

Code 5104, which may be one or more instructions to be executed by processor 5100, may be stored in memory 5102, or may be stored in software, hardware, firmware, or any suitable combination thereof, or in any other internal or external component, device, element, or object where appropriate and based on particular needs. In one example, processor 5100 can follow a program sequence of instructions indicated by code 5104. Each instruction enters a front-end logic 5106 and is processed by one or more decoders 5108. The decoder may generate, as its output, a micro operation such as a fixed width micro operation in a predefined format, or may generate other instructions, microinstructions, or control signals that reflect the original code instruction. Front-end logic 5106 also includes register renaming logic 5110 and scheduling logic 5112, which generally allocate resources and queue the operation corresponding to the instruction for execution.

Processor 5100 can also include execution logic 5114 having a set of execution units 5116a, 5116b, 5116n, etc. Some embodiments may include a number of execution units dedicated to specific functions or sets of functions. Other embodiments may include only one execution unit or one execution unit that can perform a particular function. Execution logic 5114 performs the operations specified by code instructions.

After completion of execution of the operations specified by the code instructions, back-end logic 5118 can retire the instructions of code 5104. In one embodiment, processor 5100 allows out of order execution but requires in order retirement of instructions. Retirement logic 5120 may take a variety of known forms (e.g., re-order buffers or the like). In this manner, processor 5100 is transformed during execution of code 5104, at least in terms of the output generated by the decoder, hardware registers and tables utilized by register renaming logic 5110, and any registers (not shown) modified by execution logic 5114.

Although not shown in FIG. 51, a processing element may include other elements on a chip with processor 5100. For example, a processing element may include memory control logic along with processor 5100. The processing element may include I/O control logic and/or may include I/O control logic integrated with memory control logic. The processing element may also include one or more caches. In some embodiments, non-volatile memory (such as flash memory or fuses) may also be included on the chip with processor 5100.

Figure 52:
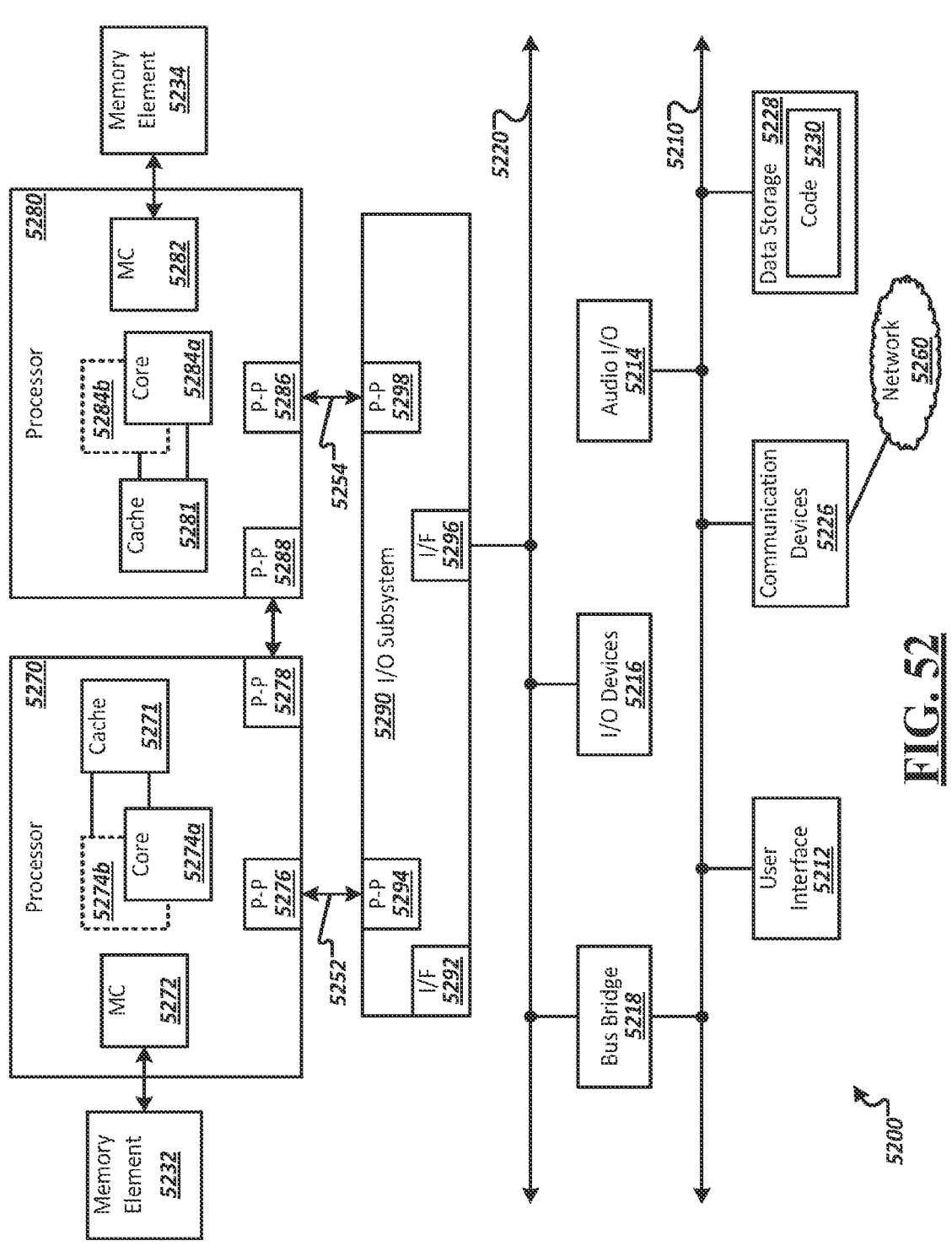
FIG. 52 is a block diagram of an exemplary computing system in accordance with at least some embodiments.

FIG. 52 illustrates a computing system 5200 that is arranged in a point-to-point (PtP) configuration according to an embodiment. In particular, FIG. 52 shows a system where processors, memory, and input/output devices are interconnected by a number of point-to-point interfaces. Generally, one or more of the computing systems described herein may be configured in the same or similar manner as computing system 5200.

Processors 5270 and 5280 may also each include integrated memory controller logic (MC) 5272 and 5282 to communicate with memory elements 5232 and 5234. In alternative embodiments, memory controller logic 5272 and 5282 may be discrete logic separate from processors 5270 and 5280. Memory elements 5232 and/or 5234 may store various data to be used by processors 5270 and 5280 in achieving operations and functionality outlined herein.

Processors 5270 and 5280 may be any type of processor, such as those discussed in connection with other figures. Processors 5270 and 5280 may exchange data via a point-to-point (PtP) interface 5250 using point-to-point interface circuits 5278 and 5288, respectively. Processors 5270 and 5280 may each exchange data with a chipset 5290 via individual point-to-point interfaces 5252 and 5254 using point-to-point interface circuits 5276, 5286, 5294, and 5298. Chipset 5290 may also exchange data with a high-performance graphics circuit 5238 via a high-performance graphics interface 5239, using an interface circuit 5292, which could be a PtP interface circuit. In alternative embodiments, any or all of the PtP links illustrated in FIG. 52 could be implemented as a multi-drop bus rather than a PtP link.

Chipset 5290 may be in communication with a bus 5220 via an interface circuit 5296. Bus 5220 may have one or more devices that communicate over it, such as a bus bridge 5218 and I/O devices 5216. Via a bus 5210, bus bridge 5218 may be in communication with other devices such as a user interface 5212 (such as a keyboard, mouse, touchscreen, or other input devices), communication devices 5226 (such as modems, network interface devices, or other types of communication devices that may communicate through a computer network 5260), audio I/O devices 5214, and/or a data storage device 5228. Data storage device 5228 may store code 5230, which may be executed by processors 5270 and/or 5280. In alternative embodiments, any portions of the bus architectures could be implemented with one or more PtP links.

The computer system depicted in FIG. 52 is a schematic illustration of an embodiment of a computing system that may be utilized to implement various embodiments discussed herein. It will be appreciated that various components of the system depicted in FIG. 52 may be combined in a system-on-a-chip (SoC) architecture or in any other suitable configuration capable of achieving the functionality and features of examples and implementations provided herein.

In further examples, a machine-readable medium also includes any tangible medium that is capable of storing, encoding or carrying instructions for execution by a machine and that cause the machine to perform any one or more of the methodologies of the present disclosure or that is capable of storing, encoding or carrying data structures utilized by or associated with such instructions. A "machine-readable medium" thus may include, but is not limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks. The instructions embodied by a machine-readable medium may further be transmitted or received over a communications network using a transmission medium via a network interface device utilizing any one of a number of transfer protocols (e.g., HTTP).

It should be understood that the functional units or capabilities described in this specification may have been referred to or labeled as components or modules, in order to more particularly emphasize their implementation independence. Such components may be embodied by any number of software or hardware forms. For example, a component or module may be implemented as a hardware circuit comprising custom very-large-scale integration (VLSI) circuits or gate arrays, off-the-shelf semiconductors such as logic chips, transistors, or other discrete components. A component or module may also be implemented in programmable hardware devices such as field programmable gate arrays, programmable array logic, programmable logic devices, or the like. Components or modules may also be implemented in software for execution by various types of processors. An identified component or module of executable code may, for instance, comprise one or more physical or logical blocks of computer instructions, which may, for instance, be organized as an object, procedure, or function. Nevertheless, the executables of an identified component or module need not be physically located together, but may comprise disparate instructions stored in different locations which, when joined logically together, comprise the component or module and achieve the stated purpose for the component or module.

Indeed, a component or module of executable code may be a single instruction, or many instructions, and may even be distributed over several different code segments, among different programs, and across several memory devices or processing systems. In particular, some aspects of the described process (such as code rewriting and code analysis) may take place on a different processing system (e.g., in a computer in a data center), than that in which the code is deployed (e.g., in a computer embedded in a sensor or robot). Similarly, operational data may be identified and illustrated herein within components or modules, and may be embodied in any suitable form and organized within any suitable type of data structure. The operational data may be collected as a single data set, or may be distributed over different locations including over different storage devices, and may exist, at least partially, merely as electronic signals on a system or network. The components or modules may be passive or active, including agents operable to perform desired functions.

Additional examples of the presently described method, system, and device embodiments include the following, non-limiting configurations. Each of the following non-limiting examples may stand on its own, or may be combined in any permutation or combination with any one or more of the other examples provided below or throughout the present disclosure.

Although this disclosure has been described in terms of certain implementations and generally associated methods, alterations and permutations of these implementations and methods will be apparent to those skilled in the art. For example, the actions described herein can be performed in a different order than as described and still achieve the desirable results. As one example, the processes depicted in the accompanying figures do not necessarily require the particular order shown, or sequential order, to achieve the desired results. In certain implementations, multitasking and parallel processing may be advantageous. Additionally, other user interface layouts and functionality can be supported. Other variations are within the scope of the following claims.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

The following examples pertain to embodiments in accordance with this Specification. Example 1 is a method including: accessing, from memory, a synthetic, three-dimensional (3D) graphical model of an object, where the 3D graphical model has photo-realistic resolution; generating a plurality of different training samples from views of the 3D graphical model, where the plurality of training samples are generated to add imperfections to the plurality of training samples to simulate characteristics of real world samples generated by a real world sensor device; and generating a training set including the plurality of training samples, where the training data is to train an artificial neural network.

Example 2 includes the subject matter of example 1, where the plurality of training samples includes digital images and the sensor device includes a camera sensor.

Example 3 includes the subject matter of any one of examples 1-2, where the plurality of training samples includes point cloud representations of the object.

Example 4 includes the subject matter of example 3, where the sensor device includes a LIDAR sensor.

Example 5 includes the subject matter of any one of examples 1-4, further including: accessing data to indicate parameters of the sensor device; and determining the imperfections to add to the plurality of training samples based on the parameters.

Example 6 includes the subject matter of example 5, where the data includes a model of the sensor device.

Example 7 includes the subject matter of any one of examples 1-6, further including: accessing data to indicate characteristics of one or more surfaces of the object modeled by the 3D graphical model; and determining the imperfections to add to the plurality of training samples based on the characteristics.

Example 8 includes the subject matter of example 7, where the 3D graphical model includes the data.

Example 9 includes the subject matter of any one of examples 1-8, where the imperfections include one or more of noise or glare.

Example 10 includes the subject matter of any one of examples 1-9, where generating a plurality of different training samples includes: applying different lighting settings to the 3D graphical model to simulate lighting within an environment; determining the imperfections for a subset of the plurality of training samples generated during application of a particular one of the different lighting settings, where the imperfections for the subset of the plurality of training samples are based on the particular lighting setting.

Example 11 includes the subject matter of any one of example 1-10, where generating a plurality of different training samples includes: placing the 3D graphical model in different graphical environments, where the graphical environments model respective real-world environments; generating a subset of the plurality of training samples while the 3D graphical model is placed within different graphical environments.

Example 12 is a system including means to perform the method of any one of examples 1-11.

Example 13 includes the subject matter of example 12, where the system includes an apparatus, and the apparatus includes hardware circuitry to perform at least a portion of the method of any one of examples 1-11.

Example 14 is a computer-readable storage medium storing instructions executable by a processor to perform the method of any one of examples 1-11.

Example 15 is a method including: receiving a subject input and a reference input at a Siamese neural network, where the Siamese neural network includes a first network portion including a first plurality of layers and a second network portion including a second plurality of layers, weights of the first network portion are identical to weights of the second network portion, and the subject input is provided as an input to the first network portion and the reference input is provided as an input to the second network portion; and generating an output of the Siamese neural network based on the subject input and reference input, where the output of the Siamese neural network is to indicate similarity between the reference input and the subject input.

Example 16 includes the subject matter of example 15, where generating the output includes: determining an amount of difference between the reference input and the subject input; and determining whether the amount of difference satisfies a threshold value, where the output identifies whether the amount of difference satisfies the threshold value.

Example 17 includes the subject matter of example 16, where determining the amount of difference between the reference input and the subject input includes: receiving a first feature vector output by the first network portion and a second feature vector output by the second network portion; and determining a difference vector based on the first feature vector and the second feature vector.

Example 18 includes the subject matter of any one of examples 15-17, where generating the output includes a one-shot classification.

Example 19 includes the subject matter of any one of examples 15-18, further including training the Siamese neural network using one or more synthetic training samples.

Example 20 includes the subject matter of example 19, where the one or more synthetic training samples are generated according to the method of any one of examples 1-11.

Example 21 includes the subject matter of any one of examples 15-20, where the reference input includes a synthetically generated sample.

Example 22 includes the subject matter of example 21, where the synthetically generated sample is generated according to the method of any one of examples 1-11.

Example 23 includes the subject matter of any one of examples 15-22, where the subject input includes a first digital image and the reference input includes a second digital image.

Example 24 includes the subject matter of any one of examples 15-22, where the subject input includes a first point cloud representation and the reference input includes a second point cloud representation.

Example 25 is a system including means to perform the method of any one of examples 15-24.

Example 26 includes the subject matter of example 25, where the system includes an apparatus, and the apparatus includes hardware circuitry to perform at least a portion of the method of any one of examples 15-24.

Example 27 includes the subject matter of example 25, where the system includes one of a robot, drone, or autonomous vehicle.

Example 28 is a computer-readable storage medium storing instructions executable by a processor to perform the method of any one of examples 15-24.

Example 29 is a method including: providing first input data to a Siamese neural network, where the first input data includes a first representation of 3D space from a first pose; providing second input data to the Siamese neural network, where the second input data includes a second representation of 3D space from a second pose, the Siamese neural network includes a first network portion including a first plurality of layers and a second network portion including a second plurality of layers, weights of the first network portion are identical to weights of the second network portion, and the first input data is provided as an input to the first network portion and the second input data is provided as an input to the second network portion; and generating an output of the Siamese neural network, where the output includes a relative pose between the first and second poses.

Example 30 includes the subject matter of example 29, where the first representation of 3D space includes a first 3D point cloud and the second representation of 3D space includes a second 3D point cloud.

Example 31 includes the subject matter of any one of examples 29-30, where the first representation of the 3D space includes a first point cloud and the second representation of the 3D space includes a second point cloud.

Example 32 includes the subject matter of example 31, where the first point cloud and the second point cloud each include respective voxelized point cloud representations.

Example 33 includes the subject matter of any one of examples 29-32, further including generating a 3D mapping of the 3D space from at least the first and second input data based on the relative pose.

Example 34 includes the subject matter of any one of examples 29-32, further including determining a location of an observer of the first pose within the 3D space based on the relative pose.

Example 35 includes the subject matter of example 34, where the observer includes an autonomous machine.

Example 36 includes the subject matter of example 35, where the autonomous machine includes one of a robot, a drone, or an autonomous vehicle.

Example 37 is a system including means to perform the method of any one of examples 29-36.

Example 38 includes the subject matter of example 37, where the system includes an apparatus, and the apparatus includes hardware circuitry to perform at least a portion of the method of any one of examples 29-36.

Example 39 is a computer-readable storage medium storing instructions executable by a processor to perform the method of any one of examples 29-36.

Example 40 is a method including: providing the first sensor data as an input to a first portion of a machine learning model; providing the second sensor data as an input to a second portion of the machine learning model, where the machine learning model includes a concatenator and a set of fully-connected layers, the first sensor data is of a first type generated by a device, and the second sensor data is of a different, second type generated by the device, where the concatenator takes an output of the first portion of the machine learning model as a first input and takes an output of the second portion of the machine learning model as a second input, and an output of the concatenator is provided to the set of fully-connected layers; and generating, from first data and second data, an output of the machine learning model including a pose of the device within an environment.

Example 41 includes the subject matter of example 40, where the first sensor data includes image data and the second sensor data identifies movement of the device.

Example 42 includes the subject matter of example 41, where the image data includes red-green-blue (RGB) data.

Example 43 includes the subject matter of example 41, where the image data includes 3D point cloud data.

Example 44 includes the subject matter of example 41, where the second sensor data includes inertial measurement unit (IMU) data.

Example 45 includes the subject matter of example 41, where the second sensor data includes global positioning data.

Example 46 includes the subject matter of any one of examples 40-45, where the first portion of the machine learning model is tuned for sensor data of the first type and the second portion of the machine learning model is tuned for sensor data of the second type.

Example 47 includes the subject matter of any one of examples 40-46, further including providing third sensor data of a third type as an input to a third portion of the machine learning model, and the output is further generated based on the third data.

Example 48 includes the subject matter of any one of examples 40-47, where output of the pose includes a rotational component and a translational component.

Example 49 includes the subject matter of example 48, where one of the set of fully connected layers includes a fully connected layer to determine the rotational component and another one of the set of fully connected layers includes a fully connected layer to determine the translational component.

Example 50 includes the subject matter of any one of examples 40-49, where one or both of the first and second portions of the machine learning model include respective convolutional layers.

Example 51 includes the subject matter of any one of examples 40-50, where one or both of the first and second portions of the machine learning model include one or more respective long short-term memory (LSTM) blocks.

Example 52 includes the subject matter of any one of examples 40-51, where the device includes an autonomous machine, and the autonomous machine is to navigate within the environment based on the pose.

Example 53 includes the subject matter of example 52, where the autonomous machine includes one of a robot, a drone, or an autonomous vehicle.

Example 54 is a system including means to perform the method of any one of examples 40-52.

Example 55 includes the subject matter of example 54, where the system includes an apparatus, and the apparatus includes hardware circuitry to perform at least a portion of the method of any one of examples 40-52.

Example 56 is a computer-readable storage medium storing instructions executable by a processor to perform the method of any one of examples 40-52.

Example 57 is a method including: requesting random generation of a set of neural networks; performing a machine learning task using each one of the set of neural networks, where the machine learning task is performed using particular processing hardware; monitoring attributes of the performing of the machine learning task for each of the set of neural networks, where the attributes include accuracy of results of the machine learning task; and identifying a top performing one of the set of neural networks based on the attributes of the top performing neural network when used to perform the machine learning task using the particular processing hardware.

Example 58 includes the subject matter of example 57, further including providing the top performing neural network for use by a machine in performing a machine learning application.

Example 59 includes the subject matter of any one of examples 57-58, further including: determining characteristics of the top performing neural network; and requesting generation of a second set of neural networks according to the characteristics, where the second set of neural networks includes a plurality of different neural networks each including one or more of the characteristics; performing the machine learning task using each one of the second set of neural networks, where the machine learning task is performed using the particular processing hardware; monitoring attributes of the performing of the machine learning task for each of the second set of neural networks; and identifying a top performing one of the second set of neural networks based on the attributes.

Example 60 includes the subject matter of any one of examples 57-59, further including receiving criteria based on the parameters, where the top performing neural network is based on the criteria.

Example 61 includes the subject matter of any one of examples 57-60, where the attributes include attributes of the particular processing hardware.

Example 62 includes the subject matter of example 61, where the attributes of the particular processing hardware includes one or more of power consumed by the particular processing hardware during performance of the machine learning task, temperature of the particular processing hardware during performance of the machine learning task, and memory used to store the neural network on the particular processing hardware.

Example 63 includes the subject matter of any one of examples 57-62, where the attributes include time to complete the machine learning task using the corresponding one of the set of neural networks.

Example 64 is a system including means to perform the method of any one of examples 57-63.

Example 65 includes the subject matter of example 64, where the system includes an apparatus, and the apparatus includes hardware circuitry to perform at least a portion of the method of any one of examples 57-63.

Example 66 is a computer-readable storage medium storing instructions executable by a processor to perform the method of any one of examples 57-63.

Example 67 is a method including: identifying a neural network including a plurality of kernels, where each one of the kernels includes a respective set of weights; pruning a subset of the plurality of kernels according to one or more parameters to reduce the plurality of kernels to a particular set of kernels; pruning a subset of weights in the particular set of kernels to form a pruned version of the neural network, where the pruning the subset of weights assigns one or more non-zero weights in the subset of weights to zero, where the subset of weights are selected based on original values of the weights.

Example 68 includes the subject matter of example 67, where the subset of weights are to be pruned based on values of the subset of weights falling below a threshold value.

Example 69 includes the subject matter of any one of examples 67-68, further including performing one or more iterations of a machine learning task using the pruned version of the neural network to restore at least a portion of accuracy lost through the pruning of the kernels and weights.

Example 70 includes the subject matter of any one of examples 67-69, further including quantizing values of weights not pruned in the pruned version of the neural network to generate a compact version of the neural network.

Example 71 includes the subject matter of example 70, where the quantization including log base quantization.

Example 72 includes the subject matter of example 71, where the weights are quantized from floating point values to base 2 values.

Example 73 includes the subject matter of any one of examples 67-72, further including providing the pruned version of the neural network for execution of machine learning tasks using hardware adapted for sparse matrix arithmetic.

Example 74 is a system including means to perform the method of any one of examples 67-73.

Example 75 includes the subject matter of example 64, where the system includes an apparatus, and the apparatus includes hardware circuitry to perform at least a portion of the method of any one of examples 67-73.

Example 76 is a computer-readable storage medium storing instructions executable by a processor to perform the method of any one of examples 67-73.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results.

What is claimed is:

1. A method, comprising:
generating one or more synthetic training samples, a synthetic training sample comprising a synthetic image;
generating one or more photorealistic training samples by degrading a quality of the one or more synthetic training samples;
forming a training set with the one or more photorealistic training samples; and
training a neural network using the training set, wherein the neural network comprises a first network and a second network, and after the training, the first network and the second network are to process two different input images for estimating a degree of similarity between the two different input images.

2. The method of claim 1, wherein degrading the quality of the one or more synthetic training samples comprises:
applying a filter on the one or more one or more synthetic training samples.

3. The method of claim 1, wherein a photorealistic training sample has a photorealistic resolution that is lower than a resolution of a synthetic training sample from which the photorealistic training sample is generated.

4. The method of claim 1, wherein the quality of the one or more synthetic training samples comprises a brightness, level of noise, or contrast.

5. The method of claim 1, wherein the first network and the second network have same weights.

6. The method of claim 1, wherein the synthetic image comprises a three-dimensional model of an object, and degrading the quality of the one or more synthetic training samples comprises:
degrading a quality of the synthetic image based on one or more materials of the object.

7. The method of claim 1, wherein the first network is to generate a first output from one of the two different images, the second network is to generate a second output from another one of the two different images, and the neural network is to determine the degree of similarity based on the first output and the second output.

8. One or more non-transitory computer-readable media storing instructions executable to perform operations, the operations comprising:
generating one or more synthetic training samples, a synthetic training sample comprising a synthetic image;
generating one or more photorealistic training samples by degrading a quality of the one or more synthetic training samples;
forming a training set with the one or more photorealistic training samples; and
training a neural network using the training set, wherein the neural network comprises a first network and a second network, and after the training, the first network and the second network are to process two different input images for estimating a degree of similarity between the two different input images.

9. The one or more non-transitory computer-readable media of claim 8, wherein degrading the quality of the one or more synthetic training samples comprises:
applying a filter on the one or more one or more synthetic training samples.

10. The one or more non-transitory computer-readable media of claim 8, wherein a photorealistic training sample has a photorealistic resolution that is lower than a resolution of a synthetic training sample from which the photorealistic training sample is generated.

11. The one or more non-transitory computer-readable media of claim 8, wherein the quality of the one or more synthetic training samples comprises a brightness, level of noise, or contrast.

12. The one or more non-transitory computer-readable media of claim 8, wherein the first network and the second network have same weights.

13. The one or more non-transitory computer-readable media of claim 8, wherein the synthetic image comprises a three-dimensional model of an object, and degrading the quality of the one or more synthetic training samples comprises:

degrading a quality of the synthetic image based on one or more materials of the object.

14. The one or more non-transitory computer-readable media of claim 8, wherein the first network is to generate a first output from one of the two different images, the second network is to generate a second output from another one of the two different images, and the neural network is to determine the degree of similarity based on the first output and the second output.

15. An apparatus, comprising:

a computer processor for executing computer program instructions; and one or more non-transitory computer-readable media storing computer program instructions executable by the computer processor to perform operations comprising:

generating one or more synthetic training samples, a synthetic training sample comprising a synthetic image, generating one or more photorealistic training samples by degrading a quality of the one or more synthetic training samples, forming a training set with the one or more photorealistic training samples, and training a neural network using the training set, wherein the neural network comprises a first network and a second network, and after the training, the first network and the second network are to process two different input images for estimating a degree of similarity between the two different input images.

16. The apparatus of claim 15, wherein degrading the quality of the one or more synthetic training samples comprises:

applying a filter on the one or more one or more synthetic training samples.

17. The apparatus of claim 15, wherein a photorealistic training sample has a photorealistic resolution that is lower than a resolution of a synthetic training sample from which the photorealistic training sample is generated.

18. The apparatus of claim 15, wherein the first network and the second network have same weights.

19. The apparatus of claim 15, wherein the synthetic image comprises a three-dimensional model of an object, and degrading the quality of the one or more synthetic training samples comprises:

degrading a quality of the synthetic image based on one or more materials of the object.

20. The apparatus of claim 15, wherein the first network is to generate a first output from one of the two different images, the second network is to generate a second output from another one of the two different images, and the neural network is to determine the degree of similarity based on the first output and the second output.

* * * * *